United States Patent [19]

Rouillard et al.

[11] Patent Number: 5,952,815
[45] Date of Patent: Sep. 14, 1999

[54] EQUALIZER SYSTEM AND METHOD FOR SERIES CONNECTED ENERGY STORING DEVICES

[75] Inventors: Jean Rouillard, Saint-Luc; Christophe Comte, Montreal, both of Canada; Ronald A. Hagen, Stillwater; Orlin B. Knudson, Vadnais Heights, both of Minn.; André Morin, Longueuil; Guy Ross, Beloeil, both of Canada

[73] Assignees: Minnesota Mining & Manufacturing Co., St. Paul, Minn.; Hydro-Quebec Corporation, Montreal, Canada

[21] Appl. No.: 08/900,607

[22] Filed: Jul. 25, 1997

[51] Int. Cl.[6] .................................................. H02J 7/00
[52] U.S. Cl. .......................... 320/116; 320/122; 320/162
[58] Field of Search ................................. 320/116, 122, 320/162, 160, 139, 125

[56] References Cited

U.S. PATENT DOCUMENTS

| | | |
|---|---|---|
| 2,812,376 | 11/1957 | Yardney . |
| 3,193,412 | 7/1965 | Salkind et al. . |
| 3,390,014 | 6/1968 | Eisler . |
| 3,578,506 | 5/1971 | Chassoux . |
| 3,630,783 | 12/1971 | Przybyla ................................. 136/107 |
| 3,786,466 | 1/1974 | Naito et al. . |
| 3,793,501 | 2/1974 | Stonestrom . |
| 3,899,355 | 8/1975 | Chiklis . |
| 3,937,635 | 2/1976 | Mead et al. ............................ 136/83 R |
| 4,028,479 | 6/1977 | Fanciullo et al. ........................ 429/152 |
| 4,060,669 | 11/1977 | Fanciullo ................................. 429/152 |
| 4,060,670 | 11/1977 | Tamminen ............................... 429/154 |
| 4,080,728 | 3/1978 | Buckler ................................... 29/623.4 |
| 4,091,186 | 5/1978 | Ott et al. . |
| 4,098,965 | 7/1978 | Kinsman ................................. 429/153 |

(List continued on next page.)

FOREIGN PATENT DOCUMENTS

| | | |
|---|---|---|
| 044 753 A1 | 1/1982 | European Pat. Off. . |
| 145 498 A2 | 6/1985 | European Pat. Off. . |
| 170 883 A1 | 2/1986 | European Pat. Off. . |
| 177 225 A1 | 4/1986 | European Pat. Off. . |
| 225 767 A2 | 6/1987 | European Pat. Off. . |
| 244 683 A1 | 11/1987 | European Pat. Off. . |
| 310 075 A2 | 4/1989 | European Pat. Off. . |
| 336 102 A2 | 10/1989 | European Pat. Off. . |
| 569 035 A1 | 11/1993 | European Pat. Off. . |
| 570 590 A1 | 11/1993 | European Pat. Off. . |
| 584 639 A1 | 3/1994 | European Pat. Off. . |
| 643 429 A2 | 3/1995 | European Pat. Off. . |
| 652 620 A1 | 5/1995 | European Pat. Off. . |
| 700 109 A1 | 3/1996 | European Pat. Off. . |

(List continued on next page.)

*Primary Examiner*—Peter S. Wong
*Assistant Examiner*—Gregory J. Toatley, Jr.
*Attorney, Agent, or Firm*—Mueting, Raasch & Gebhardt, P.A.

[57] ABSTRACT

An apparatus and method for regulating the charge voltage of a number of electrochemical cells connected in series is disclosed. Equalization circuitry is provided to control the amount of charge current supplied to individual electrochemical cells included within the series string of electrochemical cells without interrupting the flow of charge current through the series string. The equalization circuitry balances the potential of each of the electrochemical cells to within a pre-determined voltage setpoint tolerance during charging, and, if necessary, prior to initiating charging. Equalization of cell potentials may be effected toward the end of a charge cycle or throughout the charge cycle. Overcharge protection is also provided for each of the electrochemical cells coupled to the series connection. During a discharge mode of operation in accordance with one embodiment, the equalization circuitry is substantially non-conductive with respect to the flow of discharge current from the series string of electrochemical cells. In accordance with another embodiment, equalization of the series string of cells is effected during a discharge cycle.

54 Claims, 45 Drawing Sheets

U.S. PATENT DOCUMENTS

| | | | |
|---|---|---|---|
| 4,105,807 | 8/1978 | Arora | 427/126 |
| 4,137,627 | 2/1979 | Kinsman | 29/623.4 |
| 4,150,266 | 4/1979 | Patrichi . | |
| 4,152,825 | 5/1979 | Bruneau | 29/623.2 |
| 4,207,389 | 6/1980 | Gunther et al. | 429/164 |
| 4,209,479 | 6/1980 | Gunther et al. | 264/104 |
| 4,233,371 | 11/1980 | Dorrestijn | 429/152 |
| 4,238,721 | 12/1980 | DeLuca et al. . | |
| 4,241,152 | 12/1980 | Klink . | |
| 4,303,877 | 12/1981 | Meinhold . | |
| 4,321,435 | 3/1982 | Grieger et al. . | |
| 4,322,484 | 3/1982 | Sugalski . | |
| 4,342,978 | 8/1982 | Meister . | |
| 4,370,531 | 1/1983 | Tobin . | |
| 4,383,013 | 5/1983 | Bindin et al. . | |
| 4,409,086 | 10/1983 | Haas et al. . | |
| 4,409,538 | 10/1983 | Tabata . | |
| 4,429,026 | 1/1984 | Bruder | 429/152 |
| 4,436,792 | 3/1984 | Tomino et al. . | |
| 4,477,545 | 10/1984 | Akridge et al. | 429/191 |
| 4,479,083 | 10/1984 | Sullivan . | |
| 4,490,707 | 12/1984 | O'Leary . | |
| 4,495,259 | 1/1985 | Uba . | |
| 4,507,857 | 4/1985 | Epstein et al. | 29/623.2 |
| 4,517,265 | 5/1985 | Belanger et al. . | |
| 4,518,665 | 5/1985 | Fujita et al. . | |
| 4,525,439 | 6/1985 | Simonton | 429/162 |
| 4,547,438 | 10/1985 | McArthur et al. | 429/82 |
| 4,571,468 | 2/1986 | Weldon . | |
| 4,654,278 | 3/1987 | McManis, III et al. . | |
| 4,664,993 | 5/1987 | Sturgis et al. | 429/178 |
| 4,670,703 | 6/1987 | Williams | 320/125 |
| 4,691,085 | 9/1987 | Swanson . | |
| 4,692,577 | 9/1987 | Swanson . | |
| 4,707,795 | 11/1987 | Alber et al. . | |
| 4,752,540 | 6/1988 | Chua et al. | 429/56 |
| 4,758,483 | 7/1988 | Armand et al. . | |
| 4,816,354 | 3/1989 | Tamminen | 429/162 |
| 4,824,746 | 4/1989 | Belanger et al. . | |
| 4,828,939 | 5/1989 | Turley et al. . | |
| 4,851,307 | 7/1989 | Armand et al. . | |
| 4,852,684 | 8/1989 | Packard . | |
| 4,883,726 | 11/1989 | Peled et al. | 424/120 |
| 4,887,348 | 12/1989 | Tamminen | 29/623.2 |
| 4,897,917 | 2/1990 | Gauthier et al. . | |
| 4,911,993 | 3/1990 | Turley et al. | 429/27 |
| 4,913,259 | 4/1990 | Packard . | |
| 4,923,582 | 5/1990 | Abrahamson et al. . | |
| 4,927,717 | 5/1990 | Turley et al. | 429/27 |
| 4,961,043 | 10/1990 | Koenck . | |
| 4,967,136 | 10/1990 | Nofzinger . | |
| 4,971,531 | 11/1990 | Aikioniemi . | |
| 4,973,936 | 11/1990 | Dimpault-Darcy et al. . | |
| 4,997,732 | 3/1991 | Austin et al. | 429/153 |
| 5,008,161 | 4/1991 | Johnston | 429/7 |
| 5,057,385 | 10/1991 | Hope et al. . | |
| 5,066,555 | 11/1991 | Tamminen | 429/121 |
| 5,070,787 | 12/1991 | Weldon et al. . | |
| 5,071,652 | 12/1991 | Jones et al. . | |
| 5,089,027 | 2/1992 | Rossoll et al. | 29/623.2 |
| 5,162,171 | 11/1992 | Jones . | |
| 5,180,641 | 1/1993 | Burns et al. . | |
| 5,197,889 | 3/1993 | Rizzo et al. . | |
| 5,199,239 | 4/1993 | Younger . | |
| 5,204,194 | 4/1993 | Miller et al. . | |
| 5,227,259 | 7/1993 | Weaver et al. . | |
| 5,227,264 | 7/1993 | Duval et al. . | |
| 5,283,512 | 2/1994 | Stadnick et al. . | |
| 5,300,373 | 4/1994 | Shackle . | |
| 5,313,152 | 5/1994 | Wozniak et al. . | |
| 5,324,597 | 6/1994 | Leadbetter et al. . | |
| 5,337,042 | 8/1994 | Hormel et al. . | |
| 5,346,786 | 9/1994 | Hodgetts . | |
| 5,354,630 | 10/1994 | Earl et al. . | |
| 5,363,405 | 11/1994 | Hormel . | |
| 5,382,480 | 1/1995 | Molyneux . | |
| 5,384,212 | 1/1995 | Heiman et al. . | |
| 5,385,793 | 1/1995 | Tiedemann et al. . | |
| 5,393,617 | 2/1995 | Klein . | |
| 5,401,595 | 3/1995 | Kagawa et al. . | |
| 5,409,787 | 4/1995 | Blanyer et al. . | |
| 5,415,954 | 5/1995 | Gauthier et al. . | |
| 5,422,200 | 6/1995 | Hope et al. . | |
| 5,423,110 | 6/1995 | Gauthier et al. . | |
| 5,438,249 | 8/1995 | Chang et al. . | |
| 5,478,667 | 12/1995 | Shackle et al. . | |
| 5,478,668 | 12/1995 | Gozdz et al. . | |
| 5,479,083 | 12/1995 | Brainard . | |
| 5,487,958 | 1/1996 | Tura . | |
| 5,503,947 | 4/1996 | Kelly et al. . | |
| 5,503,948 | 4/1996 | MacKay et al. . | |
| 5,504,415 | 4/1996 | Podrazhansky et al. . | |
| 5,519,563 | 5/1996 | Higashijimaa et al. . | |
| 5,521,024 | 5/1996 | Sasaki et al. . | |
| 5,528,122 | 6/1996 | Sullivan et al. . | |
| 5,530,336 | 6/1996 | Eguchi et al. . | |
| 5,532,087 | 7/1996 | Nerz et al. . | |
| 5,547,775 | 8/1996 | Eguchi et al. . | |
| 5,547,780 | 8/1996 | Kagawa et al. . | |
| 5,548,200 | 8/1996 | Nor et al. . | |
| 5,552,243 | 9/1996 | Klein . | |
| 5,556,576 | 9/1996 | Kim . | |
| 5,561,380 | 10/1996 | Sway-Tin et al. . | |
| 5,563,002 | 10/1996 | Harshe . | |
| 5,567,539 | 10/1996 | Takahashi et al. . | |
| 5,568,039 | 10/1996 | Fernandez . | |
| 5,569,063 | 10/1996 | Morioka et al. . | |
| 5,569,550 | 10/1996 | Garrett et al. . | |
| 5,573,869 | 11/1996 | Hwang et al. . | |
| 5,582,931 | 12/1996 | Soichiro . | |
| 5,585,207 | 12/1996 | Wakabe et al. . | |
| 5,589,290 | 12/1996 | Klink et al. . | |
| 5,593,604 | 1/1997 | Beasly et al. . | |
| 5,594,320 | 1/1997 | Pacholok et al. . | |
| 5,595,835 | 1/1997 | Miyamoto et al. . | |
| 5,595,839 | 1/1997 | Hossain . | |
| 5,599,636 | 2/1997 | Braun . | |
| 5,600,230 | 2/1997 | Dunstan . | |
| 5,602,481 | 2/1997 | Fukuyama . | |
| 5,610,495 | 3/1997 | Yee et al. . | |
| 5,612,153 | 3/1997 | Moulton et al. . | |
| 5,618,641 | 4/1997 | Arias . | |
| 5,619,417 | 4/1997 | Kendall . | |
| 5,620,808 | 4/1997 | Wheeler et al. . | |
| 5,622,789 | 4/1997 | Young . | |
| 5,623,196 | 4/1997 | Fernandez et al. . | |
| 5,626,990 | 5/1997 | Miller et al. . | |
| 5,631,537 | 5/1997 | Armstrong . | |
| 5,633,573 | 5/1997 | van Phuoc et al. . | |
| 5,637,981 | 6/1997 | Nagai et al. | 320/160 |
| 5,643,044 | 7/1997 | Lund . | |
| 5,647,534 | 7/1997 | Kelz et al. . | |
| 5,648,713 | 7/1997 | Mangez . | |
| 5,650,240 | 7/1997 | Rogers . | |
| 5,652,498 | 7/1997 | Edye et al. . | |
| 5,652,502 | 7/1997 | van Phuoc et al. . | |
| 5,654,622 | 8/1997 | Toya et al. . | |
| 5,670,272 | 9/1997 | Cheu et al. | 429/162 |
| 5,824,432 | 10/1998 | Currle . | |

FOREIGN PATENT DOCUMENTS

| | | |
|---|---|---|
| 0 721 247 A2 | 7/1996 | European Pat. Off. . |

| | | |
|---|---|---|
| 774 795 A2 | 5/1997 | European Pat. Off. . |
| 780 920 A1 | 6/1997 | European Pat. Off. . |
| 2 511 547 | 2/1983 | France . |
| 2 721 407 | 12/1995 | France . |
| 3246968 A1 | 7/1984 | Germany . |
| 4218381 C1 | 5/1993 | Germany . |
| 4225746 A1 | 2/1994 | Germany . |
| 94 15 874 | 12/1994 | Germany . |
| 19618897 A1 | 11/1997 | Germany . |
| 59-091658 | 5/1984 | Japan . |
| 59-117061 | 7/1984 | Japan . |
| 59-139555 | 8/1984 | Japan . |
| 61-099278 | 5/1986 | Japan . |
| 63-062156 | 3/1988 | Japan . |
| 01320758 | 12/1989 | Japan . |
| 04294071 | 10/1992 | Japan . |
| 05166533 | 7/1993 | Japan . |
| 06036756 | 2/1994 | Japan . |
| 06203823 | 7/1994 | Japan . |
| 07250788 | 10/1995 | Japan . |
| 07282841 | 10/1995 | Japan . |
| 08115711 | 5/1996 | Japan . |
| 09017416 | 1/1997 | Japan . |
| 1066-385 | 6/1986 | Russian Federation . |
| 1582979 | 1/1981 | United Kingdom . |
| 2206726 | 1/1989 | United Kingdom . |
| 2 282 924 | 4/1995 | United Kingdom . |
| 2295718 | 6/1996 | United Kingdom . |
| WO 91/17451 | 11/1991 | WIPO . |
| WO 92/02963 | 2/1992 | WIPO . |
| WO 93/01624 | 1/1993 | WIPO . |
| WO 94/14206 | 6/1994 | WIPO . |
| WO 95/00978 | 1/1995 | WIPO . |
| WO 95/26055 | 9/1995 | WIPO . |
| WO 95/34824 | 12/1995 | WIPO . |
| WO 96/17397 | 6/1996 | WIPO . |
| WO 96/19816 | 6/1996 | WIPO . |
| WO 96/22523 | 7/1996 | WIPO . |
| WO 98/11620 | 3/1998 | WIPO . |

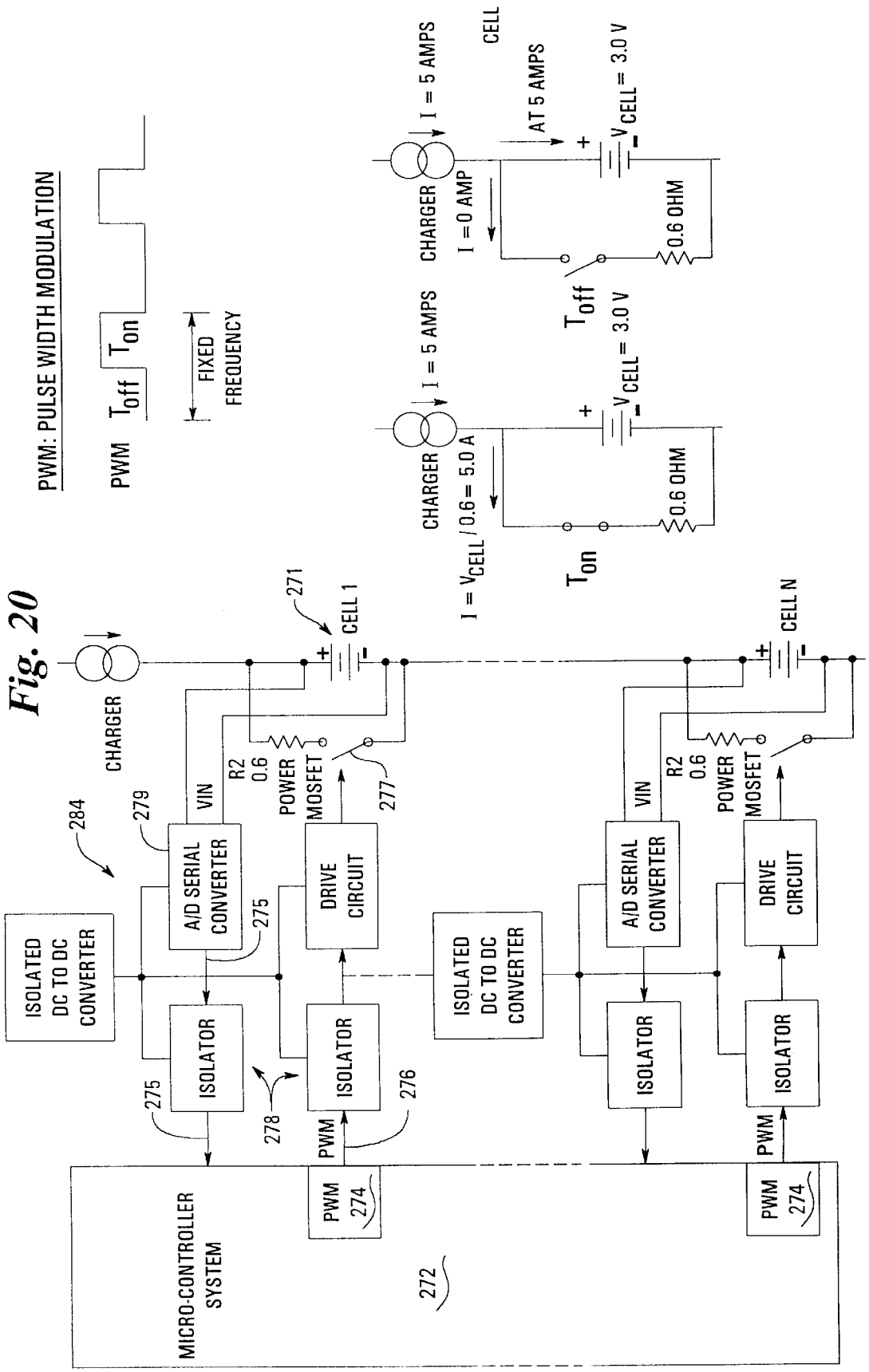

Fig. 37
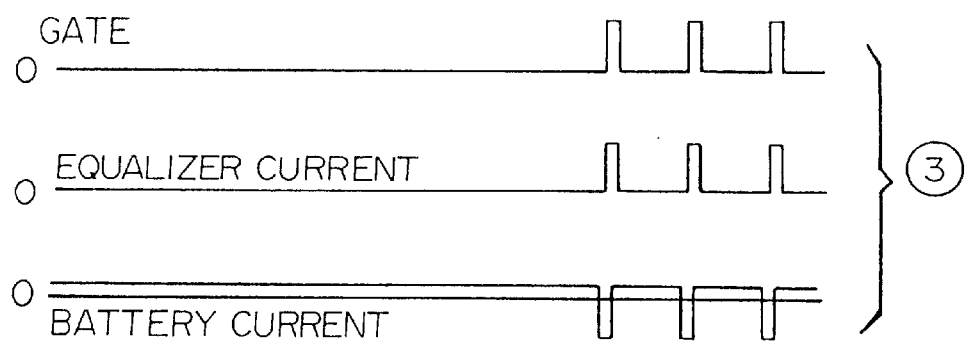
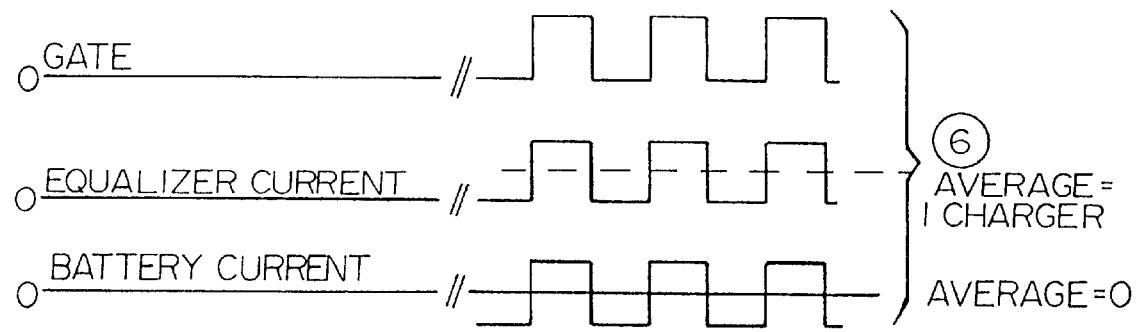

EQUALIZER SYSTEM AND METHOD FOR SERIES CONNECTED ENERGY STORING DEVICES

GOVERNMENT LICENSE RIGHTS

The Government of the United States of America has rights in this invention pursuant to Cooperative Agreement No. DE-FC02-91CE50336 awarded by the U.S. Department of Energy.

FIELD OF THE INVENTION

This invention relates generally to rechargeable energy storing devices, and more particularly, to an apparatus and method for regulating the voltages of serially connected energy storing cells during charging.

BACKGROUND OF THE INVENTION

A number of advanced energy storing device technologies have recently been developed, such as metal hydride (e.g., Ni-MH), lithium-ion, and lithium polymer cell technology, which promise to provide high energy generation for a wide range of commercial and consumer applications. In high-energy applications, a substantial number of individual energy storing devices or cells are typically connected in series and parallel to produce higher voltages and current, respectively. Combining cells in this fashion increases power capacity of the energy storing system. By way of example, it is believed that a battery system suitable for powering an electric vehicle will likely have a voltage rating on the order of several hundred volts, and a current rating on the order of several hundred amperes (amps).

In applications in which rechargeable energy storage cells are connected together in series, it is considered desirable to use cells which are equivalent or very similar in terms of electrochemistry and voltage/current characteristics. It is known that undesirable consequences often result during charging and discharging when an energy storage cell within a series string of cells exhibits characteristics that vary significantly from those of other serially connected energy storage cells. One adverse consequence, for example, involves the voltage of an anomalous energy storage cell within the series string, which will rapidly exceed a nominal maximum voltage limit during charging. Such an overvoltage or overcharge condition may damage the cell and significantly reduce the service life of the cell and other cells within the series connection.

It can be appreciated that the characteristics of mass manufactured energy storage cells will deviate to varying degrees from a given set of requirements. Further, cell characteristics, even if considered acceptable at the time of manufacture, will deviate from manufactured specifications at varying rates over time. In order to accommodate subtle and pronounced differences in cell chemistry and performance between serially connected cells, several techniques have been developed to address the adverse effects of cell non-homogeneity that typically arise when charging a series string of cells.

A conventional approach to protecting a rechargeable energy storing device, such as a battery, from an overcharge condition during charging involves controlling the voltage across the battery terminals. While this approach may be useful when employed for a single battery or for multiple batteries connected in parallel, such a method would prove ineffective for individual batteries connected in series, since the voltage of an individual serially connected battery can-not be controlled using such an approach. Certain approaches that involve the use of an under-voltage switch and an over-voltage switch within a charge control circuit are similarly ineffective for protecting an individual battery within a series string of batteries.

Other conventional overcharge protection schemes which employ over-voltage and under-voltage switches suffer from another significant deficiency, particularly when high current and voltage ratings are implicated. The over-voltage and under-voltage switches in such schemes typically must support the full discharge and charge current of the battery system. In high-energy applications which require the production and transport of several hundred amps of current, such switches would likely be prohibitively expensive and difficult to accommodate in a cost-efficient power system design. Moreover, when one of the series connected cells or batteries achieves a fully charged state, a conventional overcharge protection circuit typically interrupts the flow of charge current to all other cells or batteries within the series connection. As such, each of the serially connected cells or batteries is charged to a different potential, thereby resulting in an unbalanced energy storage system.

There is a need in the battery manufacturing industry for an apparatus and method for effectively and safely charging a number of serially connected energy storing devices. There exists a further need for a methodology for balancing the potentials of series connected energy storing devices. The present invention fulfills these and other needs.

SUMMARY OF THE INVENTION

The present invention is directed to an apparatus and method for regulating the charge voltage of a number of electrochemical cells connected in series. Equalization circuitry is provided to control the amount of charge current supplied to individual electrochemical cells included within the series string of electrochemical cells without interrupting the flow of charge current through the series string. The equalization circuitry balances the potential of each of the electrochemical cells to within a pre-determined voltage setpoint tolerance during charging, and, if necessary, prior to initiating charging. Equalization of cell potentials may be effected toward the end of a charge cycle or throughout the charge cycle. Overcharge protection is also provided for each of the electrochemical cells coupled to the series connection. During a discharge mode of operation in accordance with one embodiment, the equalization circuitry is substantially non-conductive with respect to the flow of discharge current from the series string of electrochemical cells. In accordance with another embodiment, equalization of the series string of cells may be effected during a stand-by mode of operation.

BRIEF DESCRIPTION OF THE DRAWINGS

FIGS. 19–20 illustrate another embodiment of an equalizer circuit implementation in accordance with an embodiment of the present invention;

FIG. 37 illustrates waveforms corresponding to the transistor gate-to-source voltage, equalizer bypass current, and cell current in response to control signals produced by a signal driver of a high-current equalizer circuit;

DETAILED DESCRIPTION OF THE EMBODIMENTS

Figure 1:
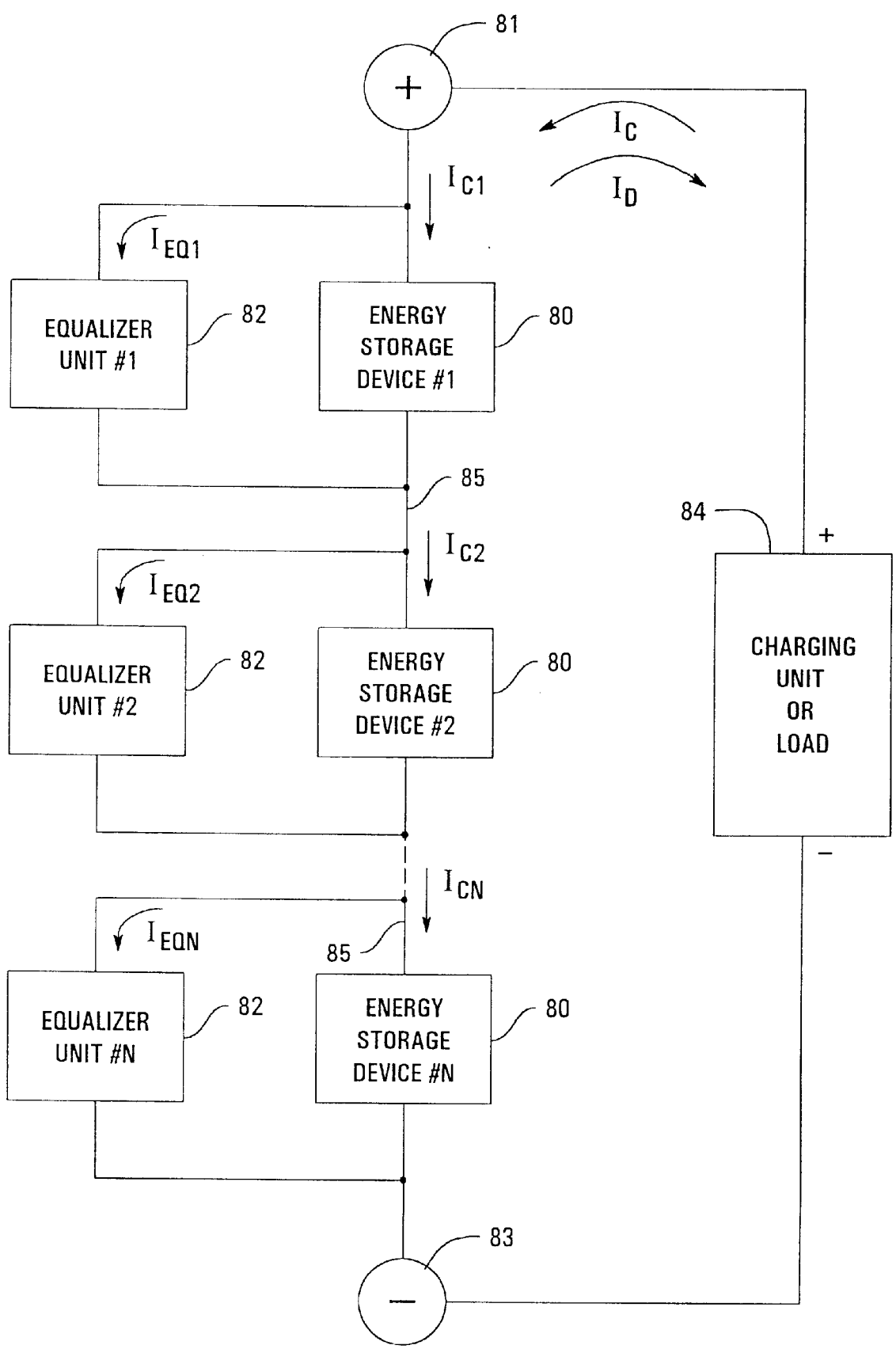
FIG. 1 is a depiction of an energy storage system including a number of series connected energy storing devices and equalizer units coupled to the energy storing devices for providing voltage regulation during a charging procedure.

Referring now to the drawings, and more particularly to FIG. 1, there is illustrated an embodiment of an energy storage system employing equalization circuitry which operates in accordance with the principles of the present invention. The energy storage system shown in FIG. 1 includes a number of energy storing devices 80 which are connected in series by a common connection or bus 85 between a positive terminal 81 and a negative terminal 83. An equalizer unit 82 is associated with a corresponding energy storing device 80 and is typically connected in parallel with the corresponding energy storing device 80.

During a discharge mode of operation, the energy storing devices 80 produce a discharge current, $I_D$, which is delivered to a load 84 or other energy consuming element. Each of the equalizer units 82 remain in a non-conductive state so as not to disrupt the flow of the discharge current, $I_D$, through the serially connected devices 80. The equalizer units 82 may thus be viewed as being electrically isolated with respect to the series arrangement of energy storing devices 80 during the discharge mode of operation.

During a charge mode of operation, which typically includes a charging phase and an equalization phase, a charging unit 84 supplies a charge current, $I_C$, that flows from the positive terminal of a charging unit 84, through the string of energy storing devices 80, and returns to the negative terminal of the charging unit 84. Initially, all of the charge current supplied by the charging unit 84 is delivered to the energy storing devices 80, and the equalizer units 82 are nonconductive with the devices 80 during the charging phase of a typical charging procedure. The charge current supplied by the charging unit 84 to the series string of energy storing devices may be quite high, such as on the order of 19 A in accordance with one embodiment, for example. The charge voltage across the positive and negative terminals 81, 83 typically varies depending on the number of series connected devices. In the embodiment of an energy storing module shown in FIG. 6, for example, the charge voltage across the module terminals is on the order of 360–400 volts total.

When the potential of a particular energy storing device 80 coupled to the series connection 85 reaches a pre-established voltage setpoint during the charging procedure, the corresponding equalizer unit 82 begins controlling the amount of charge current, $I_C$, delivered to the energy storing device 80. In accordance with the embodiment shown in FIG. 1, for example, the equalizer unit #2 82 controls the charge current, $I_{C2}$, delivered to the energy storing device #2 80 by providing a controllable bypass current path ($I_{EQ2}$) through which all or some of the charge current, $I_{C2}$, may pass. As the energy storing device #2 80 approaches a pre-established voltage setpoint, such as a setpoint which represents the voltage at which the energy storing device is considered fully charged, the equalizer unit #2 82 diverts an increasing amount of charge current, $I_C$, through the bypass current path ($I_{EQ2}$), thereby decreasing the amount of charge current, $I_C$, received by the energy storing device #2 80 (i.e., $I_{C2}=I_C-I_{EQ2}$).

This equalization or balancing procedure facilitated by use of the equalizer unit 82 continues until the voltage of the energy storing device 80 stabilizes at the pre-established voltage setpoint, at which point all (i.e., 100%) of the charge current, $I_C$, is bypassed or diverted and none (i.e., 0%) of the charge current, $I_C$, charges the energy storing device 80. As such, the rate at which an energy storing device is charged may be moderated by controlling the rate at which charge current is supplied to the energy storing device as the device approaches and reaches a fully charged state.

Those skilled in the art will appreciate that a number of significant advantages may be realized by employing an equalization methodology in accordance with the principles of the present invention. One such advantage, as is described above, concerns the capability of controlling the charge current supplied to a particular energy storing device included within a series of energy storing devices without interrupting the charge current supplied to other energy storing devices within the series connection. Another significant advantage concerns the capability to independently balance the potential of each of the serially connected energy storing devices 80, thereby accommodating the unique electrochemical characteristics of individual energy storing devices 80, notwithstanding that such devices 80 may be constructed to operate in conformance with an equivalent set of specifications.

In an embodiment in which an equalizer unit 82 operates autonomously with respect to other equalizer units 82, a relatively straightforward and inexpensive equalization implementation may be realized. An analog, digital, or hybrid circuit implementation may be employed. Further, the equalization approach illustrated in FIG. 1, for example, provides for effective equalization of a series of high-power energy storing devices, such as those that provide a peak operating current on the order of 400 A and peak voltages on the order of 400 V.

The equalization approach shown in FIG. 1 also provides effective overcharge protection for each of the serially connected energy storing devices 80. As was discussed in the Background, the voltage of an anomalous energy storing device which exhibits sufficiently atypical, lower capacity characteristics in comparison with other energy storing devices within a series string will rapidly more exceed a nominal maximum voltage limit during charging. An equalization methodology in accordance with the present invention prevents an overcharge condition from occurring in the serially connected energy storing devices by moderating the charge current of individual serially connected energy storing devices as the devices approach and reach a fully charged state.

Figure 2:
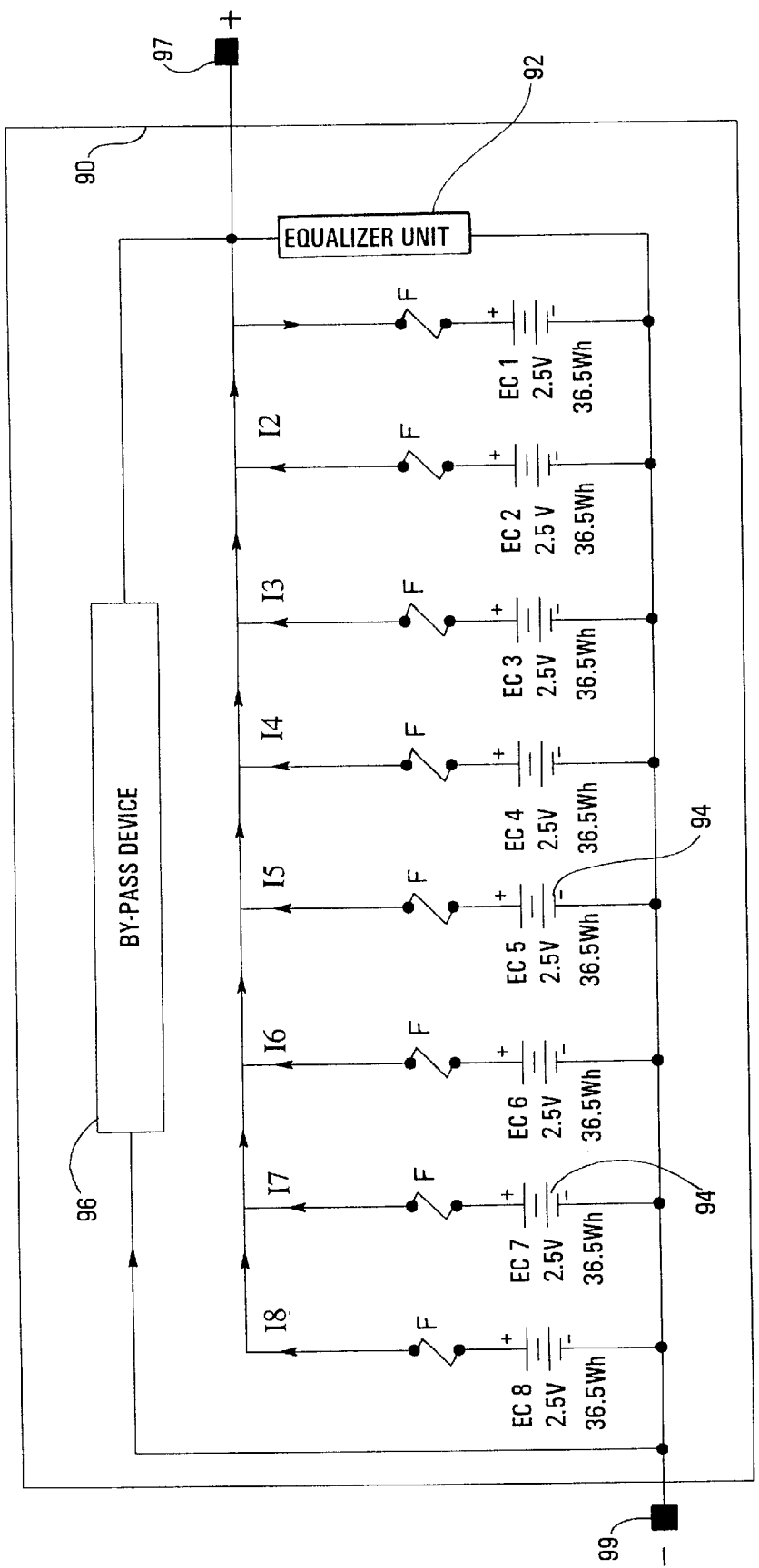
FIG. 2 is an illustration of a number of electrochemical cells that form an energy storing device which is connected in parallel with an equalizer unit.

In FIG. 2, there is illustrated an embodiment of an energy storing device 90 which includes an array of electrochemical cells 94 arranged in a parallel relationship with respect to positive and negative terminals 97, 99. An equalizer unit 92 is connected in parallel with the array of electrochemical cells 94. A bypass device 96 may also be connected in parallel with the electrochemical cell array 94 for purposes of providing a short-circuit path through the energy storing device 90 should the cell array 94 become defective. It is understood that the term cell as is used herein may represent a single electrochemical cell or a grouping of electrochemical cells, such as eight parallel connected cells, that constitute a cell pack.

Figure 3:
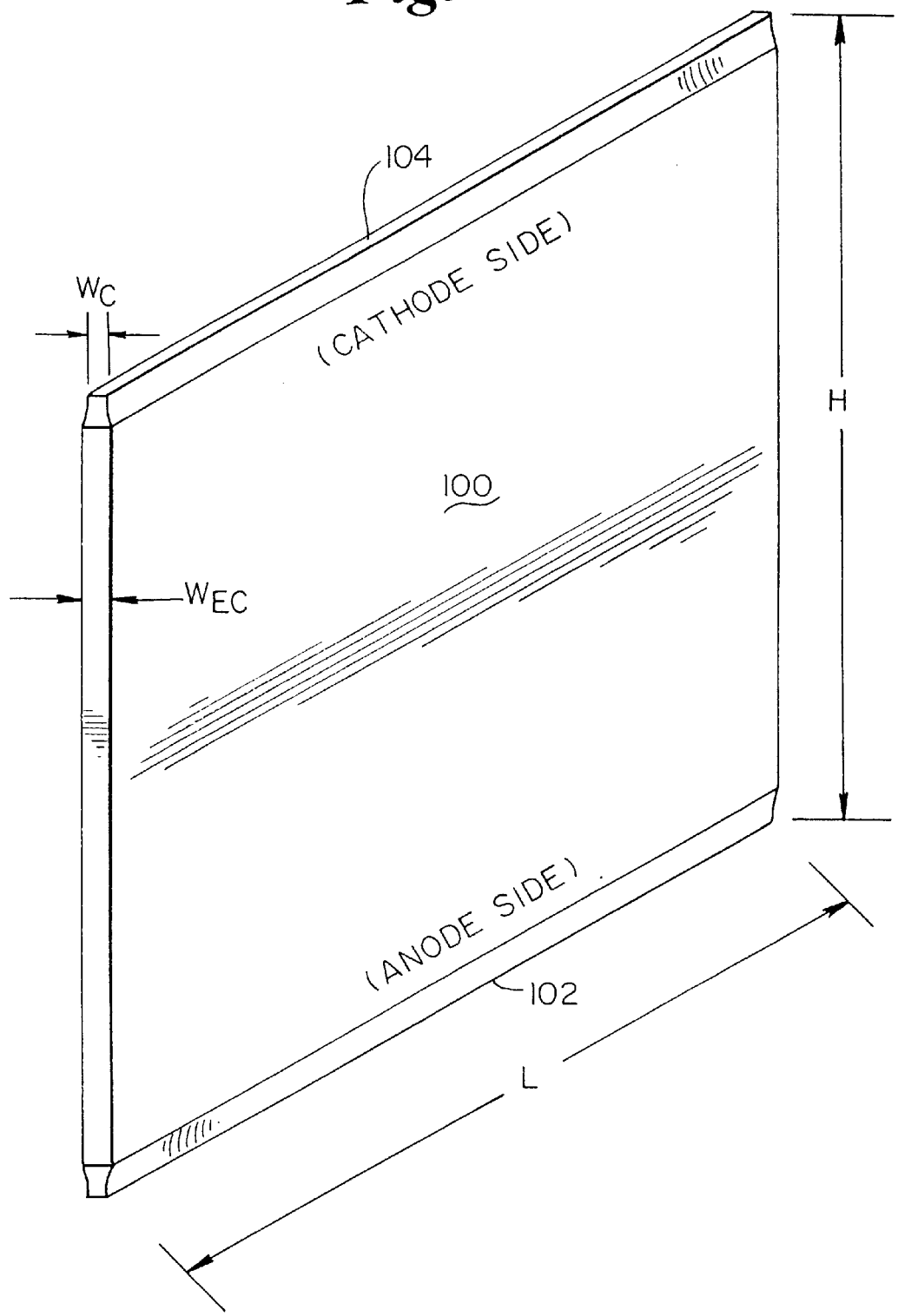
FIG. 3 is an illustration of a solid-state, thin-film electrochemical cell having a prismatic configuration in accordance with one embodiment of the present invention.
Figure 4:
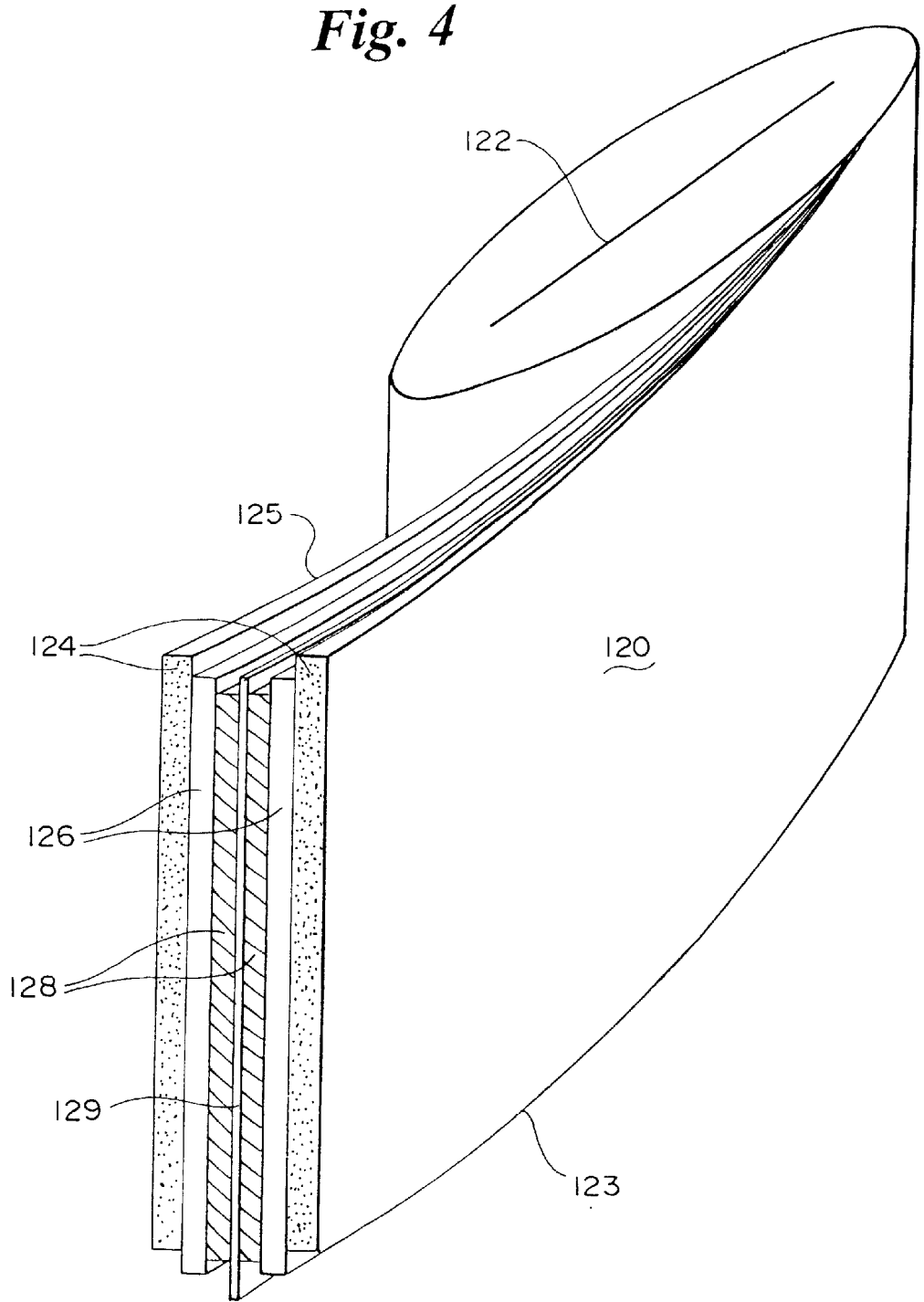
FIG. 4 is a depiction of various film layers constituting the electrochemical cell shown in FIG. 3.

In accordance with one embodiment of the present invention, the electrochemical cells 94 shown in FIG. 2 constitute solid-state, thin-film cells of the type shown in FIGS. 3–4. Such thin-film electrochemical cells are particularly well-suited for use in the construction of high-current, high-voltage energy storage modules and batteries, such as those used to power electric vehicles for example. In FIG. 3, there is shown an embodiment of a prismatic electrochemical cell 100 which includes an anode contact 102 and a cathode contact 104 formed respectively along opposing edges of the electrochemical cell 100.

In this embodiment, the electrochemical cell 100 is fabricated to have a length L of approximately 135 mm, a height H of approximately 149 mm, and a width $W_{ec}$ of approximately 5.4 mm or approximately 5.86 mm when including a foam core element. The width $W_c$ of the cathode contact 104 and the anode contact 102 is approximately 3.9 mm, respectively. Such a cell 100 typically exhibits a nominal energy rating of approximately 36.5 Wh, a peak power rating of 87.0 W at 80 percent depth of discharge (DOD), a cell capacity of 14.4 Ah, and a nominal voltage rating of 3.1 V at full charge.

The electrochemical cell shown in FIG. 3 may have a construction similar to that illustrated in FIG. 4. In this embodiment, an electrochemical cell 120 is shown as having a flat wound prismatic configuration which incorporates a solid polymer electrolyte 126 constituting an ion transporting membrane, a lithium metal anode 124, a vanadium oxide cathode 128, and a central current collector 129. These film elements are fabricated to form a thin-film laminated prismatic structure, which may also include an insulation film, such as polypropylene film.

A known sputtering metallization process is employed to form current collecting contacts along the edges 125, 123 of the anode 124 and cathode 128 films, respectively. It is noted that the metal-sprayed contacts provide for superior current collection along the length of the anode and cathode film edges 125, 123, and demonstrate good electrical contact and heat transfer characteristics. The electrochemical cells illustrated in FIGS. 3–4 may be fabricated in accordance with the methodologies disclosed in U.S. Pat. Nos. 5,423,110, 5,415, 954, and 4,897,917.

Figure 5:
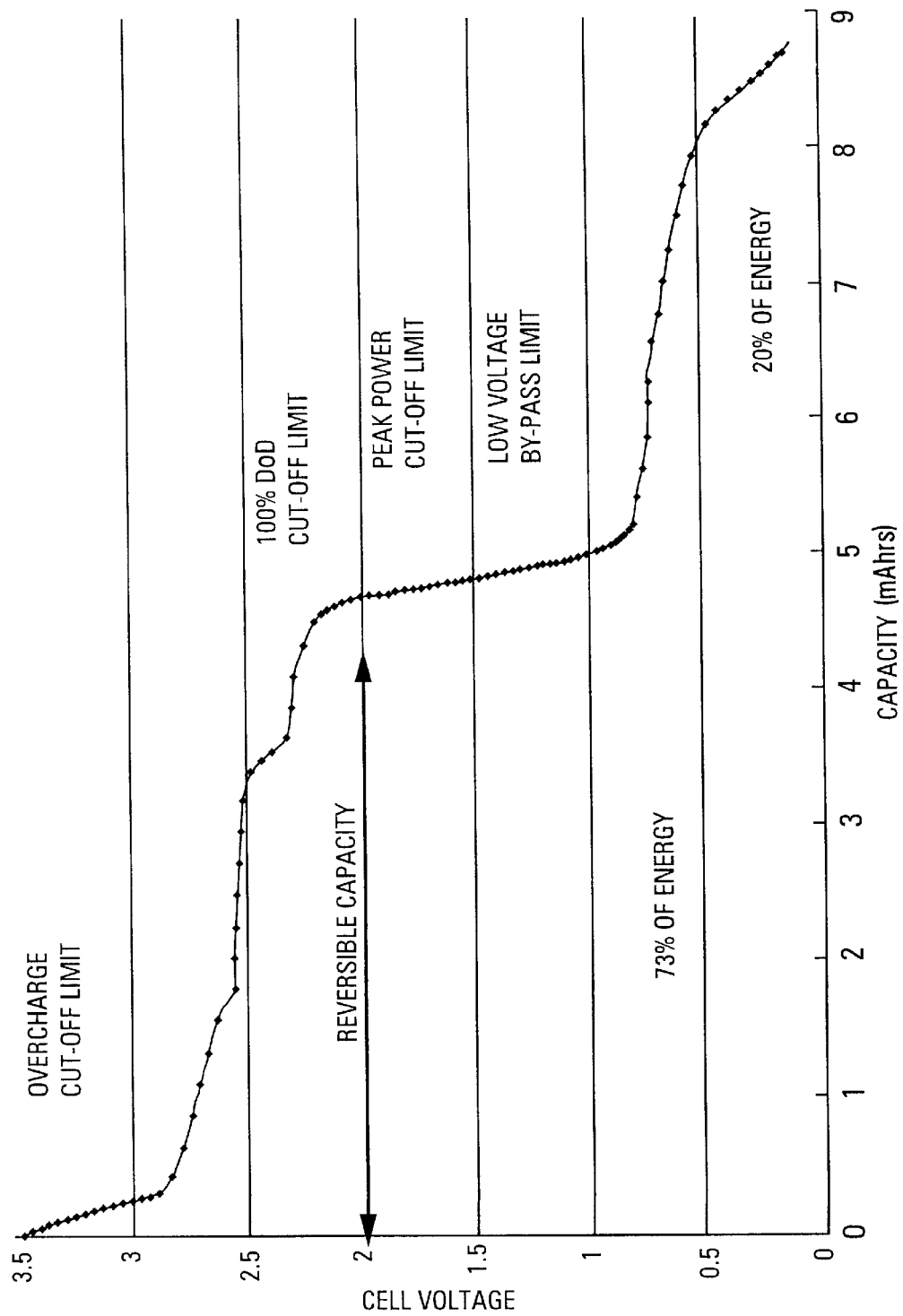
FIG. 5 is a graph characterizing an electrochemical cell in terms of cell voltage and capacity in accordance with one embodiment of the invention.

In FIG. 5, there is illustrated in graphical form a relationship between voltage and capacity for an electrochemical cell having a construction substantially similar to that illustrated in FIGS. 3–4. It can be seen that an individual electrochemical cell has a nominal operating voltage ranging between approximately 2.0 V and 3.1 V. It is understood that similar voltage/capacity curves may be developed to characterize energy storage cells fabricated using technologies other than those employed in the embodiments described herein, such as conventional wet and dry cell technologies, and that appropriate low voltage and high voltage setpoints or other limits may be obtained by use of such curves for implementing an effective equalization methodology in accordance with the principles of the present invention.

A number of electrochemical cells may be selectively interconnected in a parallel and/or series relationship to achieve a desired voltage and current rating. For example, and with reference to FIGS. 6–7, a number of electrochemical cells 130 may be grouped together and connected in parallel to common positive and negative power buses or lines to form a cell pack 132. A number of the electrochemical cell packs 132 may then be connected in series to form a module 134. Further, a number of individual modules 134 may be connected in series to constitute a battery 136.

Figure 6:
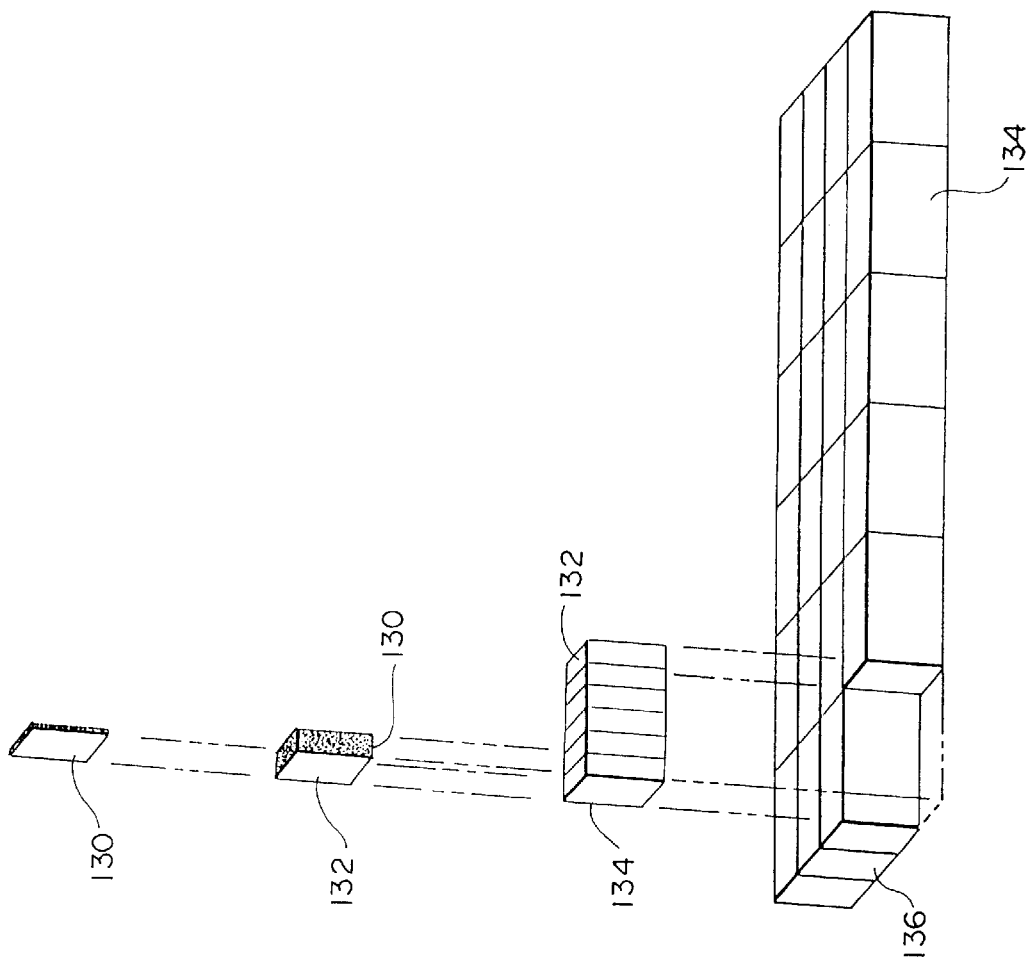
FIG. 6 illustrates various packaging configurations of an energy storing device, including cell pack, module, and battery configurations.

For purposes of illustration, and not of limitation, the embodiment shown in FIG. 6 depicts an arrangement of electrochemical cells in accordance with a modular packaging approach which provides an efficient means of achieving desired power requirements for a broad range of applications. In this illustrative embodiment, eight electrochemical cells 130 are grouped together and connected in parallel to form a cell pack 132. A module 134 is constituted by grouping six cell packs 132 together and connecting the packs 132 in series. A battery 136 is shown as constituting 24 modules 134 connected in series.

Given this arrangement, and assuming that each of the electrochemical cells 130 has dimensions and characteristics equivalent to those depicted in FIG. 5, each individual cell 130 provides for a total energy output of approximately 36.5 Wh. Each cell pack 132 provides for a total energy output of approximately 292 Wh, while each module 134 provides for a total energy output of 1.75 kWh. The battery 136, constituted by 24 series connected modules 134 arranged in an array of four axially and six longitudinally oriented modules as is shown in the embodiment of FIG. 6, provides for a total energy output of approximately 42 kWh. It is understood that the arrangement of electrochemical cells 130 and interconnection of cells 130 forming a cell pack 132, module 134, and battery 136 may vary from the arrangements illustrated in FIG. 6.

Figure 7:
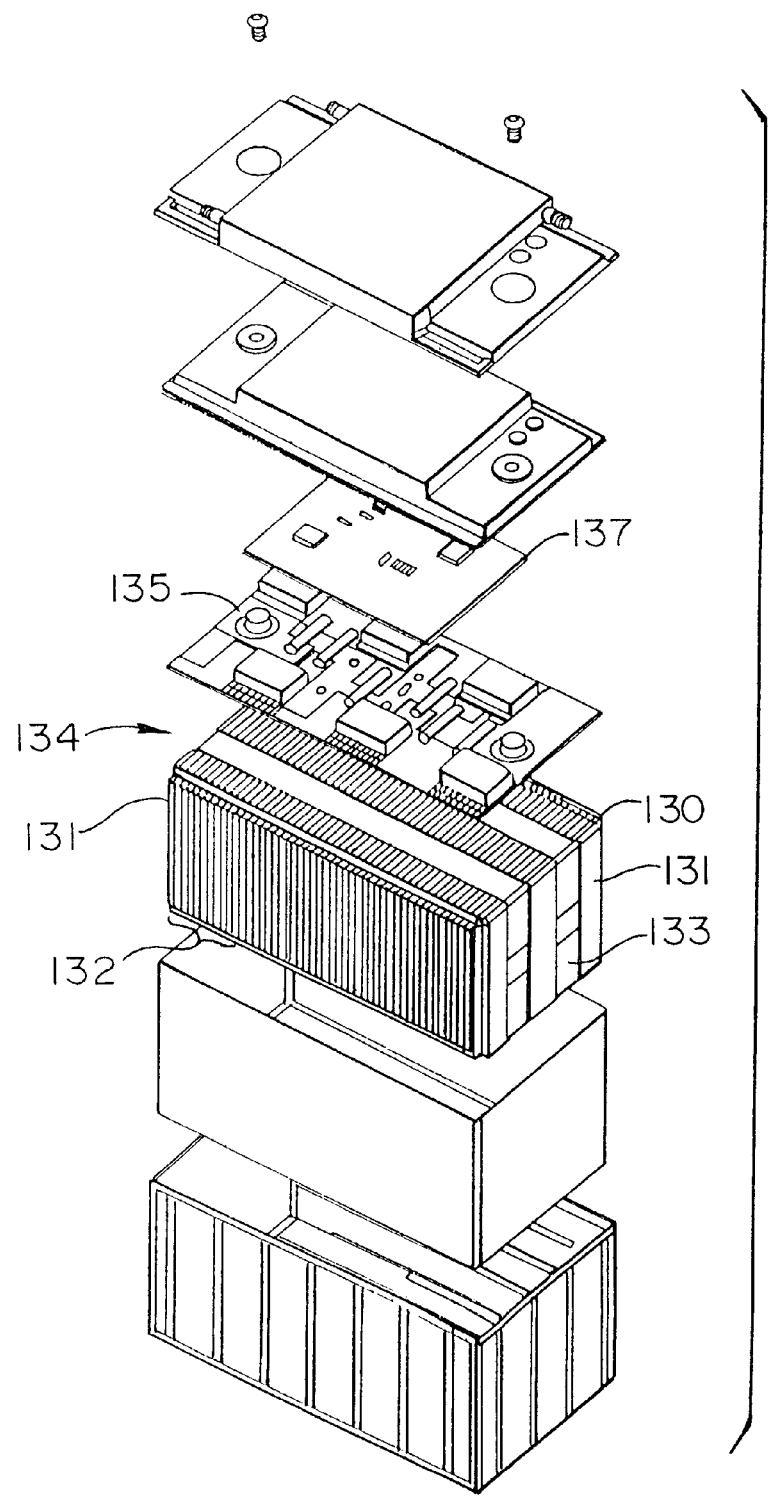
FIG. 7 is an exploded view of an energy storage module containing a number of interconnected thin-film electrochemical cells.

In FIG. 7, there is shown an exploded view of an embodiment of an energy storage module which houses a number of electrochemical cells, interconnection hardware, and control hardware and software. In accordance with one embodiment, a module 134 includes a stack of 48 electrochemical cells 130 which are interconnected through use of a power board 135. The stack of electrochemical cells 130 are segregated into six cell packs 132, all of which are banded together by use of two bands 133 and two opposing thrust plates 131. The 48 electrochemical cells 130 are subjected to continuous compressive forces generated by use of the bands 133/thrust plates 131 and an optional foam or spring-type core element disposed in each of the cells 130. It is noted that the foam or spring-type core element provided in the center of each of the cells 130 serves to distribute pressure evenly between the cells 130, which is of particular importance as cell volumes change during charge and discharge cycling. Equalization circuitry is typically provided on the power board 135, but may also include components, such as a microprocessor, disposed on a control board 137 or other external board that electrically communicates with the power board 135.

Figure 8:
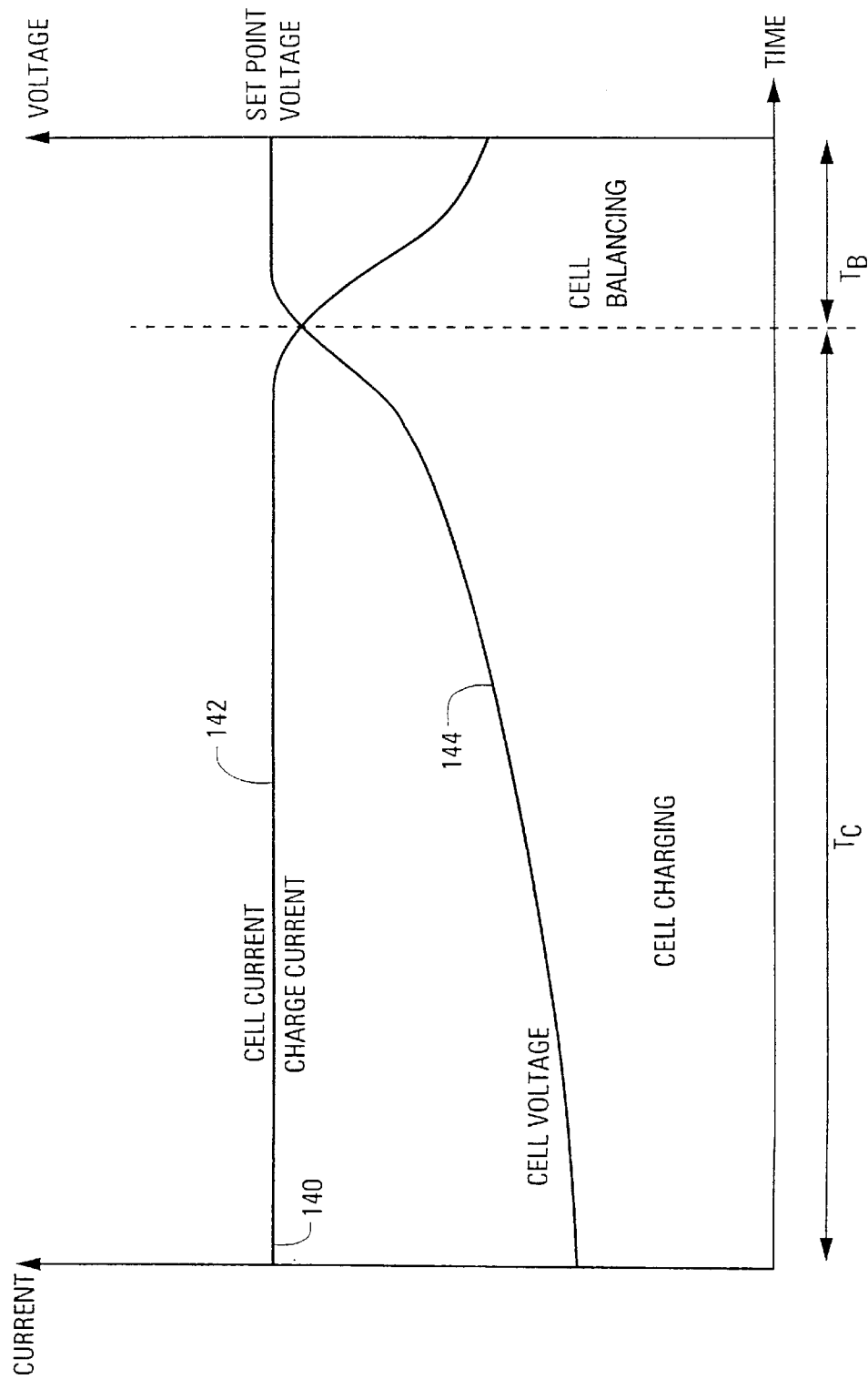
FIG. 8 illustrates in graphical form a relationship between cell voltage and cell current during a charge procedure in accordance with an embodiment of the present invention.

In the graph shown in FIG. 8, current and voltage curves are provided for a rechargeable energy storing device, such as a thin-film electrochemical cell, which is subject to an equalization procedure in accordance with the principles of the present invention. During a charging period, designated by the time duration $T_C$, a substantially constant charge current 140 is supplied to an energy storing device or cell. The cell voltage 144 gradually increases during the charging period, $T_C$, while the cell current 142 remains substantially constant. When the cell voltage 144 reaches a pre-established voltage setpoint, an equalization procedure is initiated during which the cell voltage is balanced to a nominal operating voltage. It can be seen that the cell current 142 is controlled during the period of cell balancing, indicated as the time duration $T_B$, in order to stabilize the cell voltage 144 at the nominal operating voltage.

Figure 9:
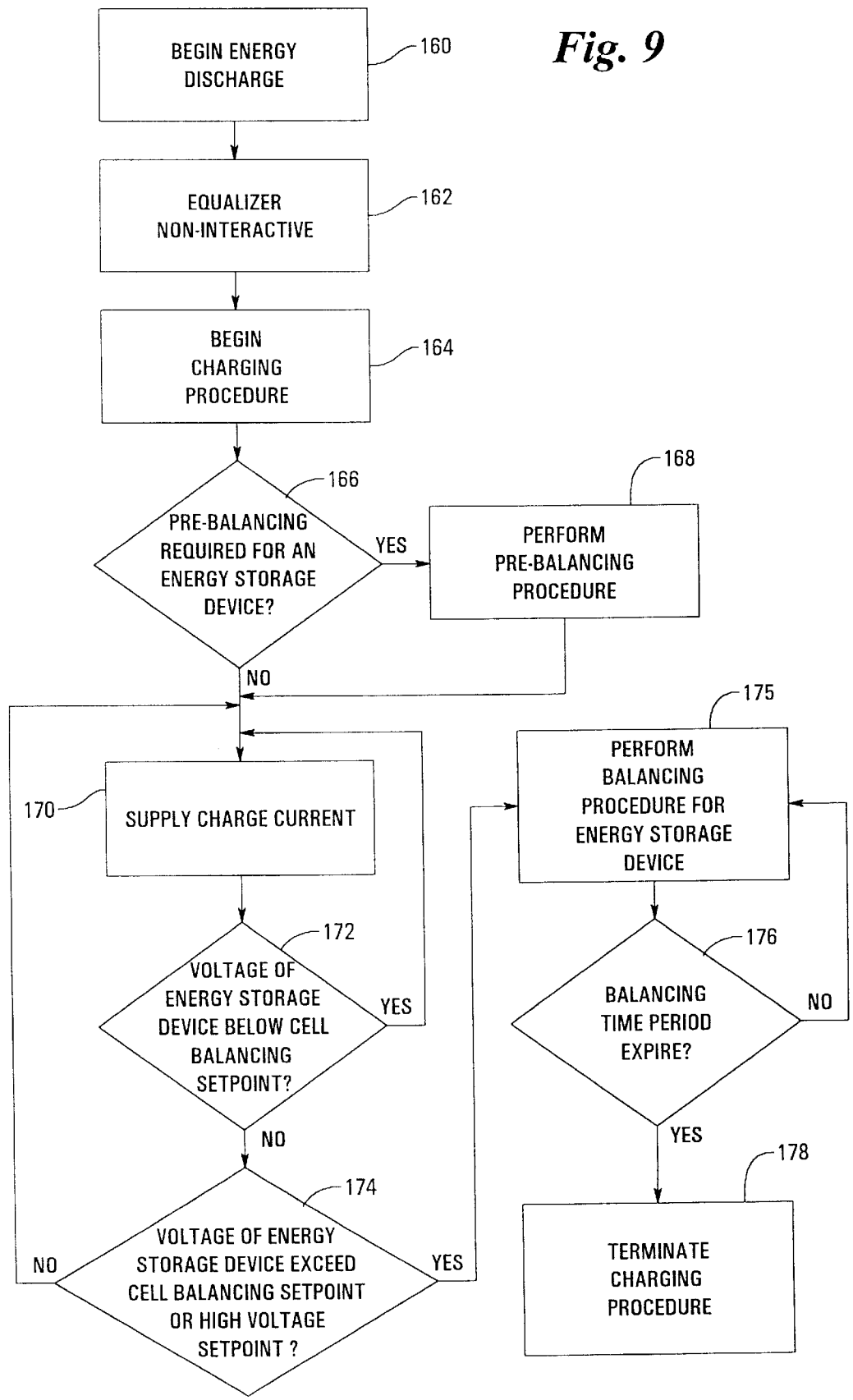
FIG. 9 depicts various process steps of a charging and equalization procedure in accordance with an embodiment of the present invention.
Figure 10:
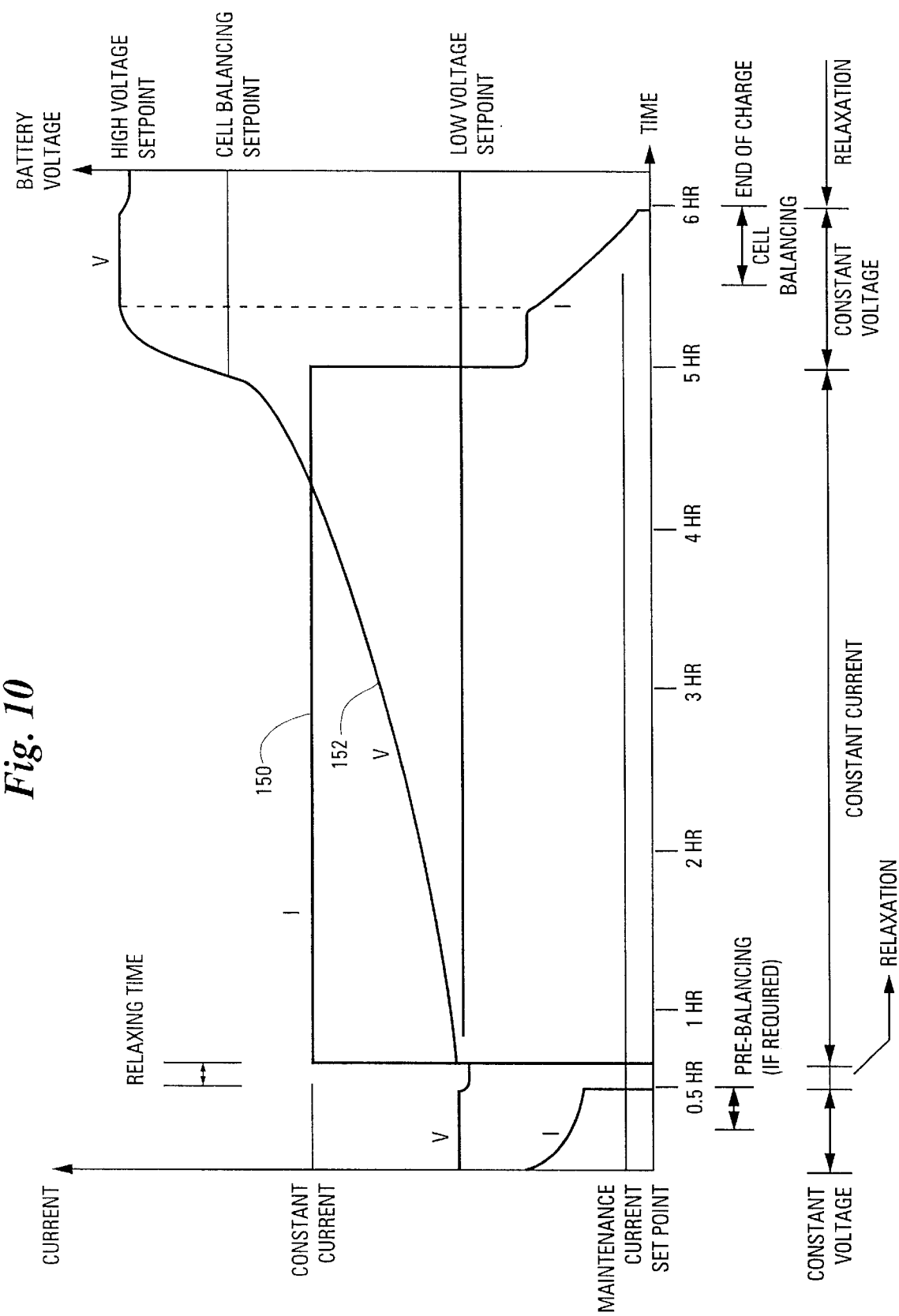
FIG. 10 illustrates in graphical form a relationship between current and voltage of an energy storing device subject to a charging and equalization procedure in accordance with an embodiment of the present invention.

In FIG. 9, there is depicted in flowchart form a more detailed process for balancing individual energy storing devices within a series string of energy storing devices in accordance with an embodiment of the present invention. Reference will be made to FIG. 10 which depicts current and voltage curves for one of the serially connected energy storing devices subject to a charging and equalization procedure according to the process depicted in FIG. 9. It is assumed that a fully charged energy storing device or cell is initially discharged 160 by delivering cell current to a load or other energy consuming device. As was discussed previously, the equalization circuitry has no appreciable effect on the flow of current through the series connection during cell discharge 162.

In this illustrative example, it is assumed that the charging procedure 164 is initiated with the voltage of the energy storing device being at the level indicated as the low voltage setpoint shown in FIG. 10. Depending on the voltage state of the energy storing devices in the series connection, a pre-balancing procedure 166, 168 may be initiated. In order to determine whether the pre-balancing procedure is necessary, the voltage of each energy storing device in the series string is determined, and a voltage difference, $V_D$, between the highest and lowest sampled voltage values is determined.

At the initiation of the pre-balancing procedure, a voltage setpoint is established which is equivalent to the highest voltage value previously determined by sampling the potential of each energy storing device. Pre-balancing the series string of energy storing devices or cells is accomplished using substantially the same methodology for balancing cell potentials that is effected near the completion of the charging procedure. The duration of a typical pre-balancing procedure is on the order of 30 minutes or until the cell current reaches a value indicating that the end of constant voltage pre-charging has been reached, which is depicted as the maintenance current setpoint in FIG. 10.

At the completion of the pre-balancing procedure, all of the energy storing devices within the series string are at approximately the same potential. It is noted that a relaxation procedure may be initiated at the completion of the pre-balancing procedure and prior to the charging procedure. The relaxation procedure involves removing the supply of charge current to the energy storing devices during the relaxation period, which typically has a duration on the order of one or several minutes.

A typical charging procedure involves supplying 170 a substantially constant charge current 150 to the serially connected energy storing devices. In the example depicted in FIG. 10, the constant current charging phase has a duration of approximately 5 hours or until a cell balancing setpoint is reached 172. The voltage 152 of the energy storing device characterized in FIG. 10 increases over time until the cell balancing setpoint is reached, at which time a cell balancing procedure is initiated 175. It is noted that, in general, the balancing or equalization procedure is effected at any time when the energy storing device voltage 152 exceeds a high voltage setpoint, which may occur when a charging procedure is accidentally initiated for fully charged energy storing devices. A relaxation procedure is initiated subsequent to the completion of the cell balancing procedure, followed by termination of the charging procedure 178.

Figure 11:
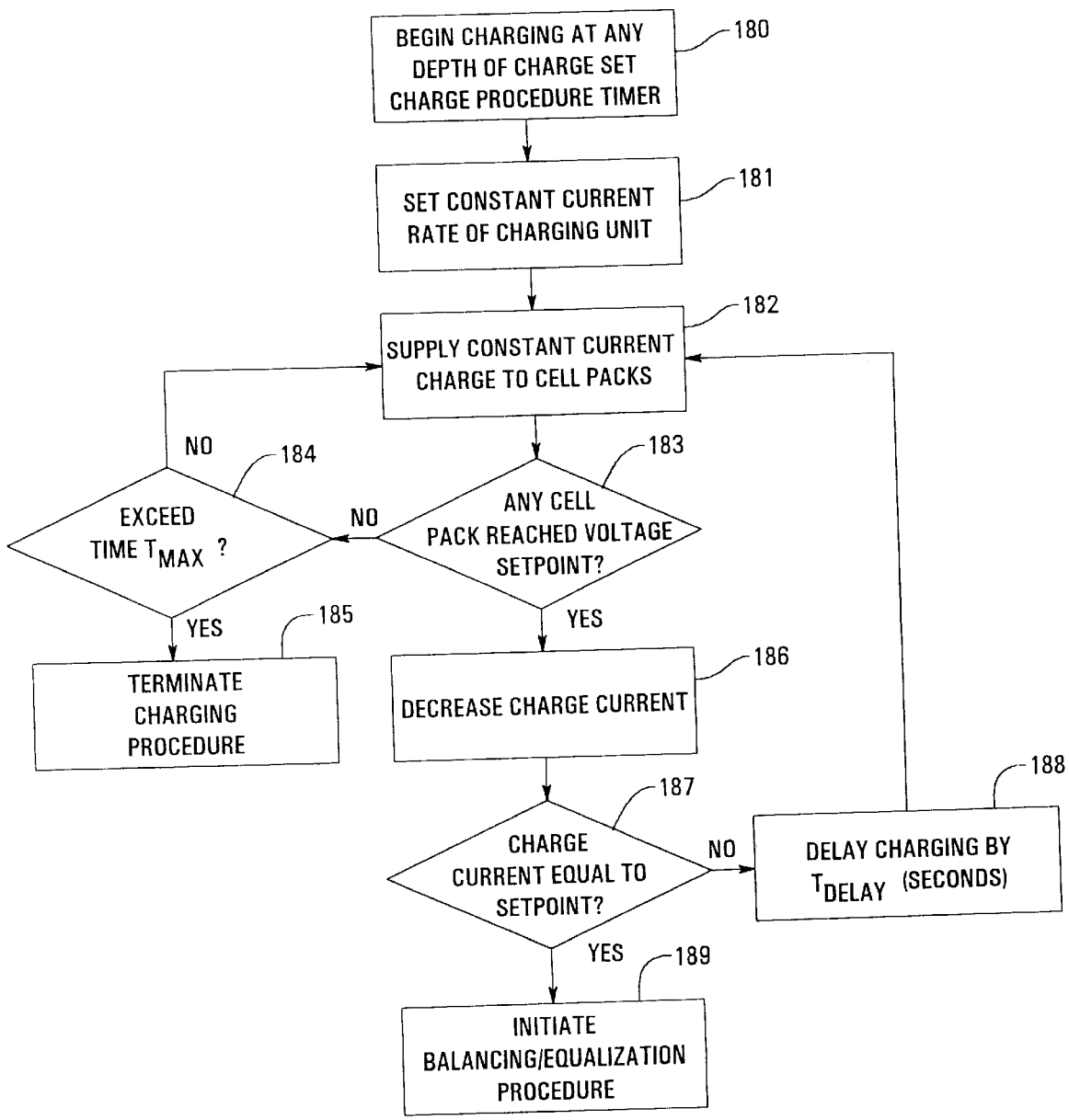
FIGS. 11–12 illustrate in flow diagram form various steps of a charging procedure and an equalization procedure, respectively, in accordance with an embodiment of the present invention.
Figure 12:
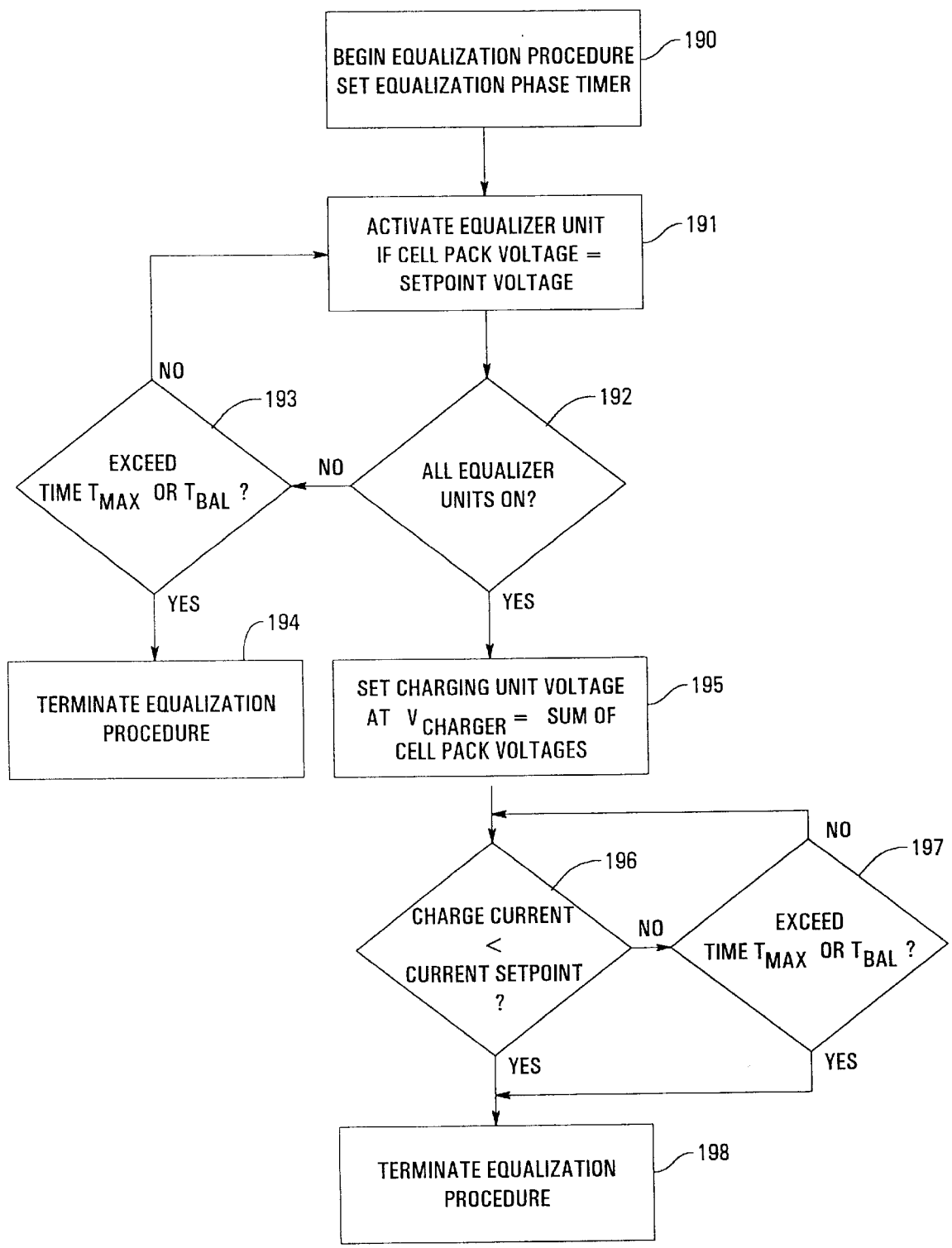

Turning now to FIGS. 11 and 12, various process steps for the charging and balancing phases of a charging procedure are respectively depicted for an energy storage module of the type shown in FIGS. 6–7. In this illustrative embodiment, it is assumed that the module includes six cell packs connected in series, and that each cell pack includes eight electrochemical cells connected in parallel. The charging phase may be initiated 180 at any time, irrespective of the module voltage state or depth of discharge (DOD). A charging procedure timer is set to a value that defines the duration of the charging procedure (i.e., charging phase and balancing phase), such as eight hours for example. A charging unit is initially set 181 at a pre-established constant current rate, followed by supplying 182 a constant charge current to the serially connected cell packs. Each of the six cell packs are monitored 183 to determine whether any of the cell packs has reached a pre-established voltage setpoint, such as a high voltage setpoint of 3.1 V.

If none of the cell packs has reached the voltage setpoint, and if the total charge time has not expired 184, constant current charging of the cell packs continues. If, however, the voltage of any of the six cell packs has reached the voltage setpoint, the constant charge current supplied by the charging unit is decreased 186 by a pre-determined amount, such as by 1 A, after a short delay 188. The short delay allows the cell voltages to stabilize after a current change. Constant current charging at the reduced current rate is resumed after the delay and the above-described steps 182–188 are repeated until a current setpoint, such as 5 A, is reached, at which time the charging procedure transitions from the charging phase to a balancing or equalization phase 189/190.

At the initiation 190 of the equalization phase, an equalization phase timer is set to a value that defines the duration of the equalization phase, such as 1 hour, for example. It is noted that the equalization phase typically commences when the voltage of all of the six cell packs reach the voltage setpoint. An equalizer unit, one of which is associated with each cell pack, is activated 191 when the cell pack voltage reaches the voltage setpoint. Until the equalizer units of all six cell packs are activated 192, constant current charging at the low current setpoint (e.g., 5 A) continues until the charge procedure timer and equalization phase timer have expired 193, at which time the equalization procedure is terminated 194.

Following activation of all six equalizer units, the charging unit transitions from a constant current charge mode to a constant voltage charge mode 195. The charge unit is set to a constant voltage, $V_{charger}$, which is equivalent to the sum of the six cell pack voltages, which in this illustrative example is approximately 18.6 V (i.e., 6 cells at 3.1 V). Constant voltage charging continues while the charging current remains above a minimum current setpoint 196 (e.g., a maintenance current level) if the charging procedure and balancing phase timers have not yet expired 197. The charging procedure is terminated 198 when either the charge current falls below the minimum current setpoint or the charging procedure or balancing phase timers have expired 197.

It can be seen that the above-described equalization methodology, in addition to providing a cell balancing capability, provides overvoltage protection for each of the serially connected cell packs. In particular, as the charge voltage of a particular cell pack approaches either a cell balancing setpoint or a high voltage setpoint, for example, the equalizer unit for the cell pack becomes active and controls the flow of charge current delivered to the particular cell pack. As such, the maximum charge voltage applied to a cell pack is limited to a voltage corresponding to the high voltage setpoint.

Figure 13:
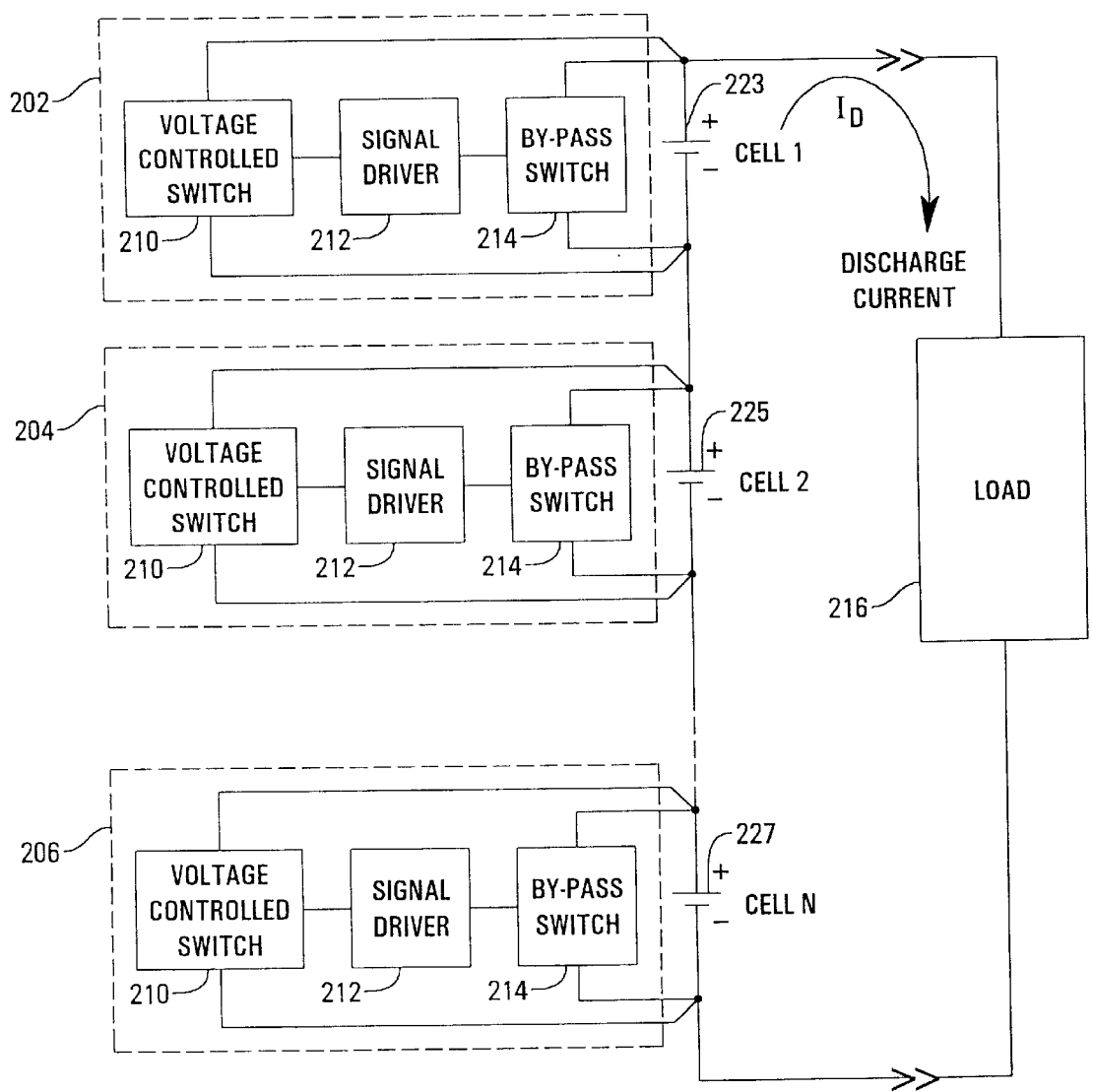
FIGS. 13–14 illustrate an alternative embodiment of equalizer circuitry.
Figure 14:
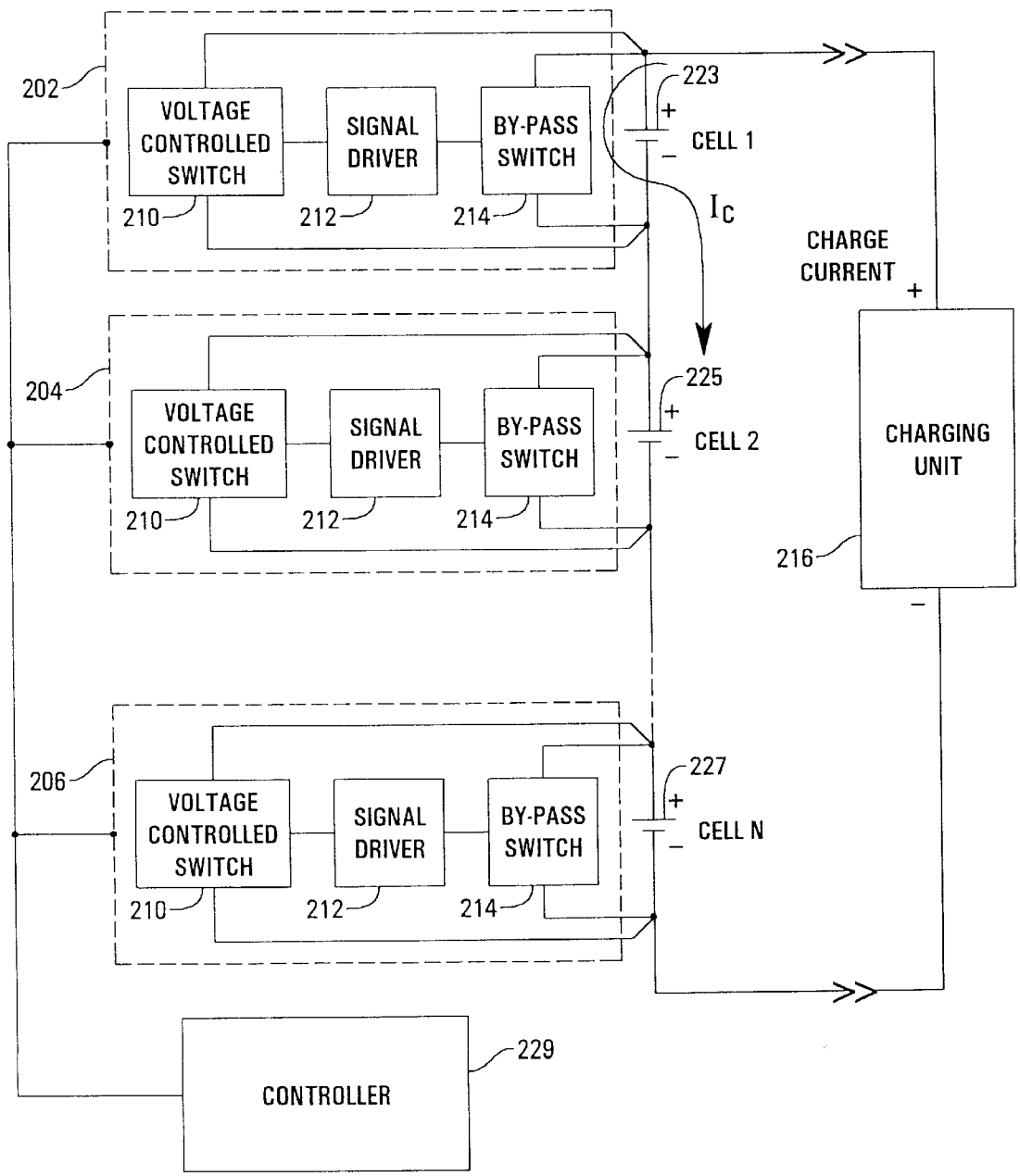

An embodiment of equalizer circuitry which operates in accordance with the principles of the present invention is shown in FIGS. 13–14. In this illustrative example, three equalizer circuits 202, 204, 206 are shown, each of which is connected to a corresponding series connected energy storing device or cell 223, 225, 227. It is understood that more than three cells may be connected in series, with each cell being associated with a corresponding equalizer circuit. The equalizer circuits 202, 204, 206 typically operate autonomously with respect to one another.

Alternatively, the equalizer circuits 202, 204, 206 may be connected to a controller 229, such as a microprocessor, which coordinates their operation and provides setpoint parameters and other information for performing equalization functions. An embodiment which includes such a controller 229 advantageously provides for the acquisition of operational and status information concerning the equalizer circuits 202, 204, 206 and cells 223, 225, 227. Such an embodiment further provides for the communication of information, including status information and control parameters, between the controller 229, which may be included within an energy storage module, and a system controller or computer, which may be provided on a battery system platform.

In FIG. 13, an energy storage system is shown producing a discharge current, $I_D$, which flows from cell-1 223 to a load 216, and returning through cell-N 227. FIG. 14 shows the flow of a charge current, $I_C$, which is produced by a charging unit 219, supplied to the series string of cells through cell-1 223, and returning to the charging unit 219 through cell-N 227. In one embodiment, the energy storage system shown in FIGS. 13–14 constitutes a high voltage battery capable of producing a discharge current, $I_D$, on the order of 400 A peak, and is particularly well-suited for high-energy consuming systems, such as electric vehicles for example.

Each of the energy storage cells, such as cell-1 223, is provided with an equalizer circuit, such as circuit 202, which operates autonomously with respect to other equalizer circuits. It is noted that the equalizer circuits 202, 204, 206 are substantially equivalent in terms of configuration and function. Each of the equalizer circuits includes a voltage controlled switch 210, a signal driver 212, and a bypass switch 214. The voltage controlled switch 210, which is connected in parallel with a corresponding cell, senses a voltage across the cell and produces an activation signal when the cell voltage reaches a pre-established setpoint, such as a cell balancing setpoint and/or an overvoltage setpoint.

The activation signal produced by the voltage controlled switch 210 is transmitted to a signal driver 212 which produces a control signal having a frequency that varies in proportion to the magnitude of the activation signal. In response to the control signal produced by the signal driver 212, a bypass switch 214 diverts excess charge current through the bypass switch 214 to control the amount of charge current supplied to the cell. The control signal produced by the signal driver 212 modulates the bypass switch 214 to control the flow of charge current to the cell so as to stabilize the cell voltage at a substantially constant level.

Figure 15:
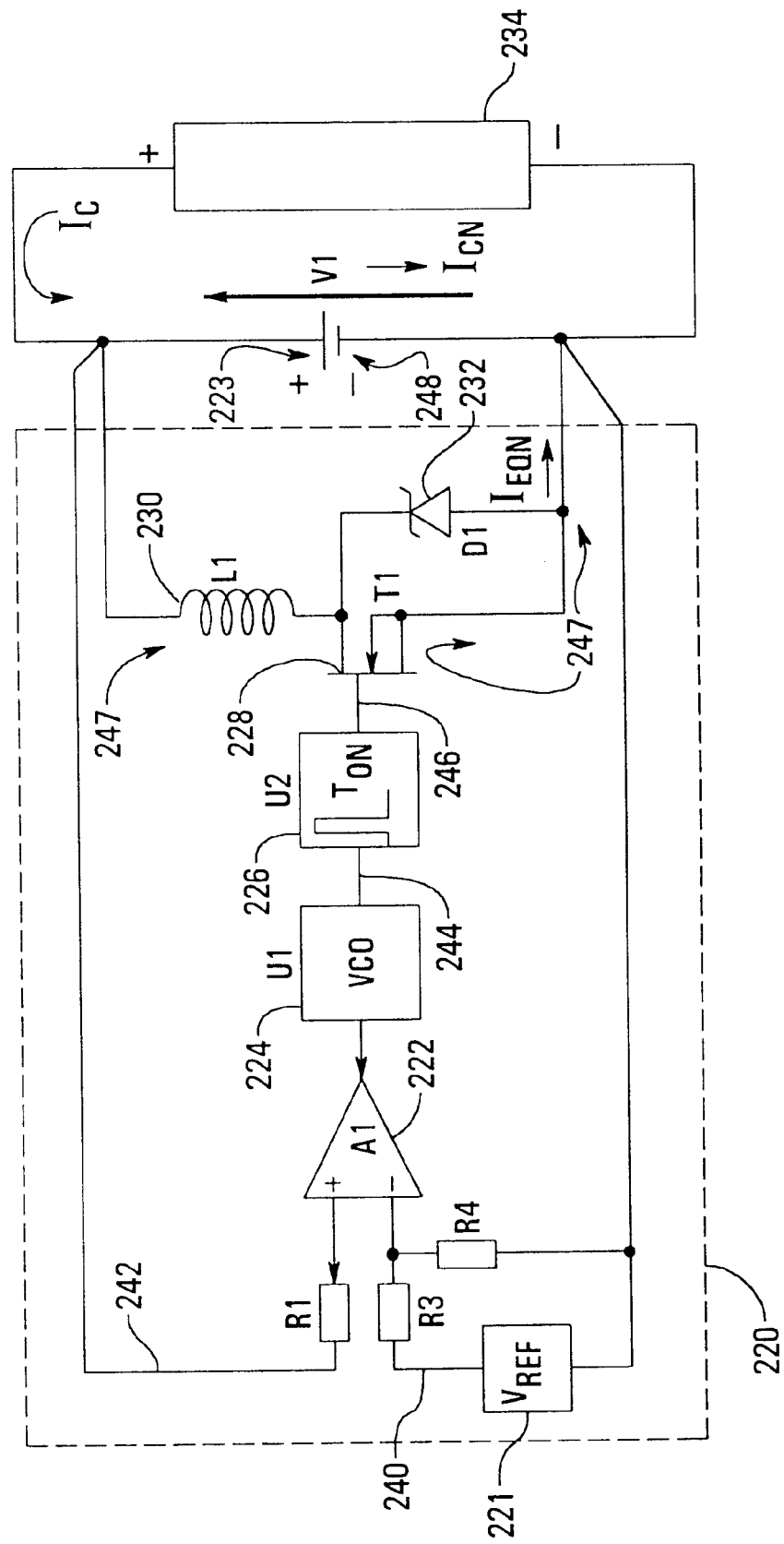
FIG. 15 illustrates yet another embodiment of an equalizer circuit.

In FIG. 15, there is illustrated in schematic form an embodiment of an equalizer circuit. Although it is understood that the circuit shown in FIG. 15 operates effectively during all phases of cell charging, such as during pre-balancing for example, the following discussion focuses on the operation of the circuit toward the end of a typical charging procedure, including transition from a standard charging phase to a cell balancing phase of operation.

The equalizer circuit 220 includes a differential amplifier 222 which senses a voltage difference between a voltage, $V_1$, across the cell 223 and a reference voltage, $V_{ref}$, applied respectively to the negative and positive inputs of the differential amplifier 222. When the voltage, $V_1$, across the cell 223 is lower than the reference voltage, $V_{ref}$, the output of the differential amplifier 222 is low. The reference voltage, $V_{ref}$, may represent the voltage at which the cell is considered fully charged (e.g., for overcharge protection) or the voltage setpoint at which an equalization procedure is to be initiated. It is noted that the reference voltage, $V_{ref}$, is adjustable between any of several reference setpoints.

When the output of the differential amplifier 222 is low, the output of the voltage controlled oscillator (VCO) 224 is low, and as such, no control signals are generated by the monostable device 226. The transistor 228, in response to a low output from the monostable device 226, operates in a non-conducting or OFF state. During the time in which the transistor 228 is in a non-conducting state, the equalizer circuit 220 remains substantially non-conductive with respect to cell charging, such that all of the charge current produced by a charging unit 234 is delivered to the cell 223.

Figure 16:
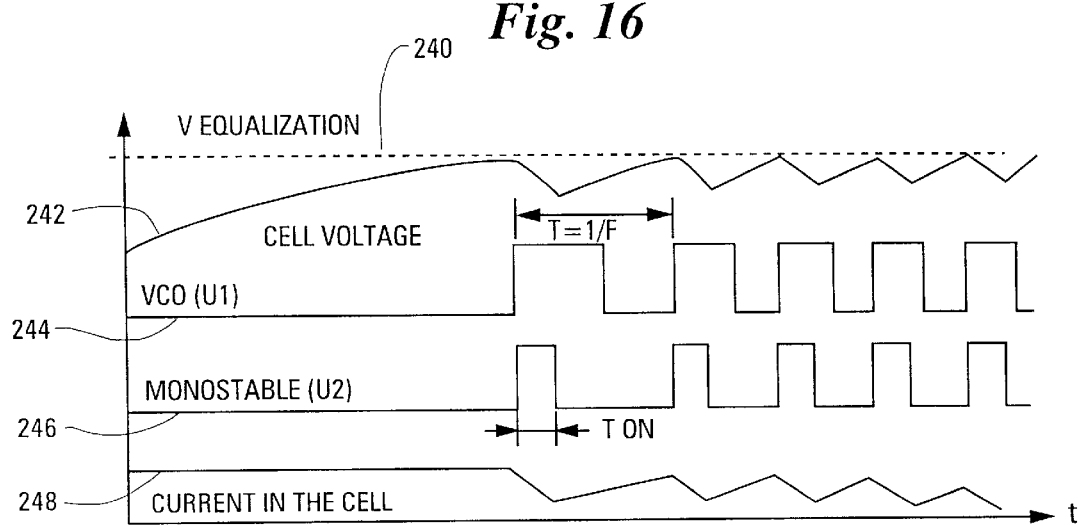
FIG. 16 illustrates various waveforms that characterize the operation of various components shown in the equalizer circuit of FIG. 15.

In further describing the operation of the equalizer circuit shown in FIG. 15, reference will be made to tire waveforms illustrated in FIG. 16. When the cell voltage, $V_1$ 242, is equal to or greater than the reference voltage, $V_{ref}$, such as the equalization setpoint voltage 240, the output of the differential amplifier 222 transitions to a high state. The magnitude of the signal produced at the output of the differential amplifier 222 is proportional to the voltage difference between the voltage, $V_1$, across the cell 223 and the reference voltage, $V_{ref}$.

The VCO 224, in response to the high state at the differential amplifier output, generates a signal 244 having a frequency which is proportional to the magnitude of the difference signal produced at the output of the differential amplifier 222. In one embodiment, the VCO 224 produces a frequency with modulation (FwM) signal having a frequency varying between 0 and 100 kHz, depending on the magnitude of the difference signal present at the output of the different amplifier 222.

In response to the signal 244 produced by the VCO 224, the monostable device 226 generates a signal 246 having a substantially constant pulse width or ON time, $T_{on}$, irrespective of the duty cycle of the signal 244 produced by the VCO 224. The transistor 228 transitions from a non-conducting state to a conducting state in response to signal, $T_{on}$ 246, produced by the monostable device 226, thereby permitting charge current to flow through the bypass current path 247 at a rate dependent on the characteristics of the inductor 230 and the zener diode 232. It is noted that the pulse width, $T_{on}$, of the control signal 246 produced by the monostable device 226 should be selected so as to avoid saturating the inductor 230 during the time period, $T_{on}$.

During the time in which the transistor 228 is operating in a conducting state, the current 248 in the cell 223 is reduced which, in turn, results in a reduction in the cell voltage 242. When the transistor 228 transitions to a non-conducting state, the current 248 in the cell increases, as does the cell voltage 242, until such time as the cell voltage 242 reaches or exceeds the reference voltage 240 (e.g., the equalization setpoint voltage). In response to the cell voltage 242 once again reaching or exceeding the reference voltage, $V_{ref}$ 240, the differential amplifier 222 produces a high output difference signal, thereby causing the VCO 224 to produce a signal 244 having a frequency which is typically lower in value than that of a previously produced signal 244. Accordingly, the period, T, of subsequent signals 244 produced by the VCO 224 is typically shorter in duration than that of previously produce signals 244.

The monostable device 246, in response to additional signals 244 of shorter time duration, T, produces more frequent control signals 246 of constant duration, $T_{on}$, which, in turn, causes the transistor 228 to transition more frequently to the conducting or ON state. It can be appreciated that the above-described high frequency switching procedure continues until such time as the cell voltage 242 approximates the reference voltage, $V_{ref}$ 240, which, in this example, represents an equalization setpoint voltage.

During an equalization procedure effected by employing the circuitry shown in FIG. 15, two predominant phases of operation are observable. The first phase concerns the duration of time in which the transistor 228 is operating in a conducting state, an equivalent circuit of this state being illustrated in FIG. 17A. The second observable phase of interest concerns the time duration in which the transistor 228 is in a non-conducting state, an equivalent circuit of this state being illustrated in FIG. 17B. FIG. 18 provides an illustration of current waveforms 262, 264, 266 respectively associated with the inductor 230, transistor 228, and diode 232 in response to the control signal 246 produced by the monostable device 226. Also, shown in FIG. 18 is a voltage signal waveform 268 depicting the relative values of the voltage of the cell 223 in response to the control signal 246 produced by the monostable device 226.

During the time, $T_{on}$, in which the transistor 228 is conducting, the current 262 in the inductor 230 increases to a peak value of $I_{pk}$. The value of the peak current, $I_{pk}$, in the inductor 230 is dependent on the time, $T_{on}$, and the cell voltage, as is characterized in Equation [2] below. It can be seen that during the period $T_{on}$, the current in the bypass current path, namely through the inductor 230 and transistor 228, increases while no current 266 passes through the diode 232.

Figure 17B:
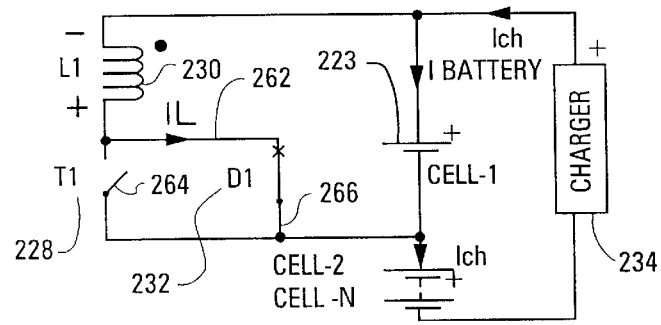
FIGS. 17A–17B illustrate depictions of a circuit equivalent to that shown in FIG. 15 in two distinct states of operation.
Figure 17A:
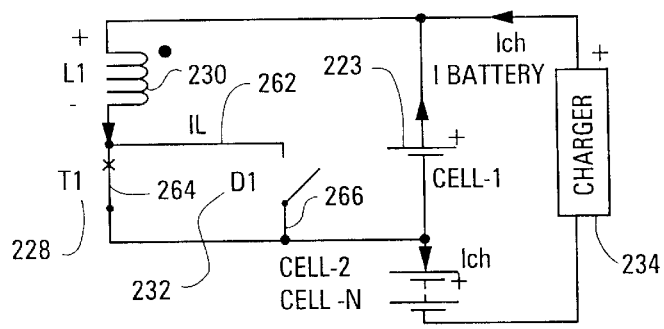
Figure 18:
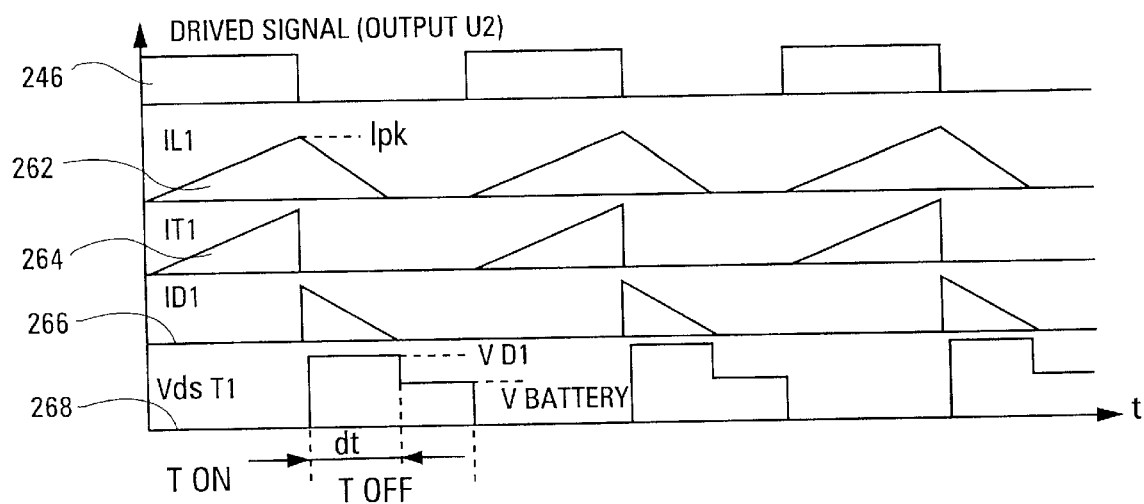
FIG. 18 depicts various waveforms associated with the circuitry shown in FIGS. 17A–17B.

The second phase of interest concerns the time during which the transistor 228 is in a non-conducting state, the equivalent circuit being shown in FIG. 17B. When the transistor 228 is in a non-conducting state during the period $T_{off}$, the polarity of the inductor 230 reverses. When the voltage across the transistor 228, $V_{ds}$, reaches the voltage threshold of the zener diode 232, the diode 232 begins conducting current, thereby allowing the inductor 230 to de-energize. When the current flow through the zener diode ceases, the voltage across the transistor 228, $V_{ds}$, is equivalent to the voltage drop, $V_1$, across the cell 223.

Charging of the cell 223 continues until the next equalization cycle is initiated in response to the control signal 246 produced by the monostable device 226. It is noted that since the pulse width, $T_{on}$, of the signal 246 produced by the monostable device 226 is fixed, the average bypass current passing through the equalization circuit 220 is proportional to the frequency of the signal 244 produced by the VCO 224, which is given by:

$$I_{L(average)} = K \cdot F \quad [1]$$

$$I_{pk} = (V_{cell} \cdot T_{on})/L_i \quad [2]$$

$$K = I_{pk}\backslash 2 \cdot (T_{on} + dt) \quad [3]$$

where, $I_{L(average)}$ represents the average current diverted through the inductor 230 which should be equivalent to the average constant current of the charging unit, $I_{pk}$ represents the peak value of the current in the inductor 230, $T_{on}$ represents the time during which the transistor 228 is conducting, and $L_i$ represents the inductance of inductor 230.

Figure 19A:
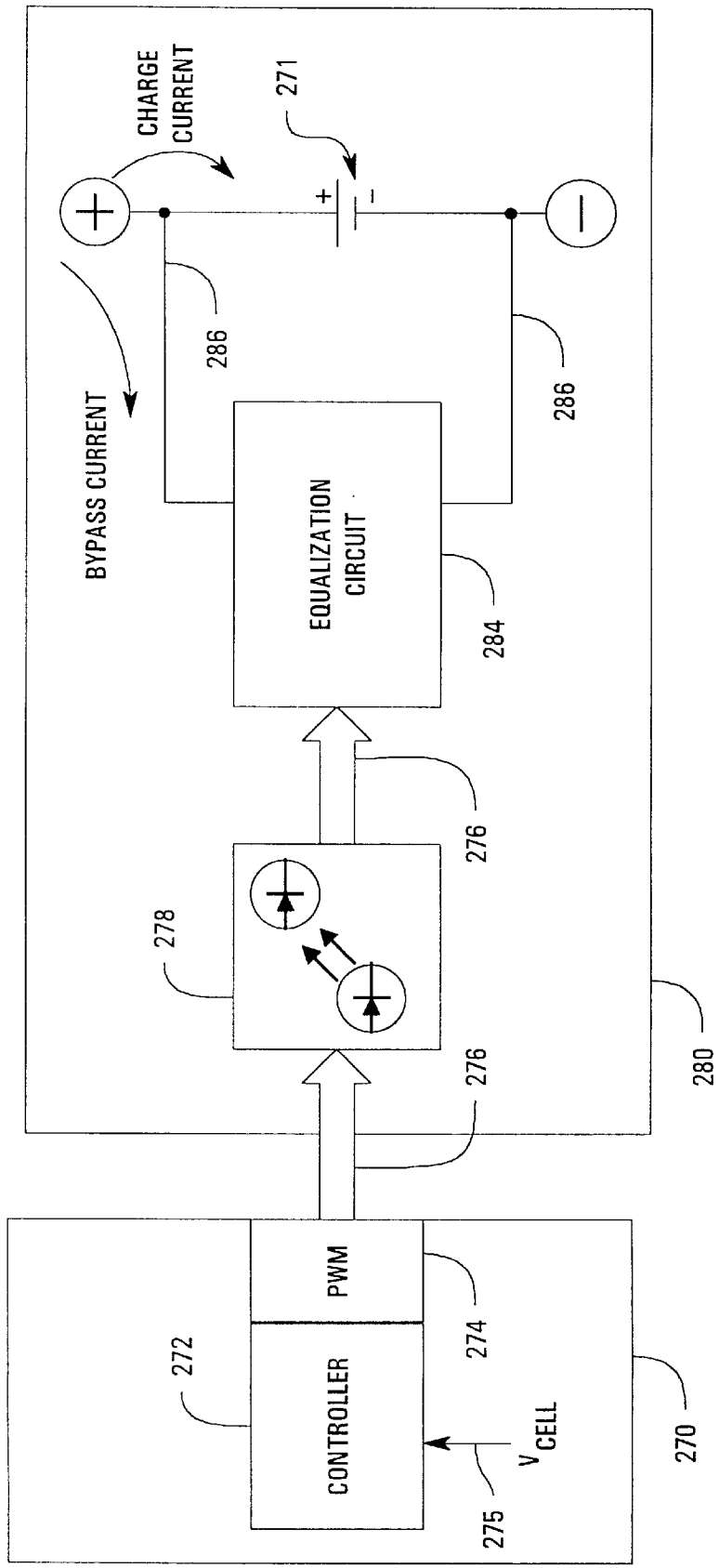
Figure 19B:
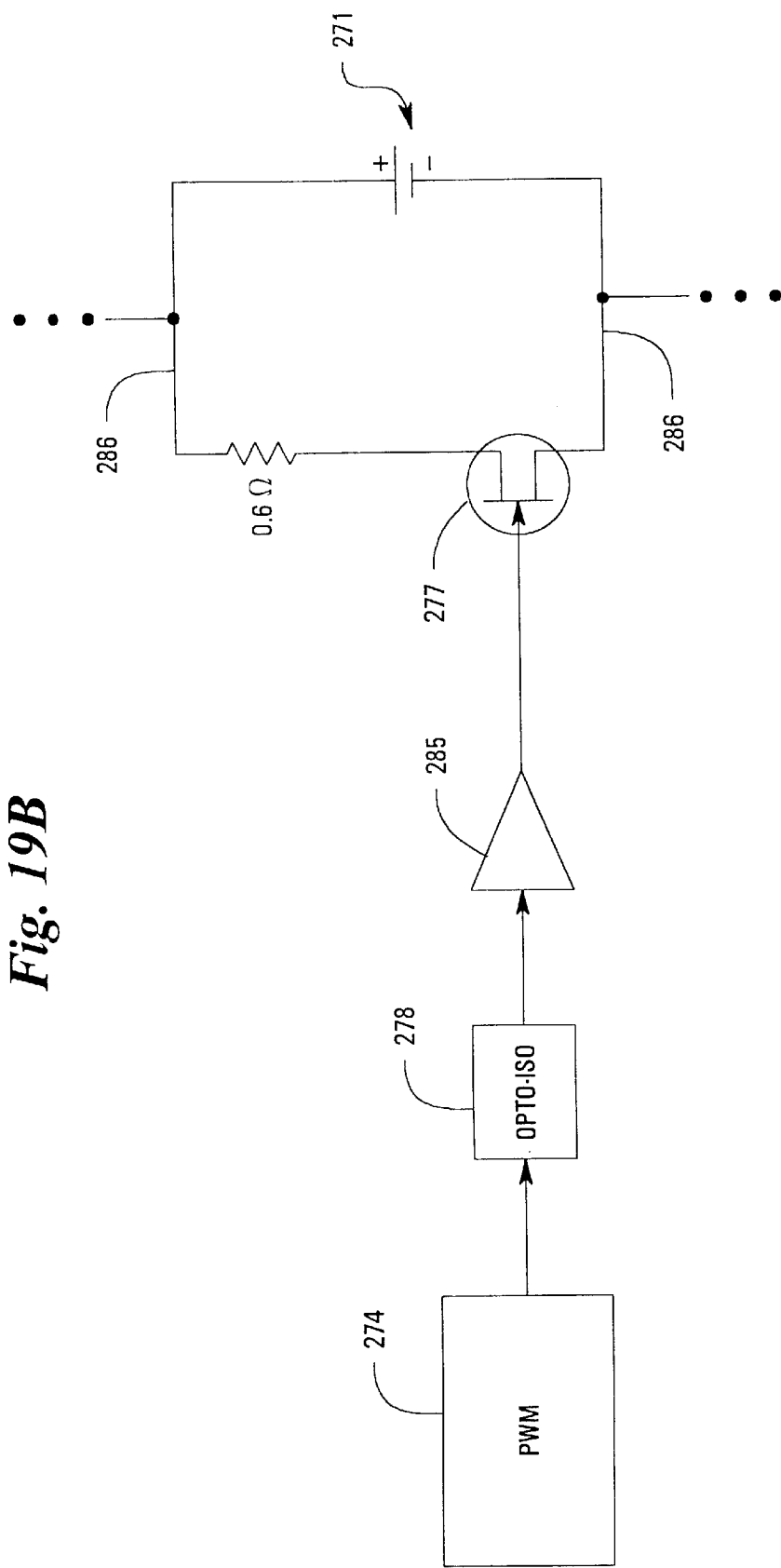

Referring now to FIGS. 19A–19B, there is illustrated another embodiment of an equalizer circuit in accordance with the principles of the present invention. In this illustrative example, the equalizer circuit includes a control board 270 which is coupled to a power board 280. It is appreciated that the control and power boards 270, 280, which are shown as two distinct boards in FIG. 19A and in the embodiment of an energy storage module shown in FIG. 7, may alternatively constitute a single board. The two-part embodiment shown in FIG. 19A advantageously provides for effective voltage isolation between the controller 272 of the control board 270 and the equalizer circuitry provided on the power board 280. A more detailed schematic of the equalizer circuit is provided in FIG. 20.

In accordance with the embodiments shown in FIGS. 19–20, a controller 272, such as a microprocessor, typically communicates with a battery platform controller (not shown) from which various voltage setpoint values and other parameters are received for purposes of conducting a charging procedure. Such parameters typically include low and high voltage setpoints, and a cell balancing setpoint, such as those shown in FIG. 10 for example. It is understood that the control board 270 may coordinate the operation of a single equalization circuit or any number of equalization circuits provided on the power board 280.

Each cell 271 in the series string of cells has associated with it an equalizer unit which includes analog-to-digital (ADC) circuitry 279 for converting an analog voltage signal indicative of cell potential to an equivalent digital voltage signal 275. In one embodiment, the ADC 279 is accurate to +/−1 LSB of 12-bits or 0.027%, corresponding to +/−1 mV. The digitized cell voltage signal, $V_{cell}$ 275, for each cell 271 is input to the controller 272. The controller 272 compares a pre-set voltage parameter with the cell voltage signal 275 and computes a difference value indicative of the voltage difference between the cell voltage, $V_{cell}$, and the pre-set voltage parameter. The difference value is used by a pulse width modulation (PWM) circuit 274 to produce a control signal 276 having a fixed period and a pulse width (i.e., $T_{on}$) that varies in proportion to the magnitude of the difference value computed by the controller 272.

An isolation circuit 278, which includes an opto-isolation device, is provided on the power board 280, and receives the control signal 276 from the control board 270. The control signal 276 is then communicated to the equalization circuit 284. The equalization circuit 284 includes a power MOSFET transistor 277 which is modulated between conducting and non-conducting states in response to the control signal 276. A buffer amplifier 285 is typically coupled between the isolation device 278 and the power transistor 277. During a conducting state of the transistor 277, excess charge current is diverted through a bypass current path 286 to control the voltage of the cell 271 during the charging procedure.

During a non-conducting state of the transistor 277, the equalization circuit 284 remains substantially non-conductive and has no appreciable effect on the flow of charge current through the cell 271.

The PWM equalization circuitry illustrated in FIGS. 19–20 provides the opportunity to substitute digital components in place of analog components which advantageously reduces the level of noise within the circuit. As such, a digital control signal, rather than an analog signal, is transferred between the controller 272 and the equalization circuitry 284 providing for a virtually noise-free signal transmission implementation. Further, the PWM methodology permits software within the controller 272 to efficiently control the equalization circuitry provided on the power board 280.

The embodiment shown in FIGS. 19–20 thus depicts a switched-mode equalization approach in which the bypass current is switched between zero and a maximum current. The average current is determined by the duty cycle of the switching. A PWM signal determines the duty cycle. Since a transistor performs the switching task, very little power is consumed and the circuit's reliability is quite high. The switching process, however, generates noise which may require filtering to make precise measurements of certain parameters. With the voltage determinations being made by the micro-controller, very versatile software may be employed to control the Proportional-Integral-Differential (PID) loop. The predictability of the noise generated by the switching circuitry may be easily managed by the software controlled switching-mode equalization circuitry.

Figure 21:
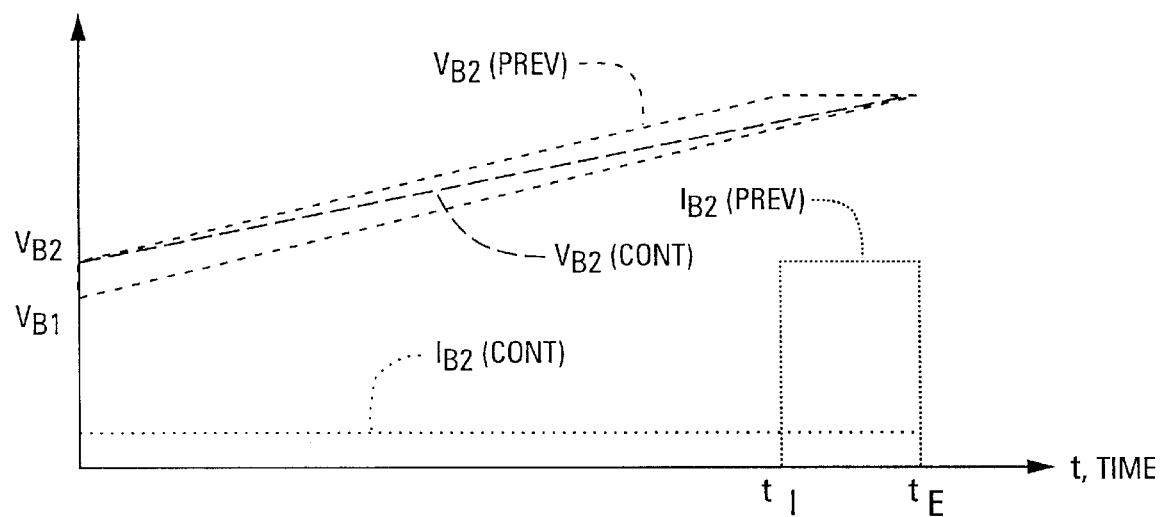
FIG. 21 illustrates in graphical form differences in charge voltage and current when employing two different equalization schemes of the present invention.
Figure 22:
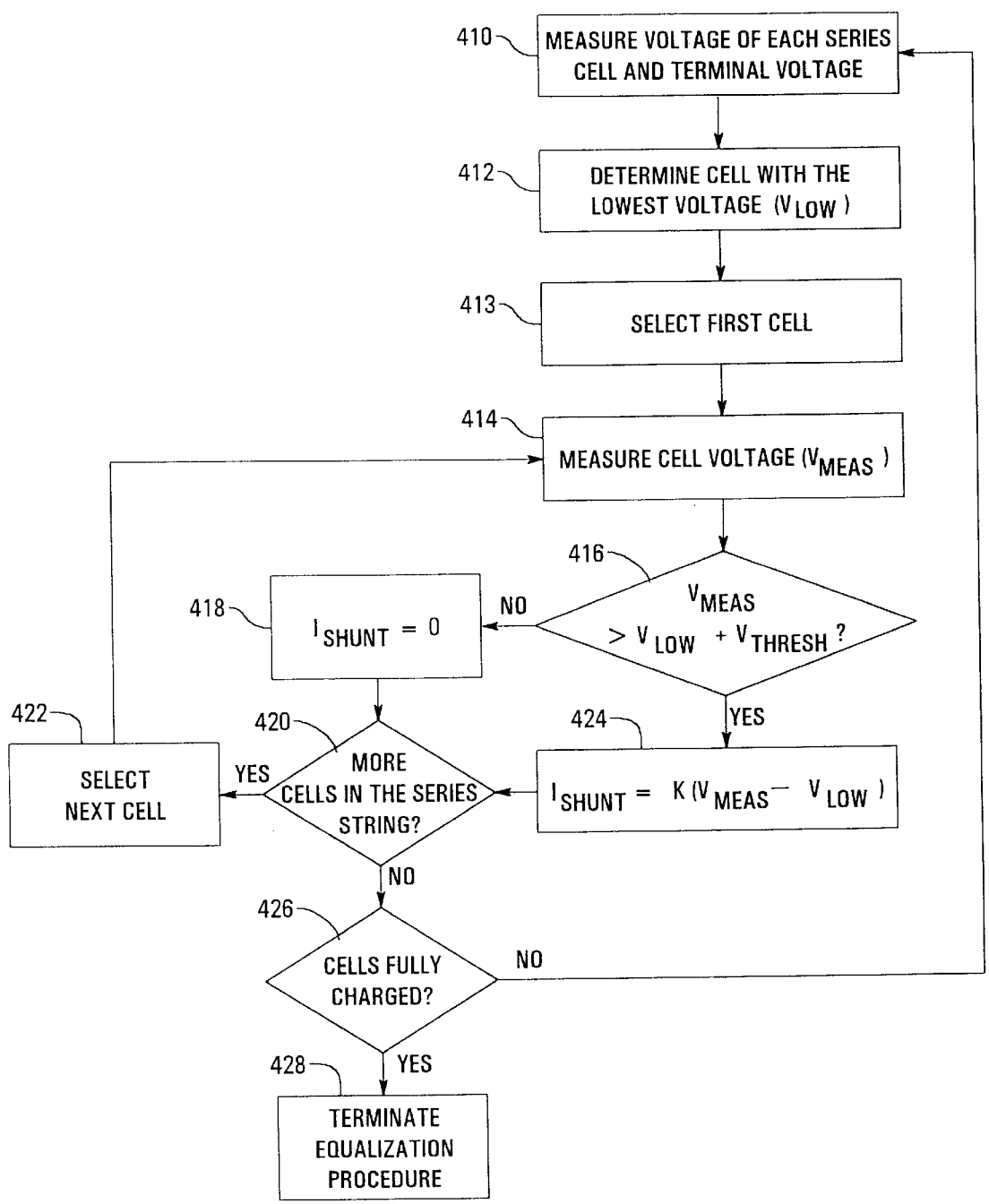
FIG. 22 is a flow chart describing various process steps taken by an equalizer circuit when implementing a continuous equalization methodology.

Concerning FIGS. 21–22, there is depicted an embodiment of a equalization methodology in which equalization occurs throughout the charging cycle. In contrast to the previously described approaches in which equalization is performed near the end of the charging cycle, the continuous equalization scheme depicted in FIGS. 21–22 takes advantage of the entire duration of the charging cycle and effectively spreads the total energy associated with shunting bypass current over a significantly longer time period in comparison with the previously described approaches. As a result, the amount of shunt current per unit time is significantly smaller, as is the power consumed per unit time during cell equalization. The reduced power requirement associated with this low current equalization approach results in reduced heat generation and typically a reduction in the cost of the electronic components.

For example, in accordance with a procedure in which equalization for a given energy storing module occurs in the last 15 minutes of an 8 hour charge cycle, much of the power supplied by the charger during equalization is dissipated as heat by the equalization circuitry. The maximum power consumption can be significant, such as on the order of 120 W for a single multiple-cell energy storing device. The low current equalization approach provides for a significantly reduced maximum power consumption, such as on the order of 12 W for a single energy storing device. Moreover, if the cells of the energy storing device are well-balanced, the power consumption can be further reduced, such a to approximately 1 W per module.

Referring to FIG. 21 in greater detail, voltage and current curves are plotted for two series connected cells subjected respectively to the previously described equalization procedure and a continuous equalization procedure. It can be seen from FIG. 21 that the series connected cell having the lower voltage, $V_{B1}$, charges at the same rate using either procedure. The cell with the higher voltage cell, $V_{B2}$, initially charges faster and with higher equalization current, $I_{B2(prev)}$, using the previously described equalization procedure. When employing a continuous equalization procedure, it can be seen that the voltage, $V_{B2(cont)}$, of the higher voltage cell increases more consistently, and with a lower equalization current, $I_{B2(cont)}$. It is noted that the area under each current curve ($I_{B2(cont)}$, $I_{B2(prev)}$) is the same, indicating that the total amount of energy dissipated using either method is the same. However, FIG. 21 demonstrates that the total energy associated with the continuous equalization approach is spread over a greater duration of time, thereby reducing the power dissipation requirements of the equalization circuitry.

FIG. 22 describes in flow chart form one embodiment of the continuous equalization procedure characterized in FIG. 21. Initially, the voltages on each node of the series string of cells and the terminal nodes are measured 410. This information is communicated to a microcontroller or microprocessor that typically communicates with each of a number of energy storing modules over an intra-battery network. In a configuration in which all of the cells are contained within a single housing, it is understood that the microcontroller need not include circuitry and software otherwise required to communicate with a battery platform computer over a network.

The micro-controller determines 412 the cell having the lowest voltage, $V_{low}$. A first cell of the series string is then selected 413, and the voltage, $V_{meas}$, of the selected cell is measured 414. If the cell's voltage, $V_{meas}$, is greater 416 than $V_{low}$ plus a threshold voltage, $V_{thresh}$, the microcontroller transmits a control signal to the first cell's equalization circuit causing the circuit to shunt some of the charge current around the first cell. The control signal may, for example, be a PWM signal or an analog-to-digital converted signal.

The amount of charge current, $I_{shunt}$, diverted by the first cell's equalization circuit is given by: $I_{shunt}=k(V_{meas}-V_{low})$, where k is a constant associated with the anticipated energy to be bypassed and remaining charge time. Based on past performance, the capacity of the cell can be calculated and the value of $I_{shunt}$ can be adjusted accordingly to a value ranging between $I_{shunt}=0$ and $I_{shunt}=I_{max}$. It is noted that the threshold voltage, $V_{thresh}$, is required to accommodate a small voltage imbalance that typically exists between the cells. Slight differences in cell voltages can arise from several sources, such as noise and incoming power variations. If these small voltage differences are ignored, the equalization circuitry will inappropriately operate so as to continually discharge and charge the cells.

If the first cell's voltage, $V_{meas}$, is not greater than $V_{low}+V_{thresh}$, no charge current is shunted 418. The next cell of the series string is selected 422, and the comparison and shunting control steps 414, 416, 418, 420, 422, 424 are repeated until all of the cells within the series string have been polled. If all of the cells are fully charged 426, the charging and equalization procedures are terminated 428. If not, the above-described equalization steps are repeated for the series string until such time as all of the cells are fully charged.

Figure 23:
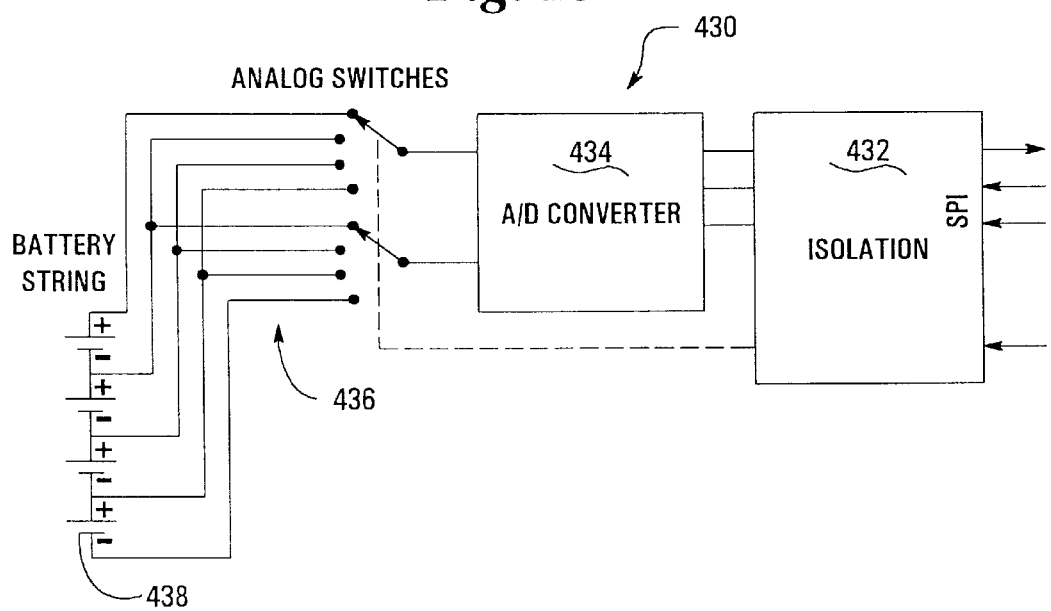
FIG. 23 is an illustration of a high-precision voltage measuring circuit for use with series connected electrochemical cells.
Figure 24:
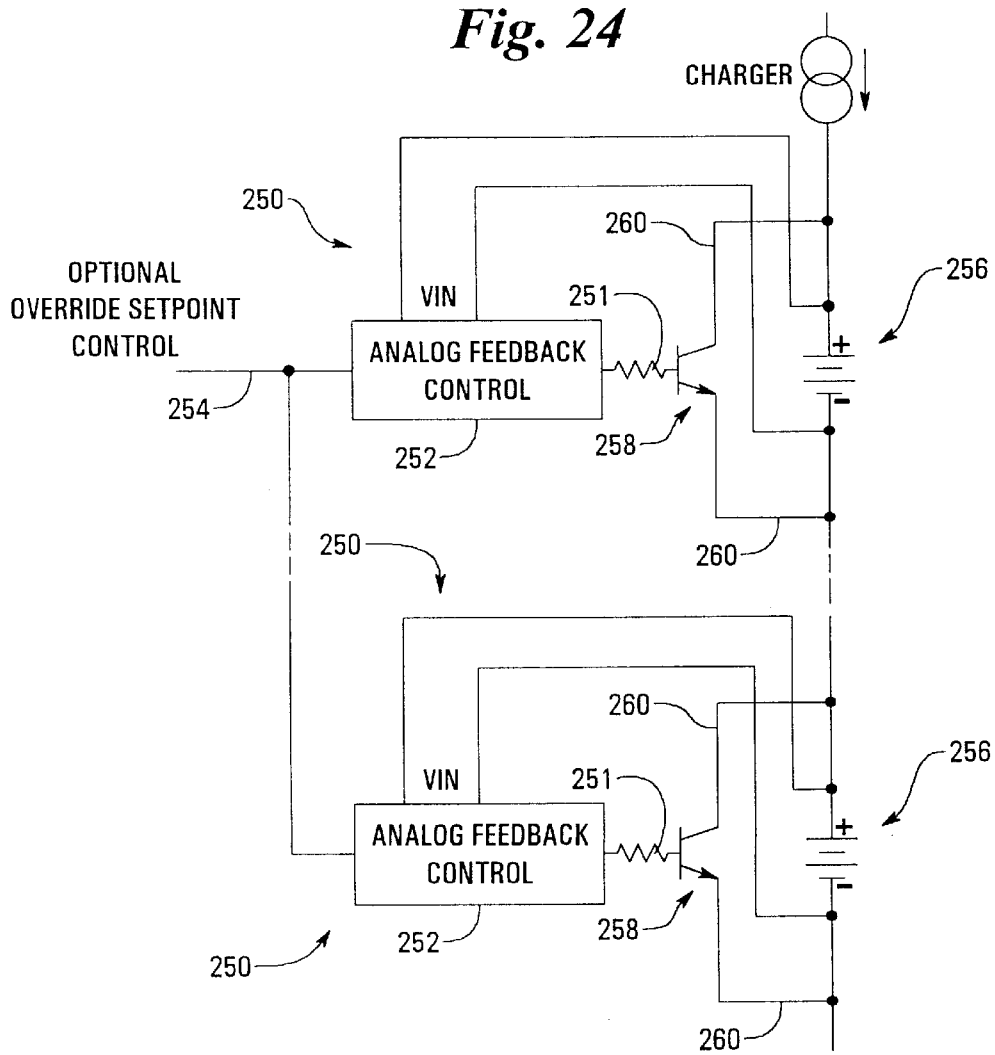
FIGS. 24–27 illustrate an embodiment of a linear mode equalizer circuit.
Figure 25:
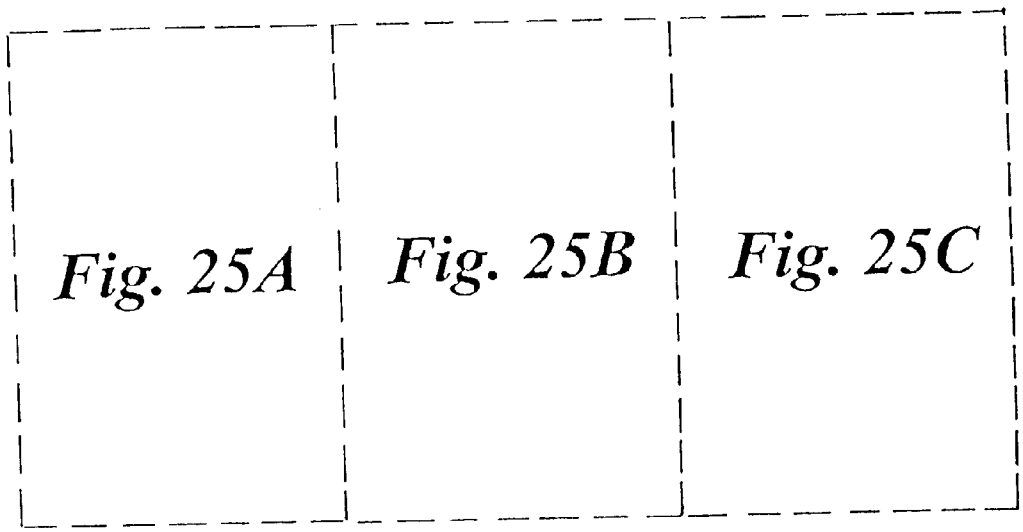
Figure 25A:
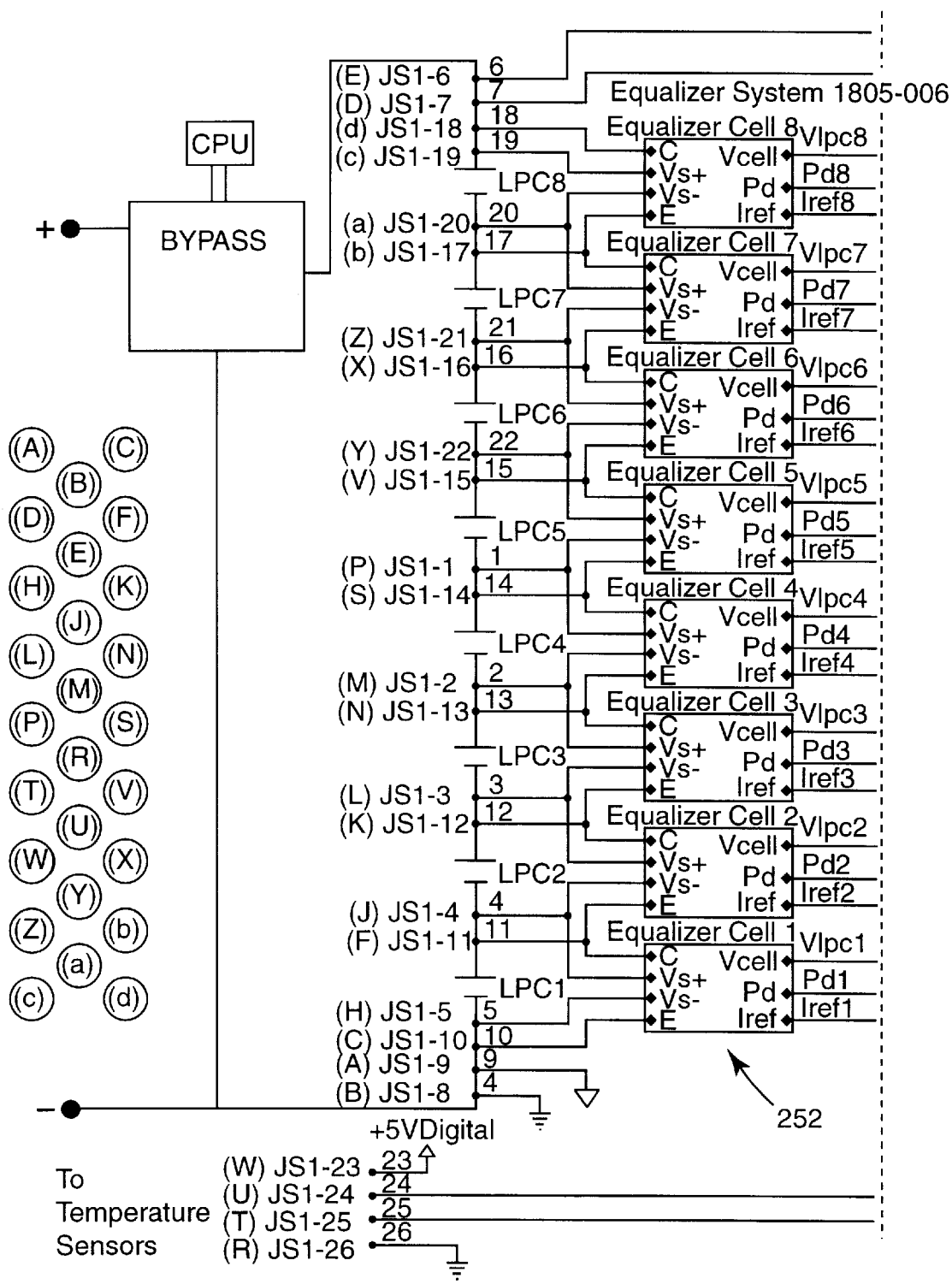
Figure 25B:
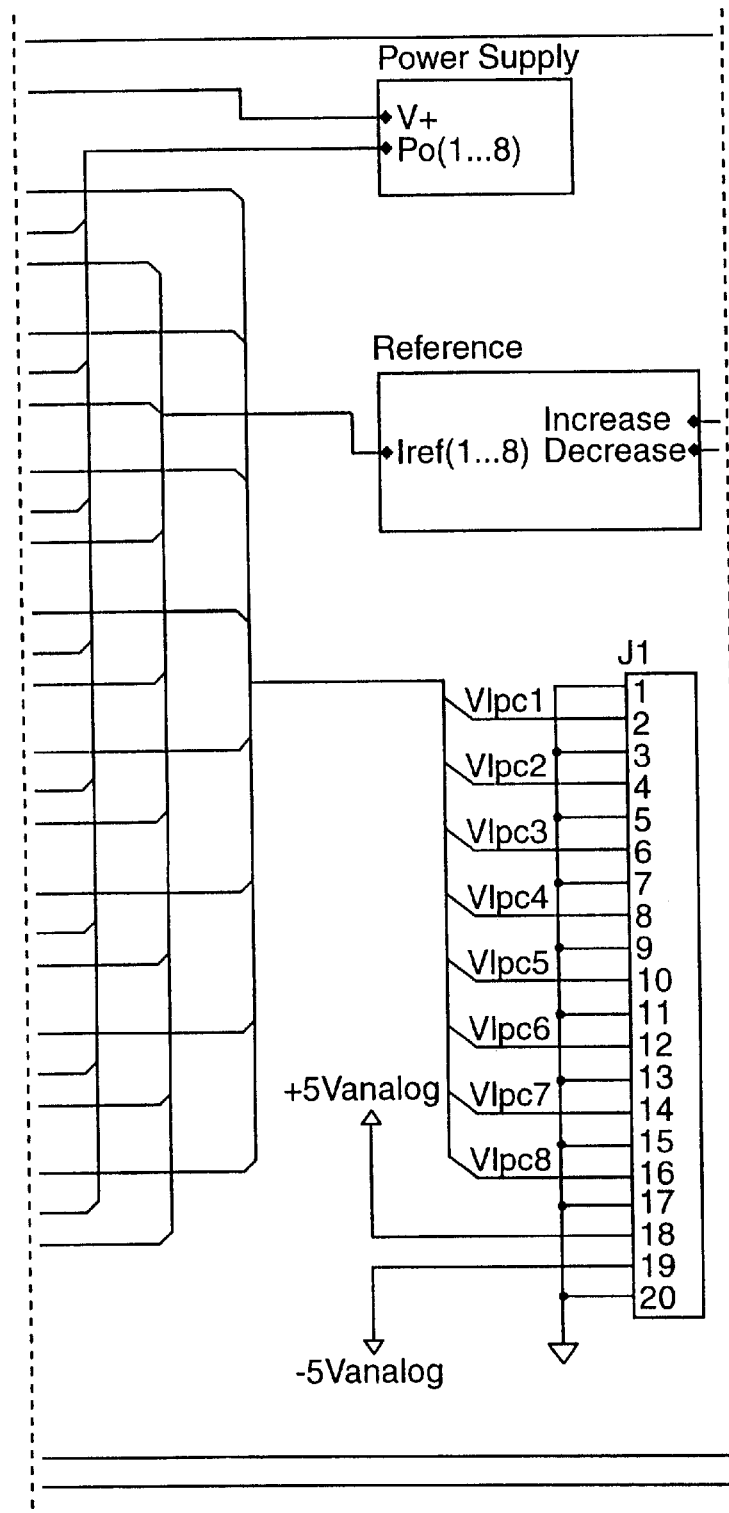
Figure 25C:
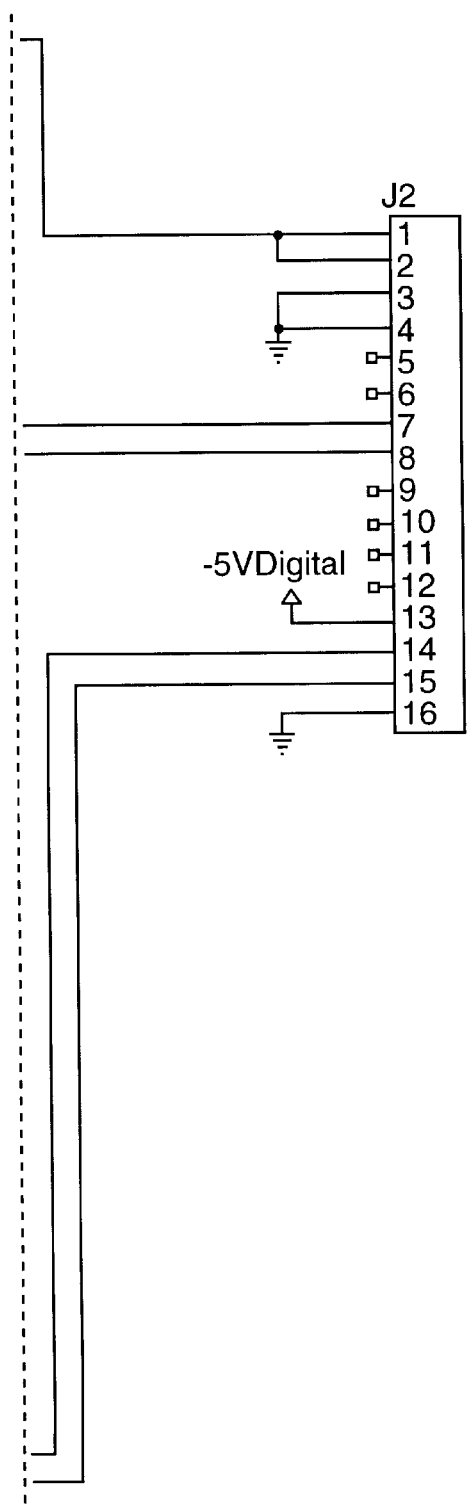
Figure 26:
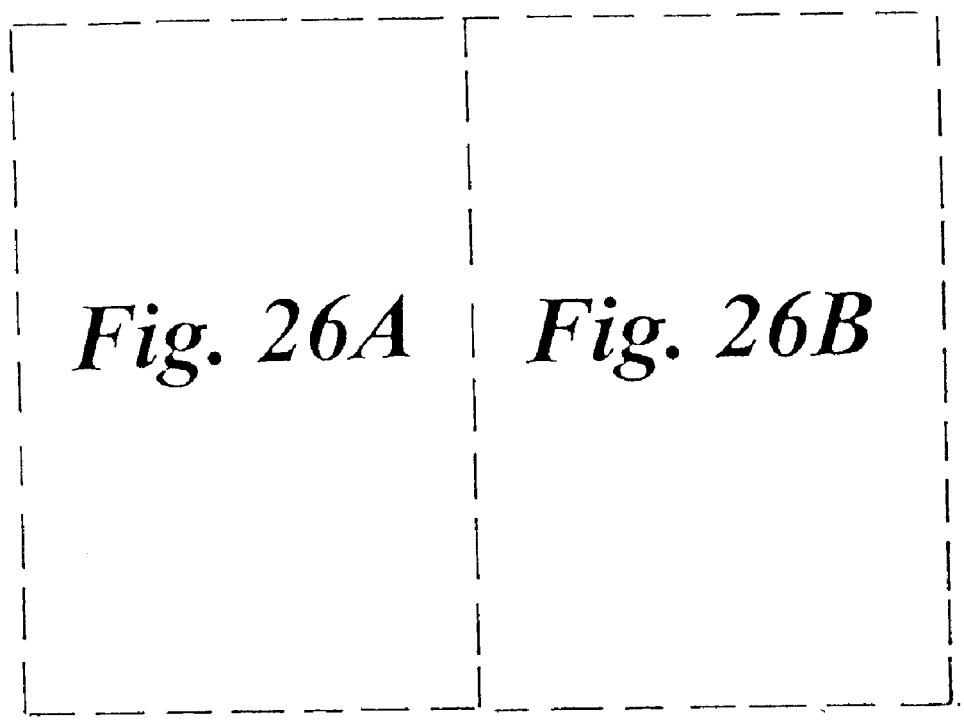
Figure 26A:
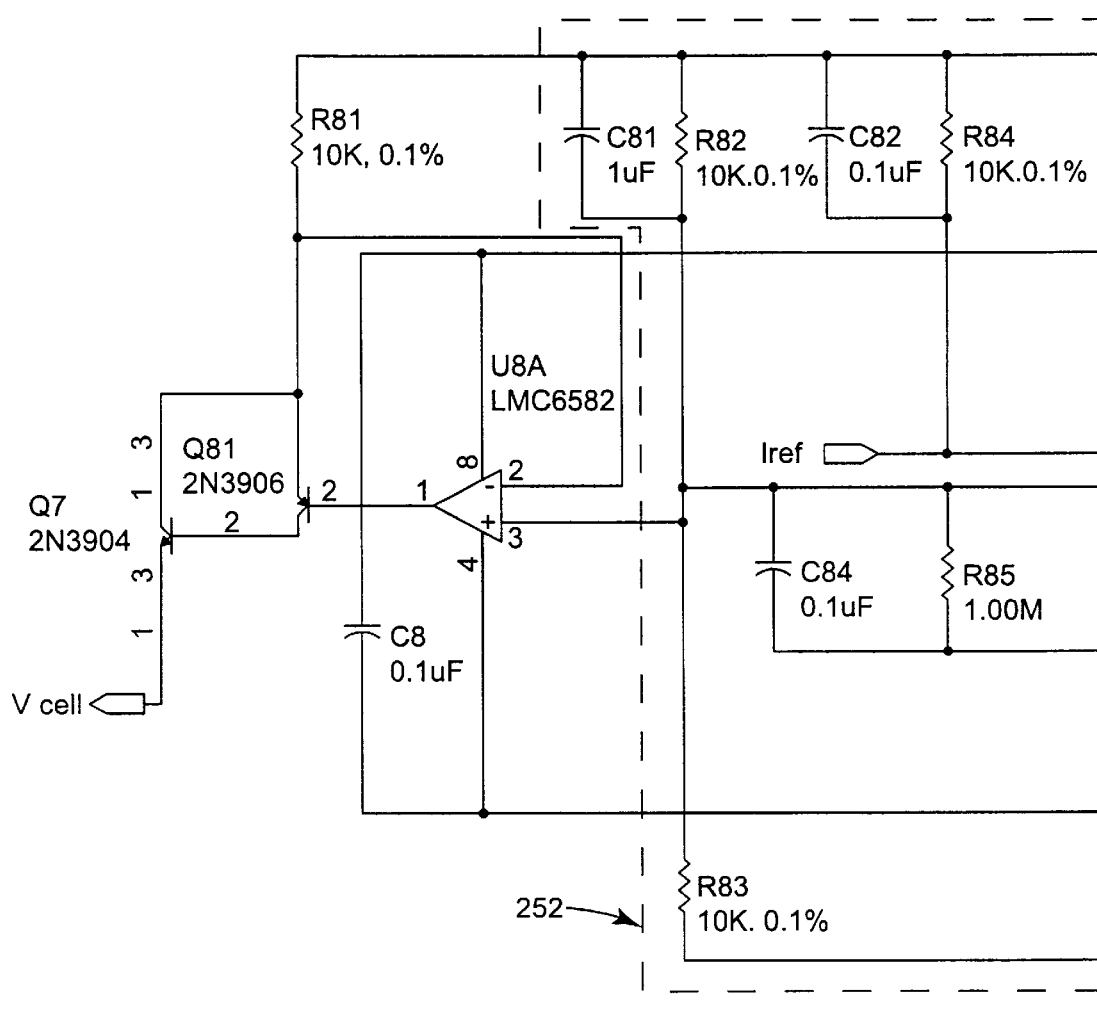
Figure 26B:
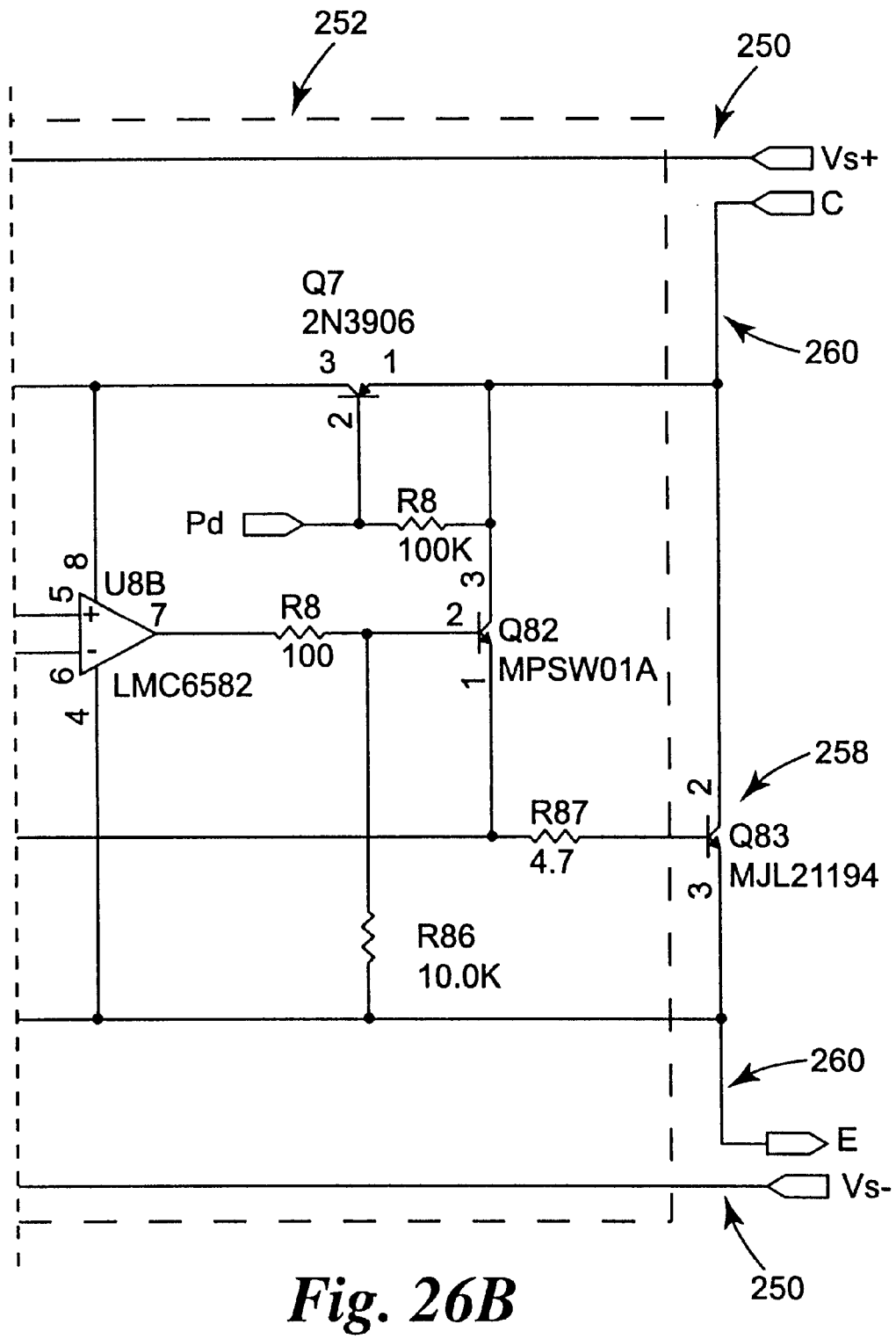
Figure 27:
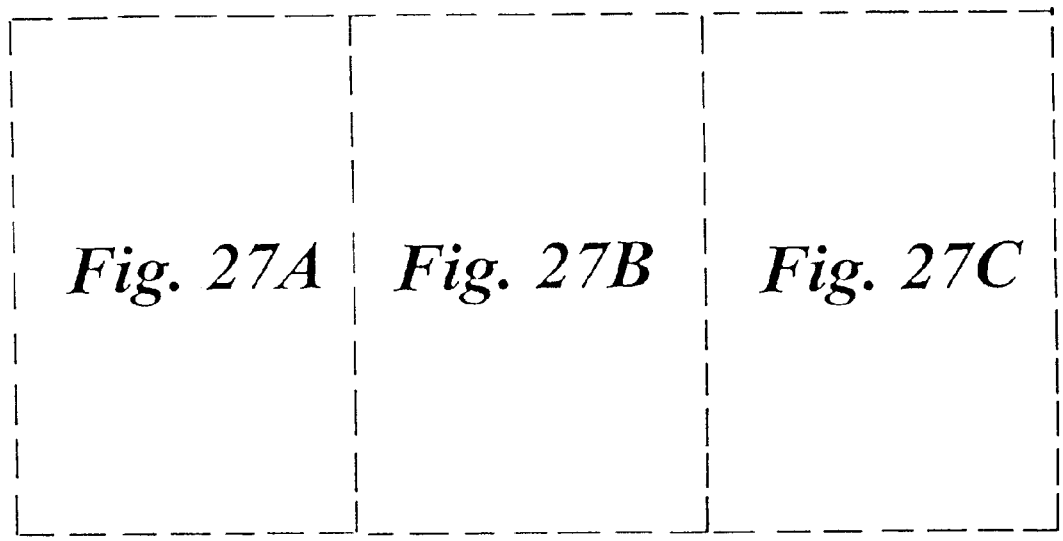
Figure 27A:
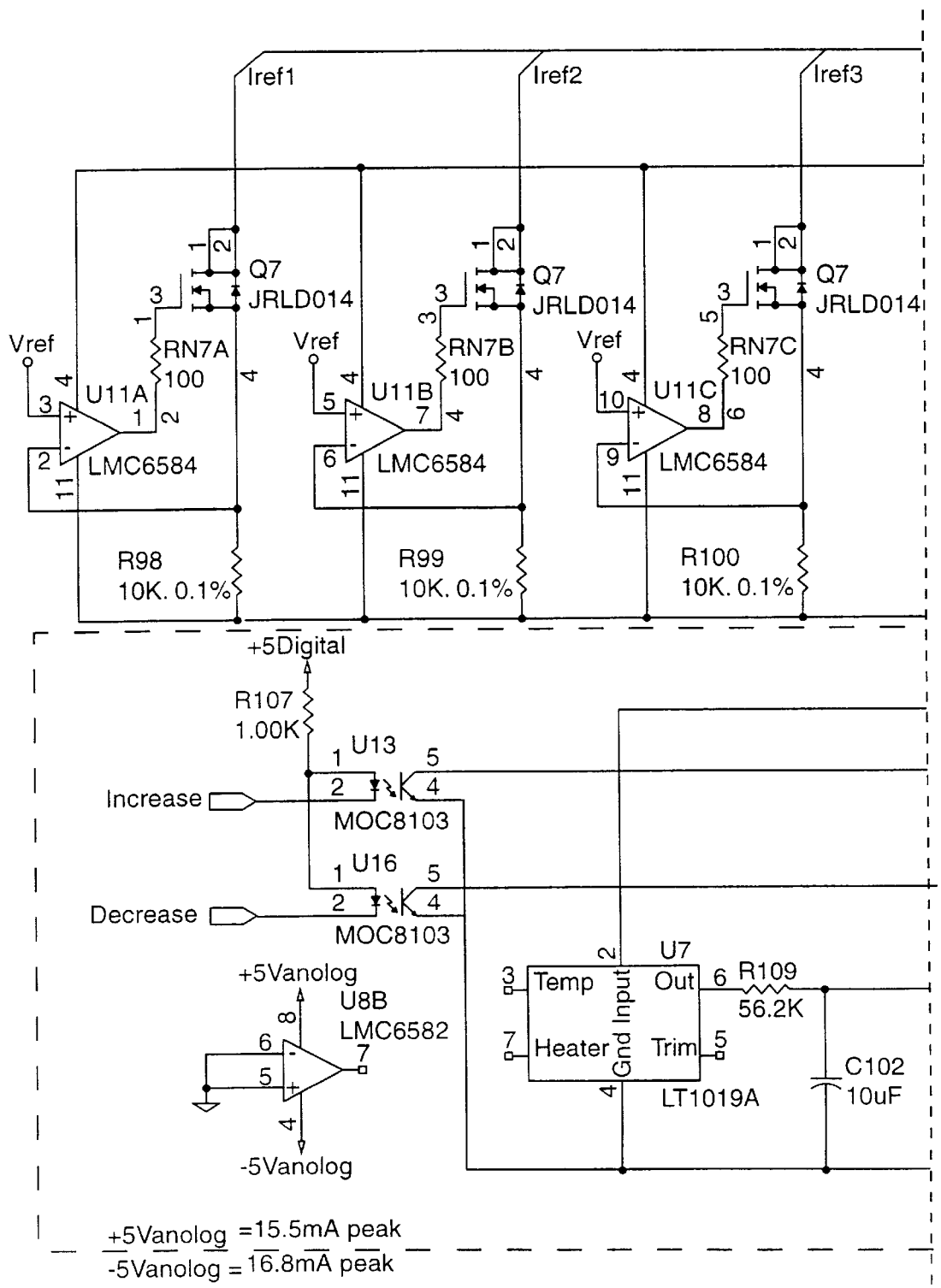
Figure 27B:
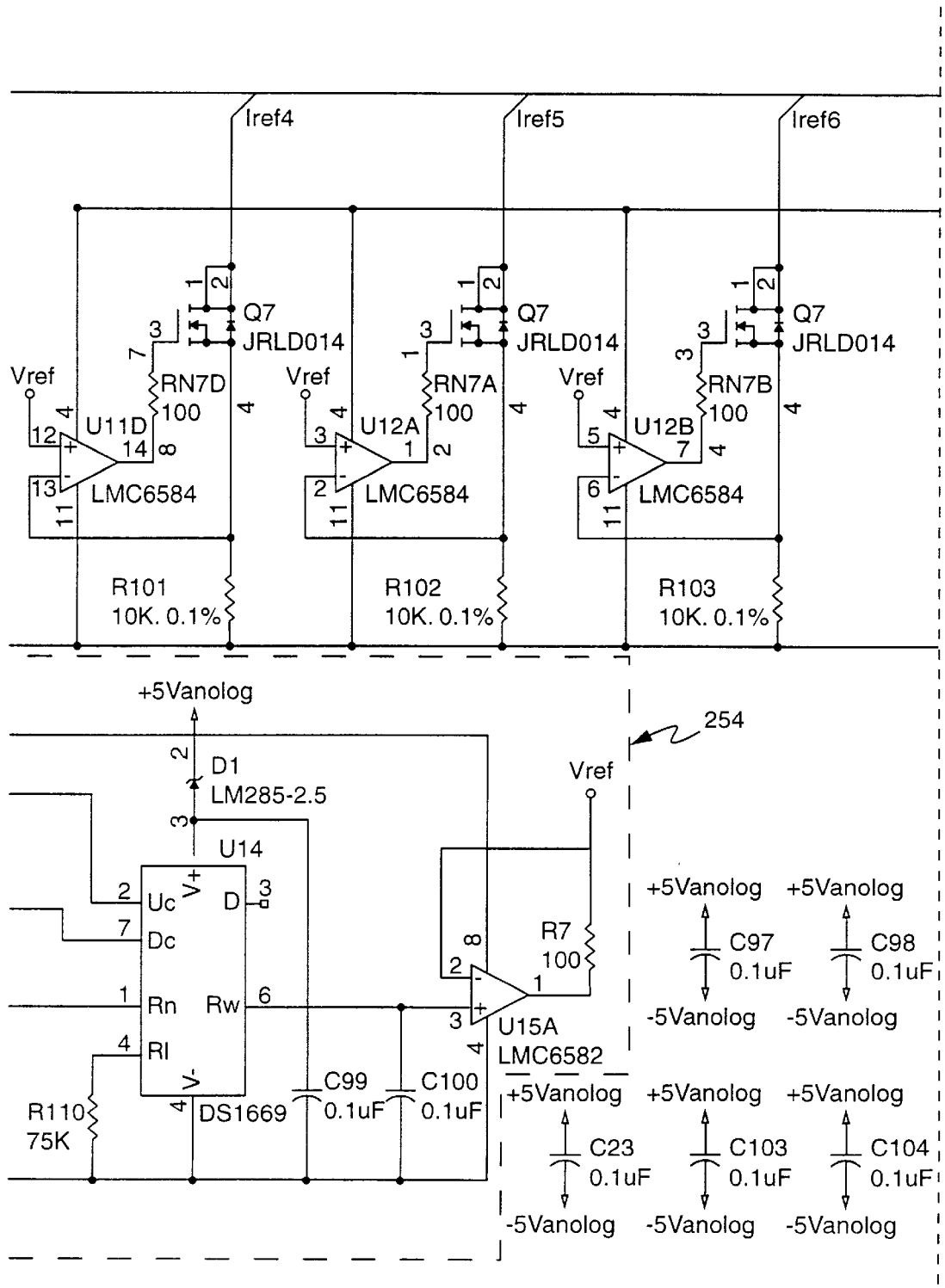
Figure 27C:
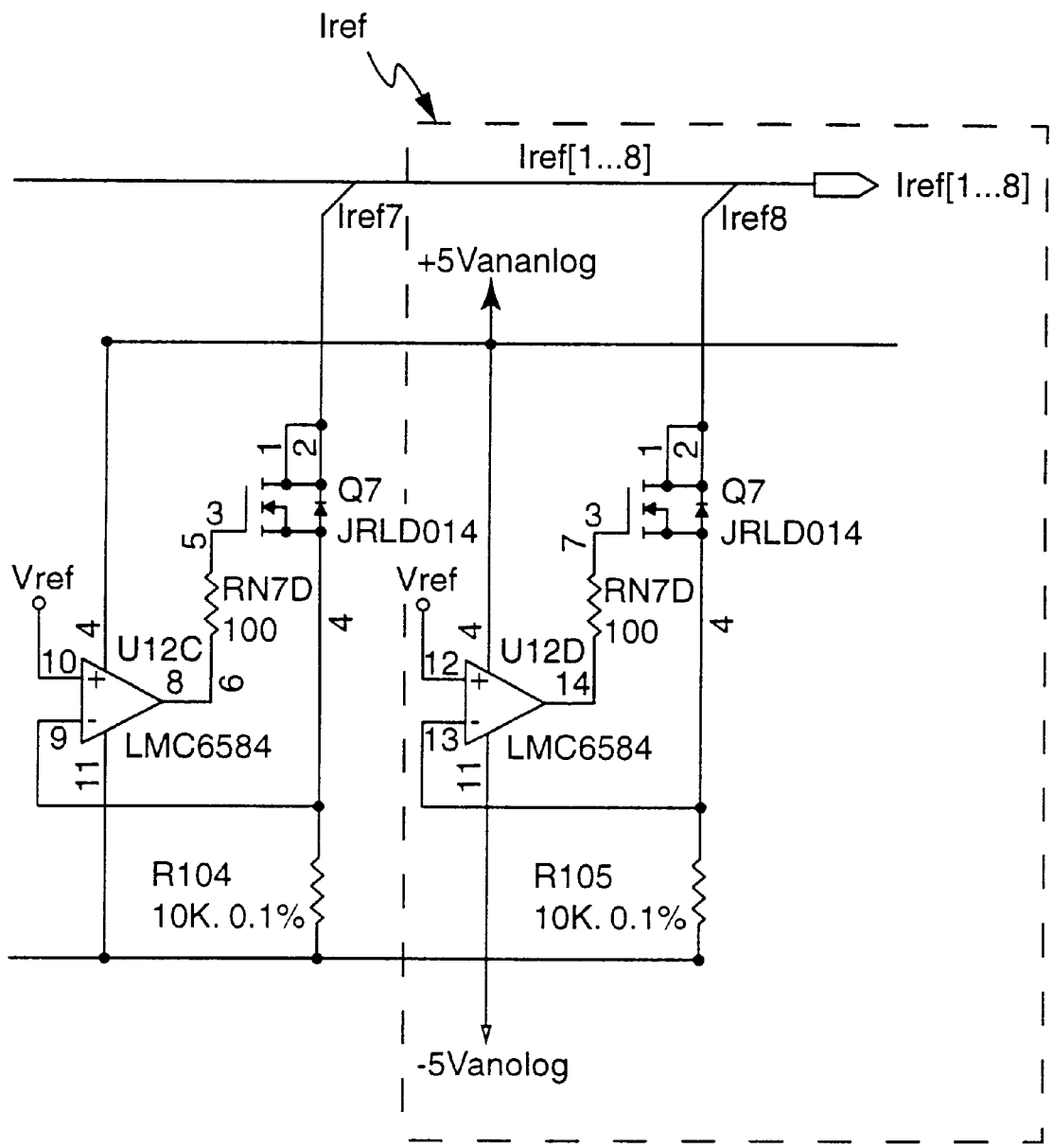

The circuit shown in FIG. 23 may be employed in an equalization scheme of the type described hereinabove to provide highly precise voltage measurements for each cell of a series string of cells. In accordance with a conventional measuring technique, a differential voltage is typically measured using a differential operational amplifier in an instrumentation amplifier arrangement with a single-ended output coupled into an Analog-to-Digital Converter (ADC).

In high-precision applications in which a very high Common Mode Rejection Ratio (CMRR) is required, the skilled artisan will appreciate that use of a differential operational amplifier in such applications is problematic. For example, in order to measure a voltage to an accuracy of 1 millivolt (0.001 V) over a 28 V dynamic range, an 89 dB CMRR is required. This is difficult to accomplish with a differential operational amplifier. The optically isolated ADC approach shown in FIG. 23 may be employed to satisfy this CMRR requirement.

The voltage measuring circuit 430 includes two analog switches 436 which operate in a differential multiplexing mode. The two X-to-1 analog switches 436 are ganged together with break-before-make characteristics to prevent high current shorting of cells when switching between cells. The ADC 434 has an effective differential input, with the inputs being low-pass filtered and protected from high voltage switching spikes. It is noted that the isolation device 432 supplies power for the ADC 434.

The analog multiplex switch 436 is used to switch both the positive and negative terminals of a selected cell 438 within the series string to the respective positive and negative inputs of the ADC 434. It is noted that the On-Resistance of the analog switches 436 is much lower than the leakage resistance of the isolation device 432. This arrangement allows the voltage of a selected cell 438 to appear across the inputs of the ADC 434 with no loss. The analog multiplex switch 436 may be modified to measure the voltage across the entire cell string by using a voltage dividing resistor network applied to the end terminals of the cell string.

The optical isolation device 432 provides a virtually infinite CMRR. The ADC 434 may be used in a serial communication arrangement which minimizes the isolation requirement. Isolation is provided on logic signals, which eliminates any errors due to the communications scheme. A serial communications standard suitable for this application is the Serial Peripheral Interface (SPI) standard as defined in the Motorola Reference Manual for the M68HC11 microcontroller.

Turning now to FIGS. 24–27, there is illustrated an embodiment of an equalizer circuit which operates in a linear mode. In a linear equalization mode of operation, the amount of power dissipated by the equalization circuitry is directly proportional to the charging current and the voltage across a cell. In one embodiment, the linear equalizer circuitry regulates cell voltages on the order of 3 V, with a charging current limited to approximately 5 A. As such, this configuration dissipates a maximum of approximately 15 W per cell.

In one embodiment, the equalizer circuitry operates autonomously and requires no external control systems. More particularly, each linear equalizer device 250 operates autonomously with respect to other equalizer devices 250 and to an external controller or processor. In another embodiment, an external controller may communicate with each of the linear equalizer devices 250. An external microcontroller, for example, may transmit an override setpoint control to all equalizer devices 250 within a module which would supersede the voltage setpoint normally used by the equalizer devices 250. Additionally, the microcontroller may also communicate temperature and voltage measurements on a data channel suited to meet the requirements of a particular application. The microcontroller may also monitor the various uses of the energy storing module and store product warranty and validation information in the case of failure.

Figure 28:
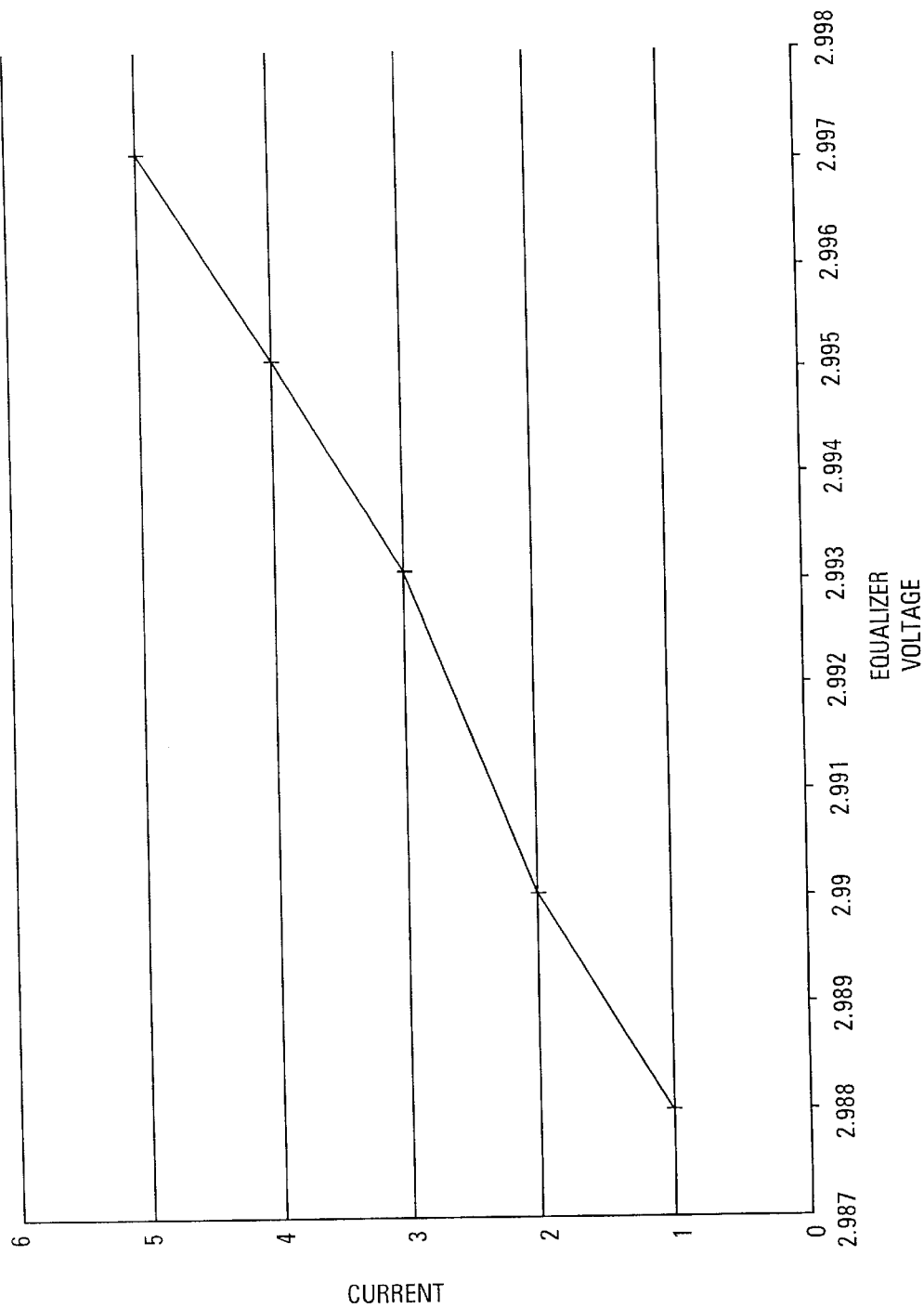
FIG. 28 is a graphical depiction of a relationship between current and voltage associated with the linear equalizer circuit shown in FIGS. 24–27.

Each of the linear equalizer devices 250 operates in a linear mode and, as such, can be viewed as a "shunt voltage regulator." The analog feedback control 252 of the equalizer device 250 monitors the voltage across an associated cell 256 on a continuous basis. The manner in which the analog feedback control 252 reacts to the voltage state of the cell is dictated by a characteristic curve, such as that shown in FIG. 28, which is very similar to a super zener diode curve. This curve characterizes the behavior of the analog feedback control 252 in response to the voltage across the cell 256.

The analog feedback control 252 includes a remote sensing voltage amplifier and a current amplifier. The analog feedback control 252, in response to the voltage state of the cell 256 (i.e., $V_{in}$), controls a power transistor 258 which moderates the flow of charge current through the bypass current path 260. In this configuration, the only component that dissipates heat is the power transistor 258.

Because the cells 256 are connected in series, this arrangement induces offset voltages between individual equalizer devices 250. An effective way of addressing this offset voltage problem is to implement an equalization scheme in which each equalizer device 250 operates autonomously from other equalizer devices 250, and is powered by the particular cell 256 to which a particular equalizer device 250 is coupled. Also, the operation setpoint is transmitted from a common reference circuit by a current source which is independent from the offset voltage. In a similar manner, the cell's voltage is transmitted to the common measuring circuit using a current source that is proportional to the cell voltage. Receiving setpoint information and transmitting voltage information using constant current sources provides the opportunity to greatly simplify the circuitry needed to fully address the offset voltage problem.

A high precision voltage reference is used to set the absolute voltage operating point. A current source is assigned to each equalization device 250. Each current source generates a constant current which is independent of the offset voltage and is proportional to the reference voltage. It is noted that the characteristic charge curve of a lithium cell, such as that shown in FIG. 5, demonstrates that the voltage across the cell is a good indication of the state of charge of the cell.

In order to maintain cells which are equally charged to approximately 1% accuracy, the voltage of individual cells needs to be matched on the order of 10 mV of a total of 3V at full charge. Therefore, the accuracy of the regulation circuitry needs to be on the order of 0.3% to ensure repeatablity during manufacture without requiring trimming adjustments. Each of the equalizer devices 250 is statically current limited to prevent destructive power dissipation. This is achieved by resistively limiting the drive current of the power stage using resistor 251.

For purposes of flexibility, the operating setpoint voltage may be varied and set at any desired level. This feature can also be used to discharge the cells to a lower setpoint, thus permitting equalization to occur in the cells during a standby mode of operation. The operating setpoint voltage can typically be varied over the useful voltage range of the cells 256.

In one embodiment, equalizer circuitry of the type described herein may be provided on an electronic board which is packaged outside of the energy storing module. The electronic board, and in particular, the power transistors and/or load resistors, may be attached to the thermal management system of the module which provides heat dissipation for the module during a charge cycle. Power and sensing signals may be transmitted to the components on the electronic board through a glass seal connector. In another embodiment, the electronic board onto which equalization circuitry is mounted is integrated within the module housing, with the power transistors and/or load resistors being mechanically fixed to the heat sink elements of the module's thermal management system.

Turning now to FIGS. 29–39, there is illustrated an embodiment of a high-current equalizer circuit particularly well-suited for use with high-energy series connected energy storing cells. In an application in which the time required to charge a string of serially connected cells (e.g., a module or battery) is of particular importance, it is considered desirable to maximize the amount of current that passes through an equalizer circuit during equalization. Increasing the current carrying capability of an equalizer circuit provides the opportunity to pass increased amounts of current through the series string of cells during equalization, which results in a concomitant decrease in the amount of time required to fully charge the cells. Passing a greater amount of bypass current through the equalization circuitry, however, results in the increased production of heat within the equalization circuit.

In many applications, the amount of current passable through a particular device is often limited by the ability of the device to dissipate heat generated by the device. With regard to the energy storing module shown in FIG. 7, for example, which includes equalization circuitry mounted on an interconnect board, heat generated by the equalization circuitry is dissipated by the module's thermal management system. In one embodiment of a high-current equalization scheme, such as that depicted in FIGS. 29–39, the equalizer circuit is capable of passing a current of at least 5 A which dissipates approximately 15 W of power.

In a module configuration in which eight equalizer circuits are employed, for example, the thermal management of the module must be capable of managing approximately 120 W (15 W×8) of total excess heat generated by the equalizer circuits. The adequacy of the module's thermal management system, therefore, is of particular importance when employing an equalization scheme which bypasses a relatively large current. An exemplary thermal management system which is capable of managing large heat loads in a thin-film energy storing module is disclosed in co-pending application Ser. No. 08/900,566 entitled "Thermal Management System and Method for a Solid-State Energy Storing Device" (Rouillard et al.), the contents of which are incorporated herein by reference.

Figure 29:
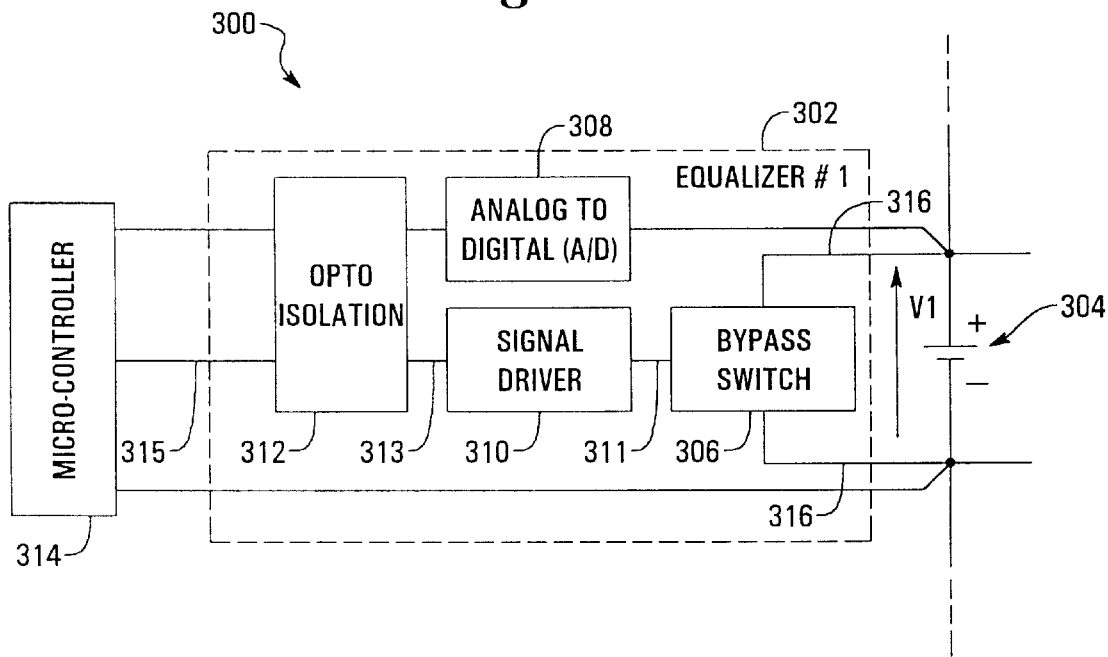
FIG. 29 illustrates an embodiment of a high-current equalizer circuit which includes an equalizer module and a micro-controller.

Referring now to FIG. 29, there is illustrated an embodiment of a high-current equalizer circuit 300 which includes an equalizer module 302 and micro-controller, such as the micro-controller 214 shown in FIG. 20. The equalizer module 302 includes a bypass switch 306 which is connected in parallel with an energy storing cell 304. A signal driver 310 controls the bypass switch 306 by communicating a control signal 311 to the bypass switch 306. An analog-to-digital converter (ADC) 308 measures the voltage across the cell 304 and converts the analog voltage signal to a corresponding digital voltage signal. The configuration of the bypass switch 306 in parallel with the cell 304 permits the cell to be charged or discharged within a wide range of current flow. An opto-isolation device 312 provides voltage isolation between the equalizer module 302 and the micro-controller 314. The equalizer module 302 is thus isolated from the micro-controller 314 which protects the micro-controller 314 from detrimental voltage levels associated with the high-voltage serial connection.

In accordance with this embodiment, the micro-controller 314 establishes a voltage setpoint or level at which the equalizer module 302 is activated. In general, the micro-controller 314 establishes a voltage setpoint which may be varied over the useful voltage range of the cell 304, and transmits the calculated PWM signal 315 corresponding to the measured voltage and voltage setpoint to the equalization module 302 at any time during a charge or discharge cycle.

The equalizer circuit shown in FIG. 29 operates as both a voltage balancing circuit and an overcharge protection circuit for the cell 304. During a charge or discharge cycle, the bypass switch 306 is typically in a non-conducting state until the voltage across the cell 304, which is measured by the ADC 308, passes beyond a predetermined voltage setpoint established by the micro-controller 314. For example, and assuming that a low voltage setpoint has been established by the micro-controller 314, the bypass switch 306 is in a non-conducting state until the predetermined low voltage setpoint is reached.

By way of further example, when the voltage across the cell 304 reaches an equalization voltage setpoint or an overcharge voltage setpoint, the controller 314 generates a PWM control signal 315 which is communicated through the opto-isolation device 312 and received by the signal driver 310. The signal driver 310, in response to the PWM control signal 315, produces a digital control signal 311 which drives the bypass switch 306. In order to maintain the voltage of the cell 304 at a constant level, the controller 314 communicates PWM control signals 315 to the equalizer module 302 to control the amount of charge current passed to the cell 304 and diverted through a bypass current path 316. It is noted that the controller 314 typically communicates with a number of energy storing modules, each of which typically includes a number of equalizer modules 302.

In accordance with an embodiment of a battery system which includes a number of interconnected autonomous energy storing modules, a battery platform computer receives cell voltage information from a processor or controller 314 provided in each of the modules. In this configuration, the battery platform computer typically polls each of the modules and acquires information concerning the voltage state of the cell's or cell packs. Using the acquired voltage information, the battery platform computer determines when, and at what voltage level, cell equalization should occur, such as at the end of a charge cycle, prior to a charge cycle, or at the beginning or end of a discharge cycle, for example. An exemplary intra-battery network which provides an infrastructure and protocol for effecting communications between a battery platform computer and a number of module computers or controllers is disclosed in co-pending application Ser. No. 08/900,928 entitled "Fault-Tolerant Battery System Employing Intra-Battery Network Architecture" (Hagen, et al.) the contents of which are incorporated herein by reference.

Figure 30:
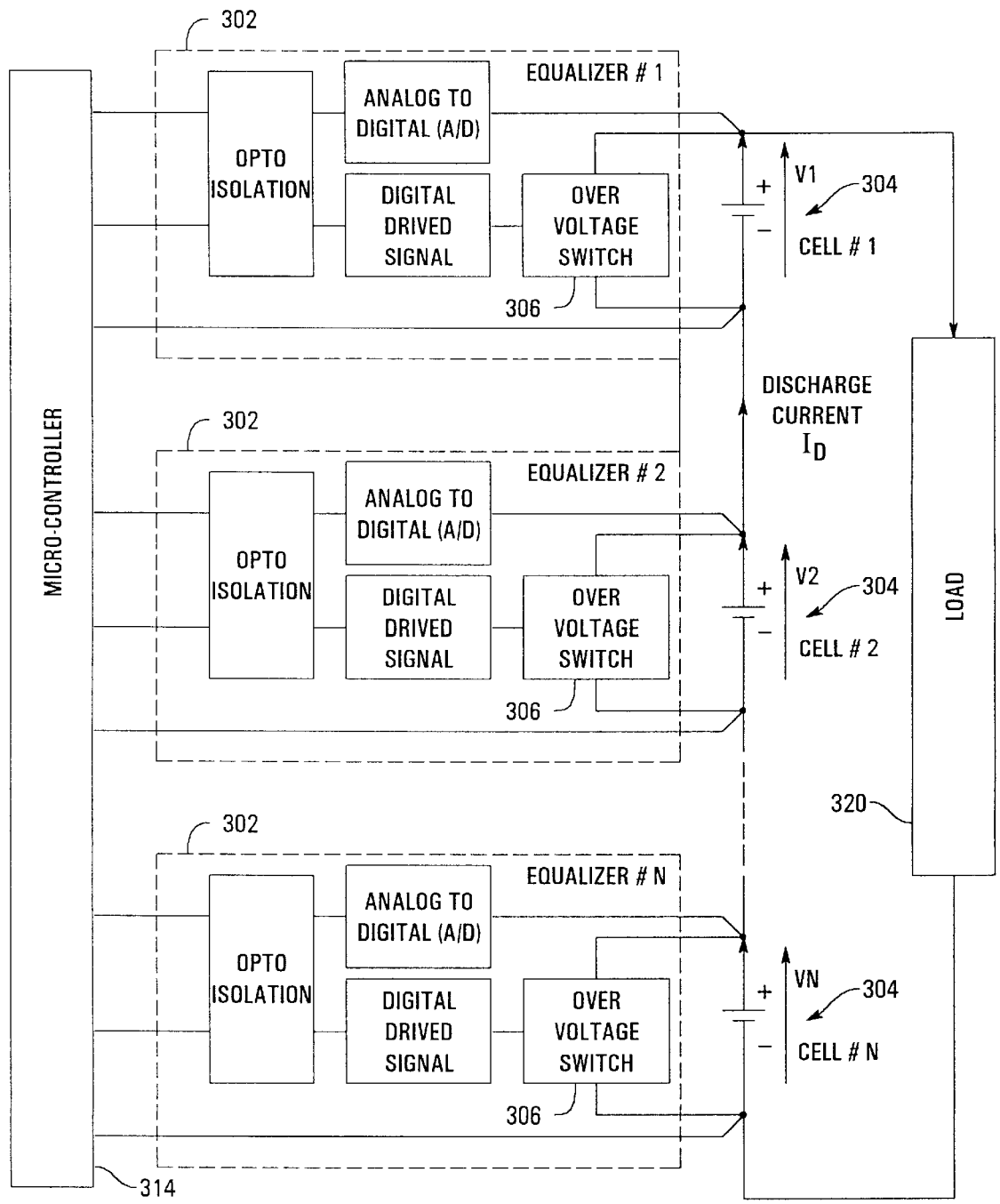
FIGS. 30–31 illustrate an embodiment of high-current equalizer circuitry coupled to a micro-controller and a number of series connected electrochemical cells.
Figure 31:
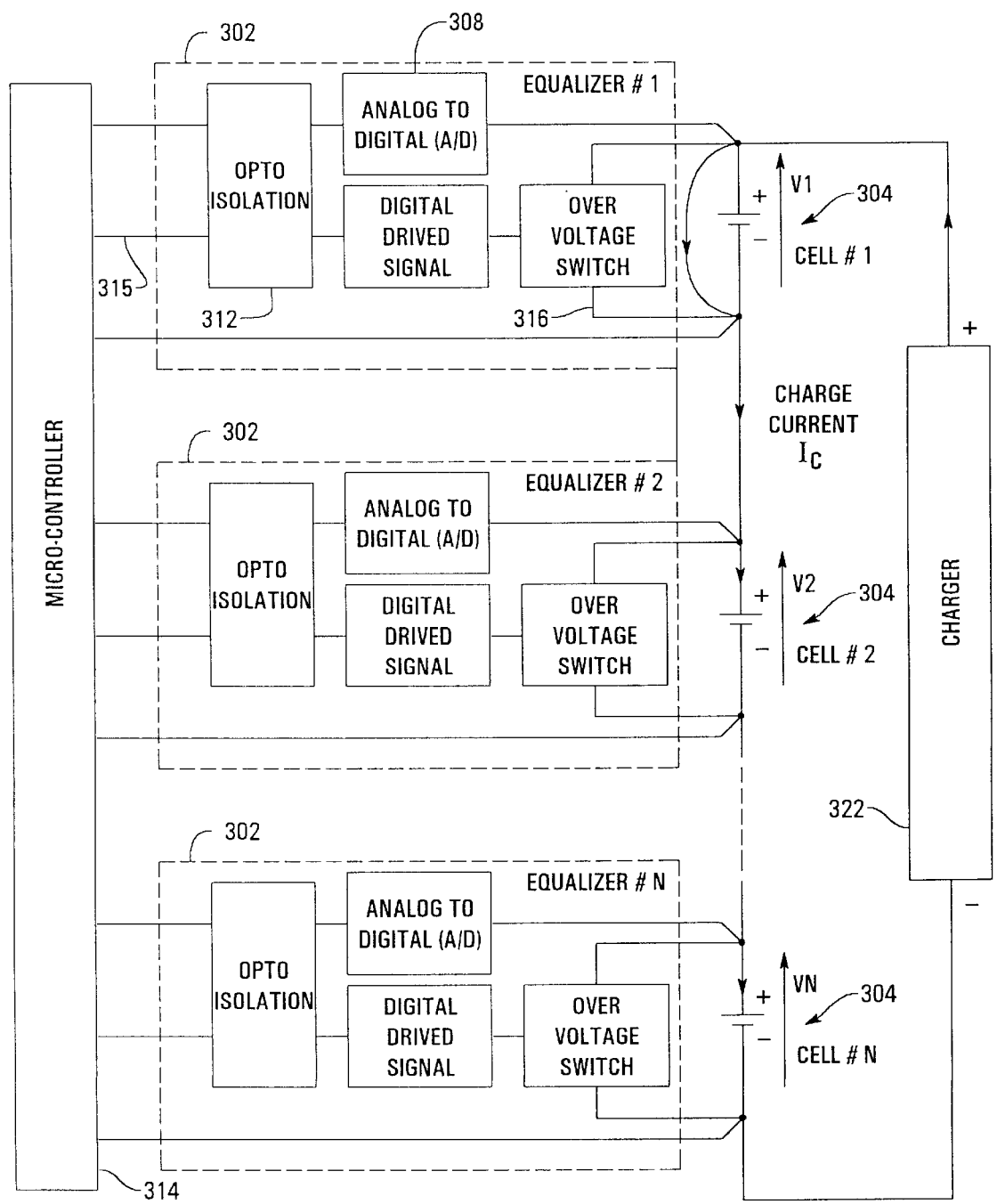

A number of individual equalizer modules 302 are shown in FIG. 30, each of which is connected to an individual energy storing cell 304. The cells 304 are connected in series to form a high-voltage module or battery. FIG. 30 depicts the flow of discharge current through a load 320, while FIG. 31 illustrates the flow of charge current produced by a charger 322 through the cell string. During a discharge cycle, as is shown in FIG. 30, a discharge current, $I_D$, flows through the cell string and through the load 320. Since the initial voltage across each of the cells 304 is typically lower than a predetermined equalization setpoint, each of the bypass switches 306 is in a non-conducting or OFF state. As such, the discharge current, $I_D$, may be very high, such as 400 A peak.

During a charge cycle, as is illustrated in FIG. 31, a charge current, $I_C$, flows from the positive terminal of the charger 322, through the cell string, and returns through negative terminal of the charger 322. At the beginning of the charge cycle, all of the charge current is delivered to the cells 304, and the equalizer modules 302 are in a non-activated state. As such, the charge current, $I_C$, may be very high until such time as the equalizer modules become activated.

The voltage across each cell 304 is monitored by a corresponding ADC 308, which may be a serial 12-bit ADC, for example. The ADC 308 communicates the voltage information to the micro-controller 314 via an isolated connection provided by the opto-isolation devices 312. The controller 314 generates PWM control signals 315 which are communicated to each of the equalizer modules 302. In response to the control signals 315, the individual equalizer modules 302 control the current flowing to their respective cell 304 or bypass current path 316 in a manner previously described with respect to FIG. 29.

Figure 32:
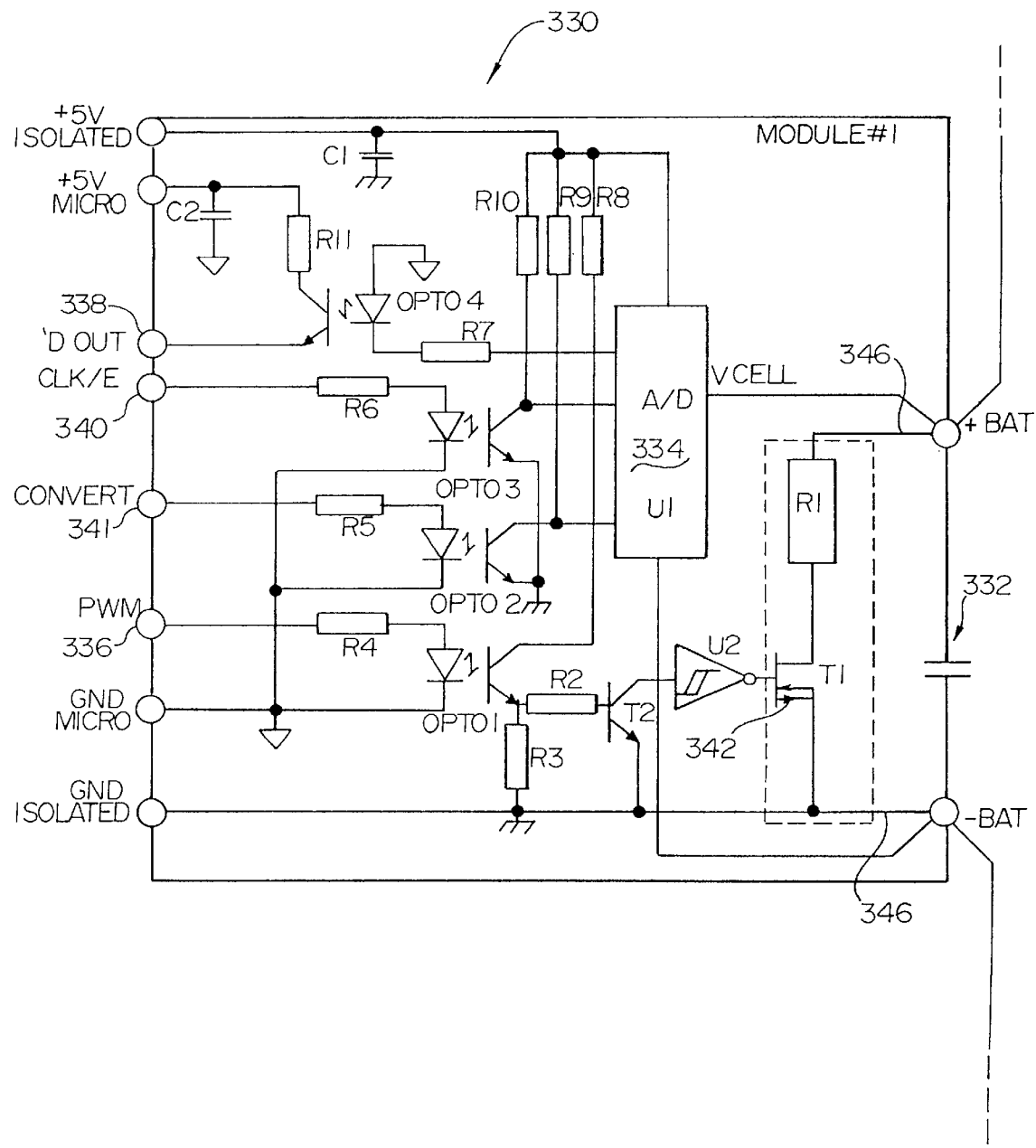
FIG. 32 is a schematic illustration of a high-current equalizer circuit.

A more detailed illustration of an equalizer module in accordance with one embodiment of the invention is provided in FIG. 32. In this embodiment, a micro-controller (not shown) manages the operation of the equalizer module 330, such as by defining equalization voltage setpoints, generating PWM control signals, and determining cell voltage levels. Voltage isolation between the micro-controller and the equalizer module 330 is provided by opto-isolators OPTO 1–4.

Figure 33A:
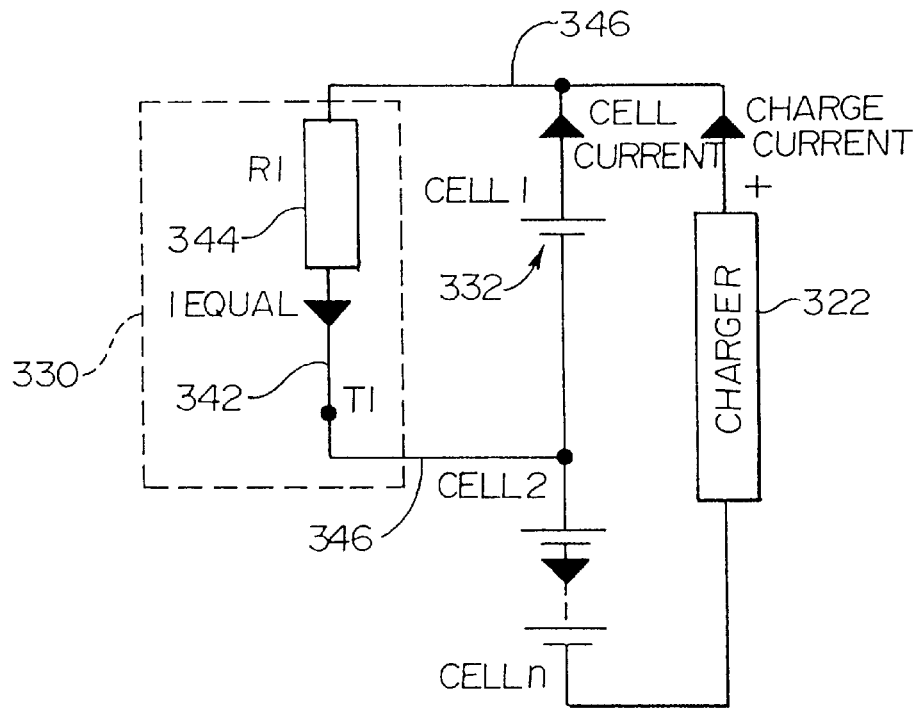
FIGS. 33A–33B illustrate depictions of a circuit equivalent to that shown in FIG. 32 in two distinct states of operation.
Figure 33B:
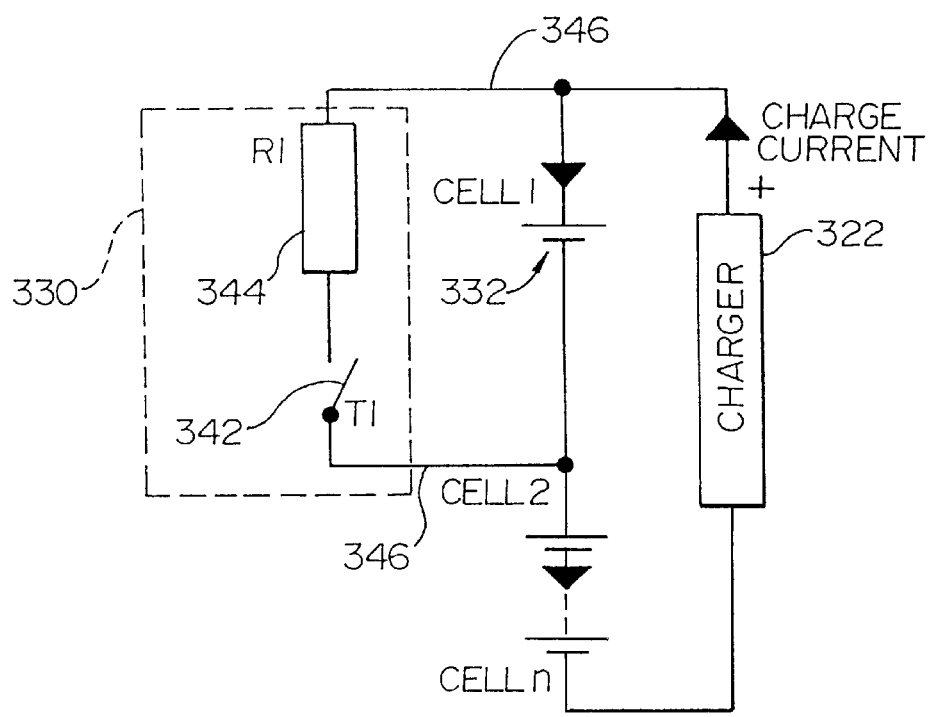

The micro-controller controls the ADC 334 when determining the potential across the cell 332 by providing appropriate signals to the CLK/E and CONVERT inputs 340, 341 of the equalizer module. A signal representative of the measured voltage of the cell 332 is made available at the output $D_{out}$ 338. When the micro-controller determines that the cell voltage measured by the ADC 334 is lower than the pre-established equalization voltage setpoint or the over-voltage setpoint, the PWM output node 336 is low, and the power MOSFET transistor 342 is OFF or in a non-conducting state. During this period, all of the charge current, $I_C$, is delivered to the cell 332. FIG. 33B depicts an equivalent circuit representation of the equalizer module 330 when the transistor 342 is in a non-conducting state.

When the voltage across the cell 332 reaches a voltage setpoint, the controller generates a digital PWM signal which is a PID function of the measured cell voltage and various charge parameters, including the equalization voltage setpoint, filtering time constants, and the sampling frequency. FIG. 33A is an equivalent circuit depiction of the equalizer circuit 330 when the transistor 342 is in a conducting state.

As is further depicted in FIG. 33A, when the transistor 342 is conducting, charge current is diverted through the a resistor 344 and the transistor 342 which define a bypass current path 346. Additionally, current from the cell 332 flows into the bypass current path 346 and is conducted through the resistor 344 and transistor 342. During the interval of time in which the transistor 342 is conducting, the power dissipated by the transistor 342 is given by the following equation:

$$P_{T\text{-}ave} = R_{DSon} \cdot (I_{equal\text{-}ave})^2 \qquad [4]$$

The resistor 344 dissipates almost all of the power which is given by the following equation:

$$P_{R\text{-}ave} = R_1 \cdot (I_{equal\text{-}ave}) \qquad [5]$$

where, $P_{T\text{-}ave}$ represents the average power dissipated by the transistor, $R_{DSon}$ represents the drain-to-source resistance of the transistor when in a conducting state, $I_{equal-ave}$ ave represents the average current passing through the bypass current path of the equalizer, $P_{R-ave}$ represents the average power dissipated by the resistor 344, and $R_1$ represents the value of the resistor 344.

The heat generated by the passing of current through equalizer circuit 330 is typically managed by a thermal management system coupled to the equalizer circuit 330. Typically, the equalizer circuit 330, and particularly the transistor 342 and resistor 344, is affixed to a heat sink, such as a copper base plate or metallic mounting structure, which is coupled to the thermal management system.

As the cell 332 reaches a fully charged state, the conduction duty cycle of the transistor 342 increases in order to bypass a larger percentage of the charge current through the bypass current path 346. The average equalizer current, $I_{equal-ave}$, after the cell reaches a fully charged state is given by:

$$I_{equal-ave} = (V_{cell}/R) \cdot D \quad [6]$$

$$D = T_{on}/T \quad [7]$$

where, D represents the duty cycle of the control signal generated by the micro-controller or signal driver. The average current passed through the cell is given by:

$$I_{cell-ave} = I_{charger} - I_{equalizer} \quad [8]$$

Figure 34:
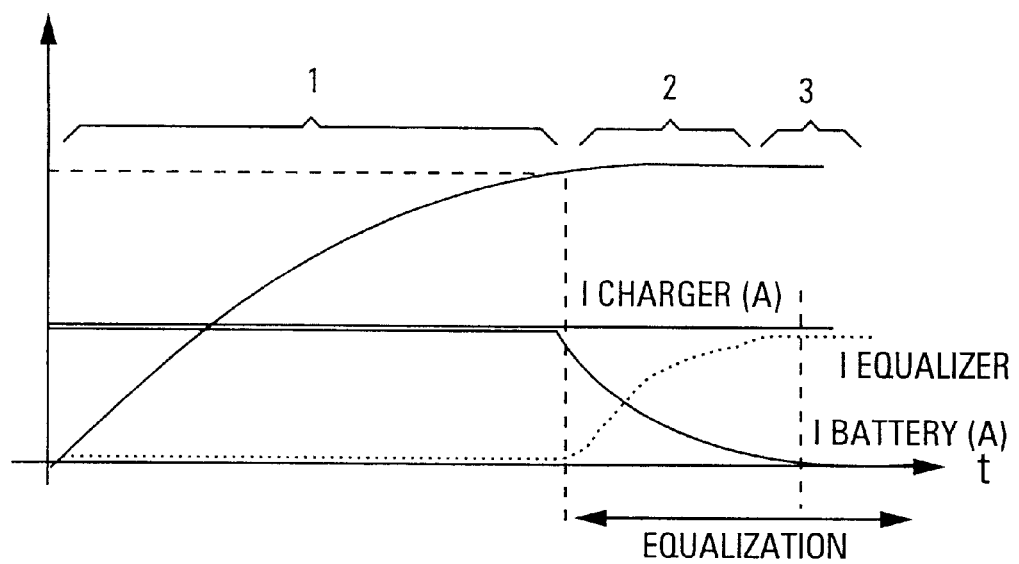
FIG. 34 depicts various voltage and current waveforms associated with a cell, equalizer circuit, and charger toward the end of an equalization procedure.

The graph provided in FIG. 34 depicts various voltage and current waveforms associated with a cell, equalizer circuit, and charger toward the end of an equalization procedure. In region 1 of the graph, it can be seen that the cell receives all of the charge current and that none of the charge current is bypassed through the equalizer circuit. In region 2 of the graph, the equalizer circuit becomes active, with a relatively small percentage of charge current being diverted through the current bypass path. As is shown in the third region of the graph, all of the current delivered by the charger is bypassed through the equalizer circuit.

Figure 35:
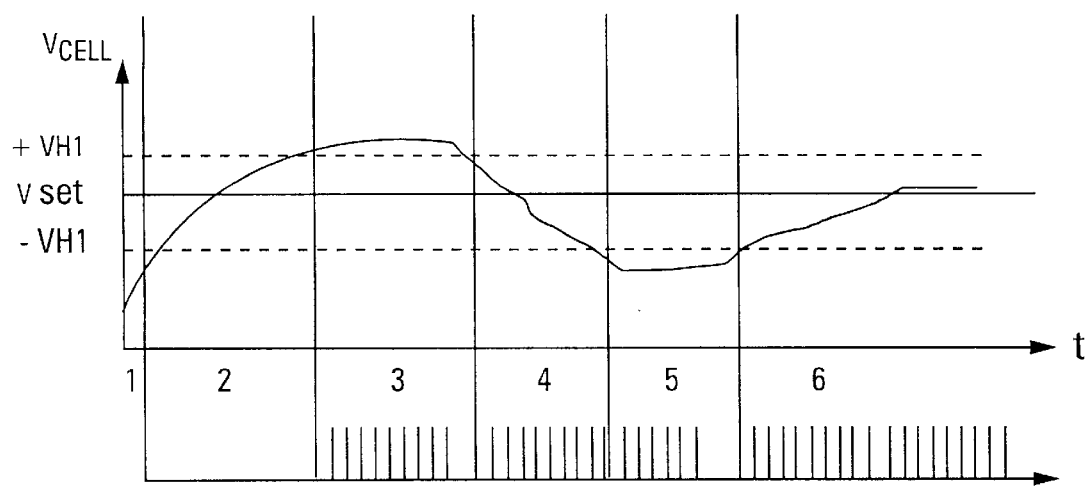
FIG. 35 is a graphical illustration of a voltage waveform for a cell subjected to a high-power equalization procedure in accordance with one embodiment of the present invention.
Figure 36:
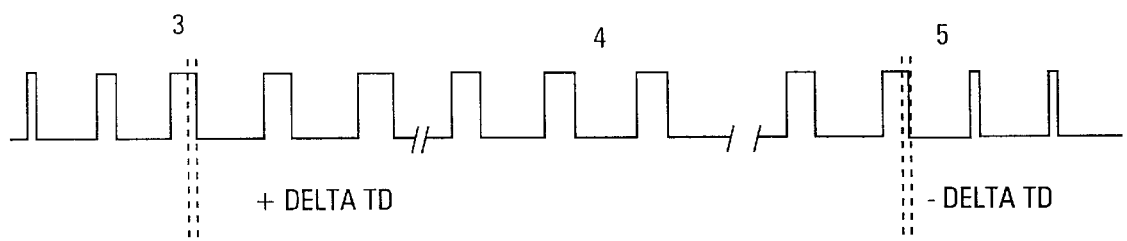
FIG. 36 is a diagram of a digital control signal produced by the signal driver circuit which controls a bypass transistor of a high-current equalizer circuit.

FIG. 35 is a graphical illustration of a voltage waveform for a cell subjected to a high-power equalization procedure in accordance with one embodiment of the present invention. The charging parameter $V_{set}$ represents the equalization voltage setpoint at which equalization is initiated. The charging parameter $+/-V_{H1}$ represents a tolerance band or hysteresis associated with the equalization setpoint voltage, $V_{set}$. These parameters are typically established by the controller. FIG. 36 is a diagram of a digital control signal produced by the signal driver circuit which controls the bypass transistor. Six distinct regions of interest are illustrated in FIGS. 35–36.

In region 1, the cell voltage is lower than the voltage reference, $V_{set}$, taking into consideration the lower hysteresis threshold, $-V_{H1}$. At this cell potential, no control signal is generated by the controller or signal driver, and as such, the transistor 342 remains OFF. All of the charge current is thus delivered to the cell 332. Concerning region 2, the cell voltage falls within the hysteresis band, $V_{H1}$ (i.e., between $[V_{set}+V_{H1}]$ and $[V_{set}-V_{H1}]$). Within this hysteresis region, no control signal is generated by the controller and the transistor remains in a nonconducting state. In region 3, the cell voltage exceeds the upper hysteresis threshold, $+V_{H1}$. In response, the controller generates PWM pulses and the signal driver produces control signals that cause the transistor to switch between non-conducting and conducting states. Charge current is thus bypassed through the current bypass path 346.

As the transistor 342 conducts, the cell voltage decreases. When the cell voltage falls within the hysteresis band, as is shown in region 4, the duty cycle of the control signal remains constant. When the cell voltage further decreases so as to fall below the lower hysteresis threshold, $-V_{H1}$, as is seen in region 5, the duty cycle decreases until the cell voltage reaches the value of $V_{cell} = V_{set} - V_{H1}$. At this time, the duty cycle of the control signal once again becomes constant. When all of the charge current is diverted through the current bypass path 346 (i.e., the cell is fully charged), as is shown in region 6, the duty cycle of the control signal is constant and minimal.

In FIG. 37, there is illustrated a number of current associated with regions 3 and 6 of the graph provided in FIG. 35. More specifically, FIG. 37 illustrates current waveforms corresponding to the transistor gate-to-source voltage ($V_{GS}$), equalizer bypass current, and cell current in response to control signals produced by the signal driver. It can be seen that the voltage waveform shown in FIG. 35 exhibits very little ripple resulting from the current pulse mode of equalizer operation depicted in FIG. 37.

Figure 38:
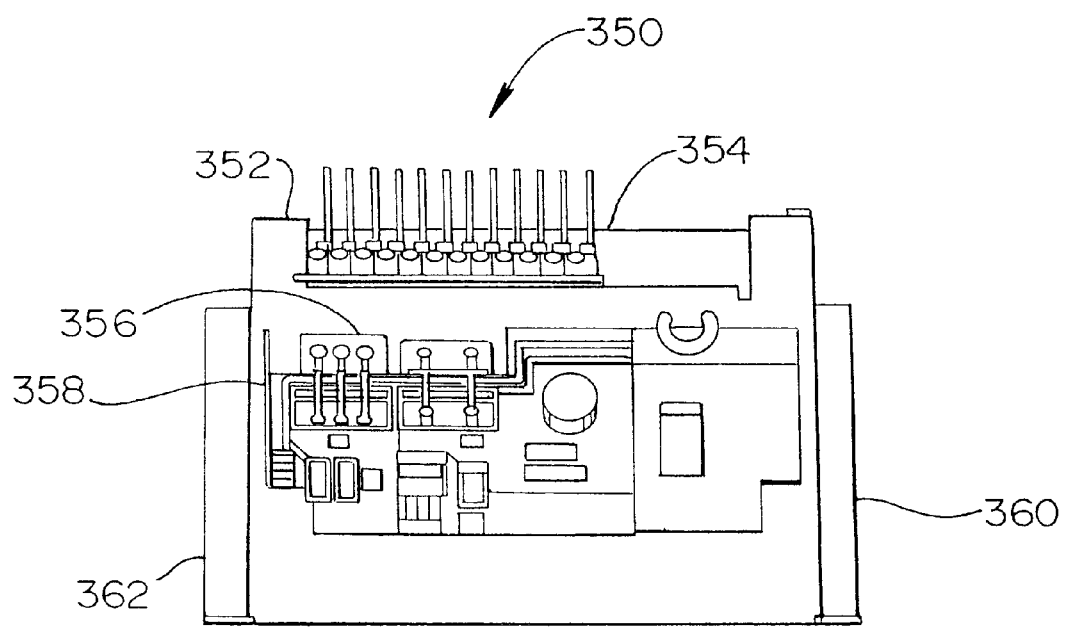
FIG. 38 illustrates an embodiment of an integrated equalizer and bypass module which includes circuitry for performing cell equalization and cell bypass functions.

In FIG. 38, there is illustrated an embodiment of an equalizer and bypass module 350 which includes circuitry for performing cell equalization and cell bypass functions. It is noted that the bypass device, when activated, electrically isolates a defective cell or cell pack from a series connection. The bypass device typically includes an electrically or thermally activated fuse which, when blown, effectively disconnects the defective cell from the series connection. An exemplary bypass device is disclosed in co-pending application Ser. No. 08/900,325 entitled "Bypass Apparatus and Method for Series Connected Energy Storage Devices" (Rouillard et al.), the contents of which are incorporated herein by reference.

The equalizer and bypass module includes an electronic control board 354 which is disposed in an isolated region or chamber of the module package for purposes of enhancing heat dissipation. A power MOSFET transistor 356 and load resistor 358, which are mounted on an interconnect board, are also situated in thermal contact with a copper heat conductor. The module 350 includes positive and negative copper metal terminals 362, 360 which are mounted on the interconnect board 370 shown in FIG. 39. In accordance with this configuration, the equalizer and bypass module 350 are packaged and hermetically sealed in a 0.625" high housing 352.

Figure 39:
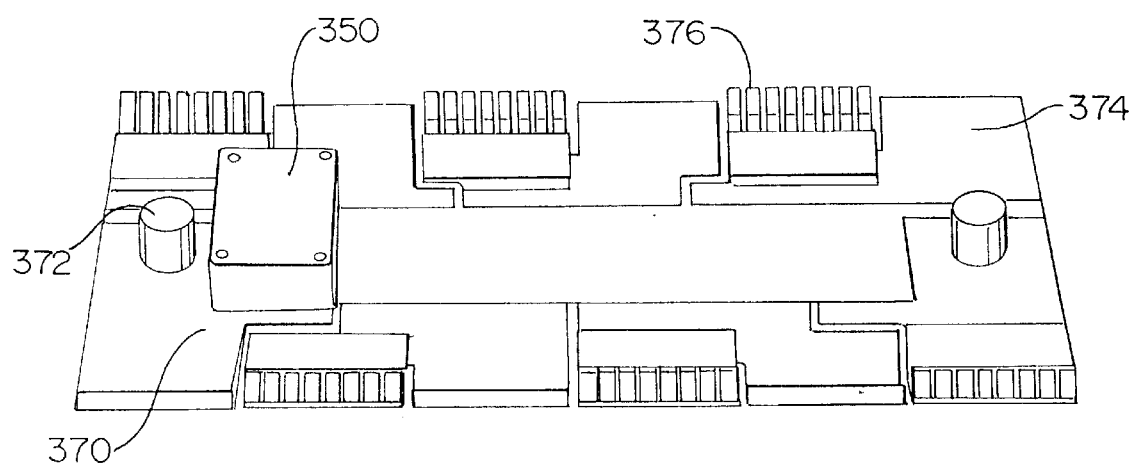
FIG. 39 is an illustration of an interconnect board onto which the integrated equalizer and bypass module shown in FIG. 38 is mounted.

FIG. 39 is an illustration of an interconnect board 370 onto which the equalizer and bypass module 350 shown in FIG. 38 is mounted. The interconnect board 370 is typically fabricated from a rooted or machine milled copper plate having a thickness of approximately 0.05". The interconnect board 370 includes positive and negative terminals 372, 374 which are typically coupled to other series connected energy storing modules. Also shown mounted to the interconnect board 370 is an integrated fuse pack 376 which includes a number of individual fuses, each of which is connected in series with a corresponding cell 304.

It is noted that the heat generated by the equalizer and bypass module 350 is conducted through the positive and negative terminals 362, 360 of the module package 350, along the thermally conductive surface of the interconnect board 370, and finally to the thermal management system of the energy storing module. In accordance with this design, the equalizer and bypass module 350 is capable of bypassing at least 5 A of current and dissipating approximately 15 W during a charge or discharge cycle.

It will, of course, be understood that various modifications and additions can be made to the various embodiments discussed herein above without departing from the scope or spirit of the present invention. For example, the principles of the present invention may be employed for use with battery technologies other than those exploiting lithium polymer electrolytes, such as those employing nickel metal hydride (Ni-MH), lithium-ion, (Li-Ion), and other high-energy battery technologies. Accordingly, the scope of the present invention should not be limited by the particular embodiments discussed above, but should be defined only by the claims set forth below and equivalents thereof.

What we claim is:

1. A method of charging series connected thin-film electrochemical cells, comprising:

supplying a charge current to the thin-film electrochemical cells to cause a voltage to increase in each of the series connected electrochemical cells; and controlling, in response to the voltage of a particular series connected electrochemical cell reaching a voltage limit, the charge current through the particular electrochemical cell without interrupting the charge current supplied to other ones of the electrochemical cells.

2. The method of claim 1, wherein controlling the charge current comprises preventing overcharging of the particular electrochemical cell.

3. The method of claim 1, wherein controlling the charge current further comprises diverting the charge current from the particular electrochemical cell to the other electrochemical cells.

4. The method of claim 1, wherein controlling the charge current further comprises alternately directing the charge current between the particular electrochemical cell and a current path that bypasses the particular electrochemical cell.

5. The method of claim 1, wherein controlling the charge current further comprises modulating a switch connected in parallel with the particular electrochemical cell to direct the charge current between the particular electrochemical cell and a bypass current path in parallel with the particular electrochemical cell.

6. The method of claim 5, wherein controlling the charge current comprises modulating the switch using either a pulse width modulation or a frequency with modulation technique.

7. The method of claim 1, wherein supplying the charge current comprises:

supplying the charge current at a substantially constant level to the electrochemical cells until the particular electrochemical cell reaches the voltage limit; and applying a substantially constant charge voltage at a first voltage level across the electrochemical cells in response to the particular electrochemical cell reaching the voltage limit.

8. The method of claim 7, wherein applying the substantially constant charge voltage comprises determining the first voltage level by summing the voltages of the electrochemical cells.

9. The method of claim 7, further comprising applying a substantially constant charge voltage at a second voltage level across the electrochemical cells prior to supplying the charge current at the substantially constant level to the electrochemical cells.

10. The method of claim 9, further comprising:

determining a voltage of each of the series connected electrochemical cells;

computing a voltage difference between a maximum voltage and a minimum voltage of the electrochemical cell voltages; and setting the second voltage level to the maximum voltage in response to the voltage difference exceeding a pre-established limit.

11. The method of claim 1, further comprising:

determining a voltage of each of the series connected electrochemical cells;

determining a maximum voltage and a minimum voltage of the electrochemical cell voltages; and applying a constant charge voltage at the maximum voltage across the electrochemical cells prior to supplying the charge current at the substantially constant level to the electrochemical cells.

12. The method of claim 1, further comprising providing the thin-film electrochemical cells in an enclosed housing, wherein controlling the charge current further comprises controlling, in-situ the enclosed housing, the charge current through the particular electrochemical cell without interrupting the charge current supplied to other ones of the electrochemical cells.

13. The method of claim 1, wherein controlling the charge current comprises digitally controlling the charge current through the particular electrochemical cell.

14. The method of claim 1, wherein the charge current is greater than 200 amperes.

15. A voltage equalization apparatus coupled to a charging unit that provides a charge current, the voltage equalization apparatus comprising:

a plurality of thin-film electrochemical cells connected in series;

a plurality of equalizer devices, each of the equalizer devices being coupled to one of the plurality of electrochemical cells and comprising:

a detector coupled to a corresponding one of the electrochemical cells that senses a voltage of the corresponding electrochemical cell, the detector producing an output signal related to the magnitude of the sense voltage;

a signal generator coupled to the detector that produces a control signal in response to the detector output signal; and a bypass circuit coupled to the corresponding electrochemical cell and the signal generator, the bypass circuit, in response to the control signal, conducting at least a portion of the charge current so as to bypass the corresponding electrochemical cell without interrupting the charge current provided to other ones of the plurality of electrochemical cells.

16. The apparatus of claim 15, wherein the detector further comprises a comparator that determines a voltage difference between the voltage of the corresponding electrochemical cell and a reference voltage, the detector output signal being related to the voltage difference.

17. The apparatus of claim 15, wherein the signal generator comprises one of a frequency modulation circuit or a pulse width modulation circuit.

18. The apparatus of claim 15, wherein the signal generator further comprises a voltage controlled oscillator coupled to the detector and to a monostable device, the monostable device being coupled to the bypass circuit.

19. The apparatus of claim 15, wherein the signal generator further comprises:

a voltage controlled oscillator, coupled to the detector, that produces an output signal having a frequency that varies in relation to a magnitude of the detector output signal; and a monostable device coupled to the voltage controlled oscillator and the bypass circuit that, in response to the output signal of the voltage controlled oscillator, produces the control signal having a fixed pulse width.

20. The apparatus of claim 15, wherein the bypass circuit is coupled in parallel with the corresponding electrochemical cell and comprises an inductor coupled to a transistor, the inductor and transistor defining a bypass current path through which the charge current portion is conducted in response to the control signal.

21. The apparatus of claim 15, wherein the plurality of electrochemical cells provides power for the voltage equalization apparatus.

22. The apparatus of claim 15, wherein the plurality of electrochemical cells comprises prismatic thin-film electrochemical cells.

23. The apparatus of claim 15, wherein the plurality of electrochemical cells comprises energy storing modules, each of the energy storing modules comprising a plurality of thin-film electrochemical cells.

24. The apparatus of claim 15, wherein the plurality of electrochemical cells comprises a plurality of electrochemical cells arranged in a parallel relationship to form a plurality of electrically independent cell packs, the plurality of electrically independent cell packs being arranged in a series relationship.

25. The apparatus of claim 15, further comprising an enclosed housing separate from the charge unit, wherein the thin-film electrochemical cells and the equalizer devices are respectively provided in the enclosed housing.

26. The apparatus of claim 15, wherein the charge current is greater than 200 amperes.

27. A voltage regulating apparatus coupled to a charging unit that provides a charge current, the voltage regulating apparatus comprising:
   a plurality of thin-film electrochemical cells connected in series;
   a plurality of regulating circuits, each of the regulating circuits being coupled to one of the plurality of electrochemical cells and comprising:
      a sensor that senses a voltage of a corresponding one of the electrochemical cells, the sensor producing an output signal related to the magnitude of the sense voltage of the corresponding electrochemical cell;
      a processor coupled to the sensor that determines a voltage difference between the sense voltage and a reference voltage, the processor producing a difference signal related to the magnitude of the voltage difference;
      a signal generator coupled to the processor that produces a digital control signal in response to the difference signal; and
      a bypass circuit coupled to the signal generator and the corresponding electrochemical cell, the bypass circuit, in response to the digital control signal, diverting at least a portion of the charge current to other ones of the plurality of electrochemical cells.

28. The apparatus of claim 27, wherein the signal generator produces one of a frequency varying control signal or a time varying control signal.

29. The apparatus of claim 28, wherein the bypass circuit comprises a bypass switch which modulates between a conducting state and a non-conducting state in response to the control signal, the bypass switch diverting the charge current portion to other ones of the plurality of electrochemical cells when in the conducting state.

30. The apparatus of claim 29, wherein the bypass switch diverts the charge current portion so as to prevent overcharging of the corresponding electrochemical cell.

31. The apparatus of claim 27, wherein the charge current is greater than 200 amperes.

32. A voltage regulating apparatus coupled to a charging unit that provides a charge current, the voltage regulating apparatus comprising:
   a plurality of energy storing devices connected in series; and
   a plurality of regulating circuits, each of the regulating circuits being coupled to one of the plurality of energy storing devices and comprising a frequency modulated switching circuit or a pulse modulated switching circuit, a particular one of the regulating circuits shunting at least a portion of the charge current from a corresponding energy storing device to other ones of the plurality of energy storing devices in response to the corresponding energy storing device reaching a voltage setpoint.

33. The apparatus of claim 32, wherein each of the regulating circuits operates autonomously relative to other ones of the plurality of regulating circuits.

34. The apparatus of claim 32, wherein each of the regulating circuits comprises a processor that controls shunting of the charge current portion from the corresponding energy storing device to the other ones of the plurality of energy storing devices.

35. The apparatus of claim 34, further comprising a system processor coupled to each of the regulating circuit processors.

36. The apparatus of claim 32, wherein the particular regulating circuit shunts the charge current portion from the corresponding energy storing device so as to prevent overcharging of the corresponding energy storing device.

37. The apparatus of claim 32, wherein the energy storing devices comprise one or more thin-film electrochemical cells.

38. A method of charging series connected energy storing devices, comprising:
   supplying a charge current to the energy storing devices to cause a voltage to increase in each of the series connected energy storing devices; and
   in response to the voltage of a particular series connected energy storing device reaching a voltage limit, modulating, using either a phase modulation technique or a frequency modulation technique, a switch connected in parallel with the particular energy storing device to direct the charge current between the particular energy storing device and a bypass current path in parallel with the particular energy storing device.

39. The method of claim 38, wherein the phase modulation technique comprises a pulse width modulation technique and the frequency modulation technique comprises a frequency with modulation technique.

40. The method of claim 38, wherein the energy storing devices comprise one or more thin-film electrochemical cells.

41. A method of charging series connected thin-film electrochemical cell devices, comprising:
   determining a voltage of each of the series connected thin-film electrochemical cell devices;
   computing a voltage difference between a maximum voltage and a minimum voltage of the thin-film electrochemical cell device voltages;
   applying, in response to the voltage difference exceeding a pre-established limit, a substantially constant charge voltage at a first voltage level equivalent to the maximum voltage across the thin-film electrochemical cell devices;

supplying, subsequent to applying the substantially constant charge voltage at the first voltage level, a charge current at a substantially constant level to the thin-film electrochemical cell devices to cause a voltage to increase in each of the series connected thin-film electrochemical cell devices until the voltage of a particular series connected thin-film electrochemical cell device reaches a voltage limit; and applying, in response to the voltage of the particular thin-film electrochemical cell device reaching the voltage limit, a substantially constant charge voltage at a second voltage level across the thin-film electrochemical cell devices.

42. The method of claim 41, further comprising determining the second voltage level by summing the voltages of the thin-film electrochemical cell devices.

43. The method of claim 41, wherein each of the thin-film electrochemical cell devices comprises one or more thin-film electrochemical cells.

44. A voltage equalization apparatus for an energy storing system, the voltage equalization apparatus coupled to a charging source that provides a charge current, the voltage equalization apparatus comprising:

a plurality of thin-film electrochemical cell devices connected in series;

a plurality of equalizer devices, each of the equalizer devices being coupled to one of the plurality of thin-film electrochemical cell devices and operating autonomously with respect to other ones of the plurality of equalizer devices, each of the equalizer devices comprising:

an analog monitor circuit including first and second voltage inputs coupled across a corresponding one of the thin-film electrochemical cell devices, the analog monitor circuit sensing a voltage of the corresponding thin-film electrochemical cell device; and a power transistor having a gate coupled to an output of the analog monitor circuit, and a collector and an emitter coupled across the corresponding thin-film electrochemical cell device so as to define a bypass current path, the analog monitor circuit, in response to the sensed voltage, controlling the gate of the power transistor so as to moderate a flow of current through the bypass current path;

wherein power dissipated by the power transistor is linearly related to the sensed voltage of the corresponding thin-film electrochemical cell device and the charge current.

45. The apparatus of claim 44, wherein the power dissipated by the power transistor is directly proportional to the sensed voltage of the corresponding thin-film electrochemical cell device and the charge current of each of the equalizer devices.

46. The apparatus of claim 44, wherein substantially all heat associated with each of the equalizer devices is generated by the power transistor.

47. The apparatus of claim 44, wherein the analog monitor circuit controls the gate of the power transistor in accordance with a super zener diode characteristic curve in response to the sensed voltage.

48. The apparatus of claim 44, wherein the analog monitor circuit comprises a remote sensing voltage amplifier and a current amplifier.

49. The apparatus of claim 44, wherein each of the equalizer devices receives a setpoint control corresponding to a voltage setpoint from a controller.

50. The apparatus of claim 44, wherein each of the equalizer devices is powered by the corresponding thin-film electrochemical cell device.

51. The apparatus of claim 50, wherein:

offset voltages are induced between the equalizer devices; and a voltage setpoint of each of the equalizer devices is transmitted from a common reference circuit by a current source which is independent with respect to the offset voltage.

52. The apparatus of claim 51, wherein the sensed voltage of each of the thin-film electrochemical cells is transmitted to a common measuring circuit using a current source that is proportional to the corresponding thin-film electrochemical cell device voltage.

53. The apparatus of claim 44, wherein each of the thin-film electrochemical cell devices comprises one or more thin-film electrochemical cells.

54. The apparatus of claim 44, wherein the charge current is greater than 200 amperes.

* * * * *

UNITED STATES PATENT AND TRADEMARK OFFICE
CERTIFICATE OF CORRECTION

PATENT NO.   : 5,952,815
DATED        : September 14, 1999
INVENTOR(S)  : Rouillard et al.

It is certified that error appears in the above-identified patent and that said Letters Patent is hereby corrected as shown below:

Column 11,
Line 31, please replace "tire" with -- the --.

Column 12,
Lines 3 and 19, please replace "$V_{ref}240$," with -- $V_{ref}$ 240, --;
Line 10, please replace "produce" with -- produced --;

Column 13,
Line 5, please insert -- with -- after [2].

Column 14,
Line 58, please replace "a" with -- as --.

Column 15,
Line 4, please replace "and" with -- than --.

Column 20,
Line 50, please delete "a"; in line 65, please replace "$P_{R\text{-}ave}=R_1 \bullet (I_{equal\text{-}ave})$" with -- $P_{R\text{-}ave} =R1 \bullet (I_{equal\text{-}ave})^2$ --.

Column 21,
Line 1, please delete "ave" following "$I_{equal\text{-}ave}$".

Column 24,
Line 55, please delete "width".

Column 26,
Line 50, please delete "width".

Column 27,
Lines 37 and 43, please replace "gate" with -- base --;

UNITED STATES PATENT AND TRADEMARK OFFICE
CERTIFICATE OF CORRECTION

PATENT NO.   : 5,952,815
DATED        : September 14, 1999
INVENTOR(S)  : Rouillard et al.

It is certified that error appears in the above-identified patent and that said Letters Patent is hereby corrected as shown below:

Column 28,
Line 6, please insert after "to" -- the charge current of each of the equalizer devices and a voltage difference between --;
Line 8, please insert after "device" -- and a voltage setpoint --;
Line 8, after "device" and before "and" please remove "and the charge current of each of the equalizer devices".

Signed and Sealed this

Sixth Day of August, 2002

*Attest:*

*Attesting Officer*

JAMES E. ROGAN
*Director of the United States Patent and Trademark Office*